United States Patent
Ichino

(10) Patent No.: US 8,521,751 B2
(45) Date of Patent: Aug. 27, 2013

(54) SEARCH DEVICE, A SEARCH METHOD AND A PROGRAM

(75) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 13/059,965

(22) PCT Filed: Aug. 21, 2009

(86) PCT No.: PCT/JP2009/064638
§ 371 (c)(1),
(2), (4) Date: Feb. 18, 2011

(87) PCT Pub. No.: WO2010/021376
PCT Pub. Date: Feb. 25, 2010

(65) Prior Publication Data
US 2011/0145260 A1 Jun. 16, 2011

(30) Foreign Application Priority Data
Aug. 22, 2008 (JP) ................. 2008-214211

(51) Int. Cl.
*G06F 17/30* (2006.01)
(52) U.S. Cl.
USPC ....................................... 707/754
(58) Field of Classification Search
USPC .......................... 707/754, E17.039
See application file for complete search history.

(56) References Cited

U.S. PATENT DOCUMENTS

| 6,785,677 B1* | 8/2004 | Fritchman | 1/1 |
| 2005/0120017 A1* | 6/2005 | Motoki | 707/5 |
| 2007/0106640 A1* | 5/2007 | Shankara | 707/3 |

OTHER PUBLICATIONS

Gollapudi, Sreenivas, and Rina Panigrahy. "A dictionary for approximate string search and longest prefix search." Proceedings of the 15th ACM international conference on Information and knowledge management. ACM, 2006.*
Dharmapurikar, Sarang, Praveen Krishnamurthy, and David E. Taylor. "Longest prefix matching using bloom filters." Proceedings of the 2003 conference on Applications, technologies, architectures, and protocols for computer communications. ACM, 2003.*
Kasai, Toru, et al. "Linear-time longest-common-prefix computation in suffix arrays and its applications." Combinatorial Pattern Matching. Springer Berlin Heidelberg, 2006.*

* cited by examiner

*Primary Examiner* — Usmaan Saeed
*Assistant Examiner* — Nan Hutton
(74) *Attorney, Agent, or Firm* — Sughrue Mion, PLLC

(57) ABSTRACT

A search device, a search method and a program, are provided, which improve the search speed in a longest prefix or suffix match search. At the time of registration, the search device stores an inputted registered pattern, generates one or more set of a first character string which has a length of a multiple of a predetermined number of characters and a remaining second character string by dividing the registered pattern into two, obtains a plurality of hash values by applying a plurality of hash functions to the first character string, and updates the contents which the plurality of hash values indicate. The search device extracts a partial character string of the length which is equal to the estimated length from the search key and determines whether the partial character string which is extracted is registered.

8 Claims, 30 Drawing Sheets

Fig.12

LENGTH-OFFSET
CORRESPONDENCE TABLE 67

| LENGTH | OFFSET |
|---|---|
| 0 | 0 |
| 1 | 1 |
| 2 | 2 |
| 3 ~ 5 | 3 |
| 6 ~ 8 | 4 |
| NO SMALLER THAN 9 | 5 |

THIS NUMBER OF LINES IS WINDOW SIZE 55

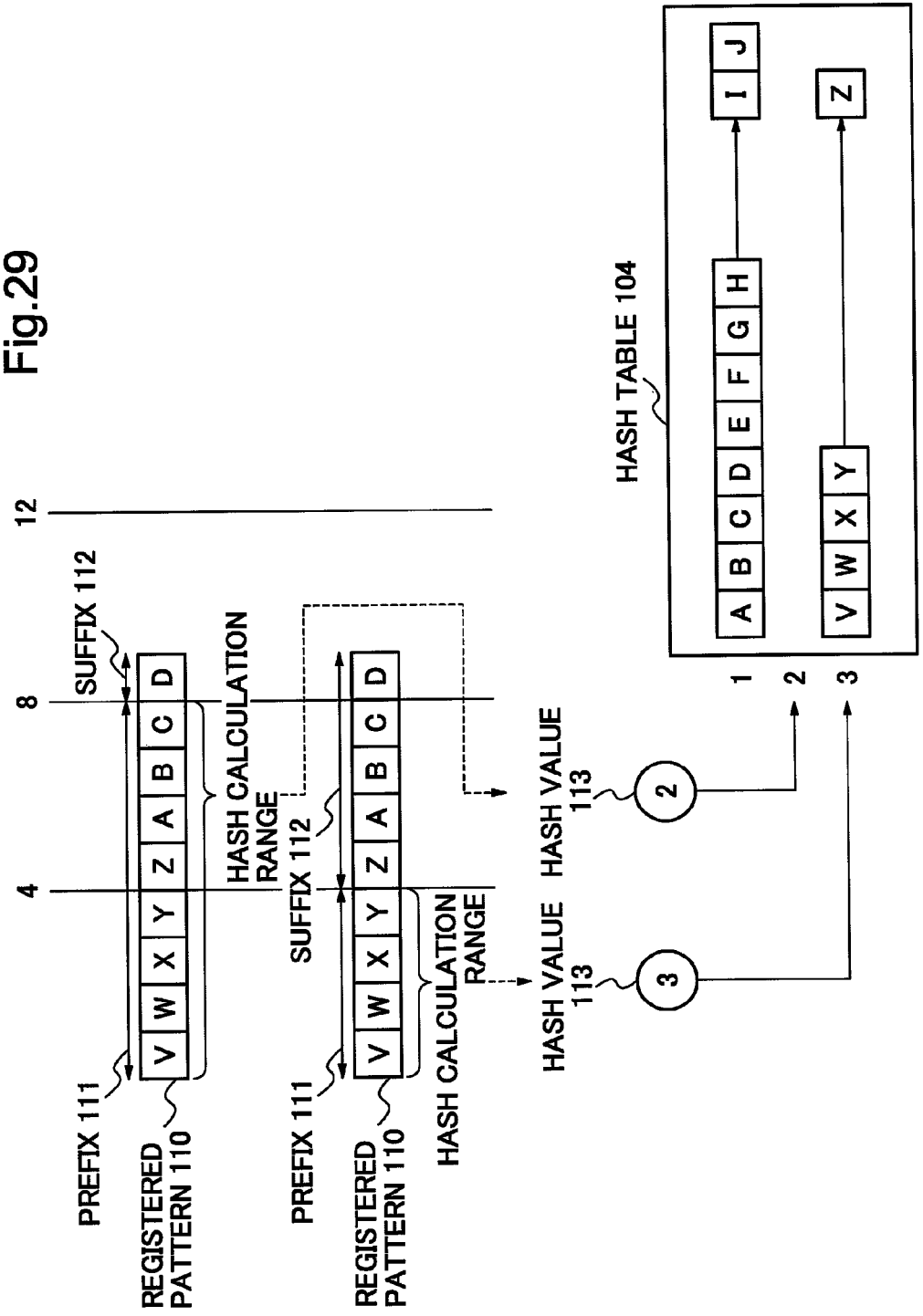

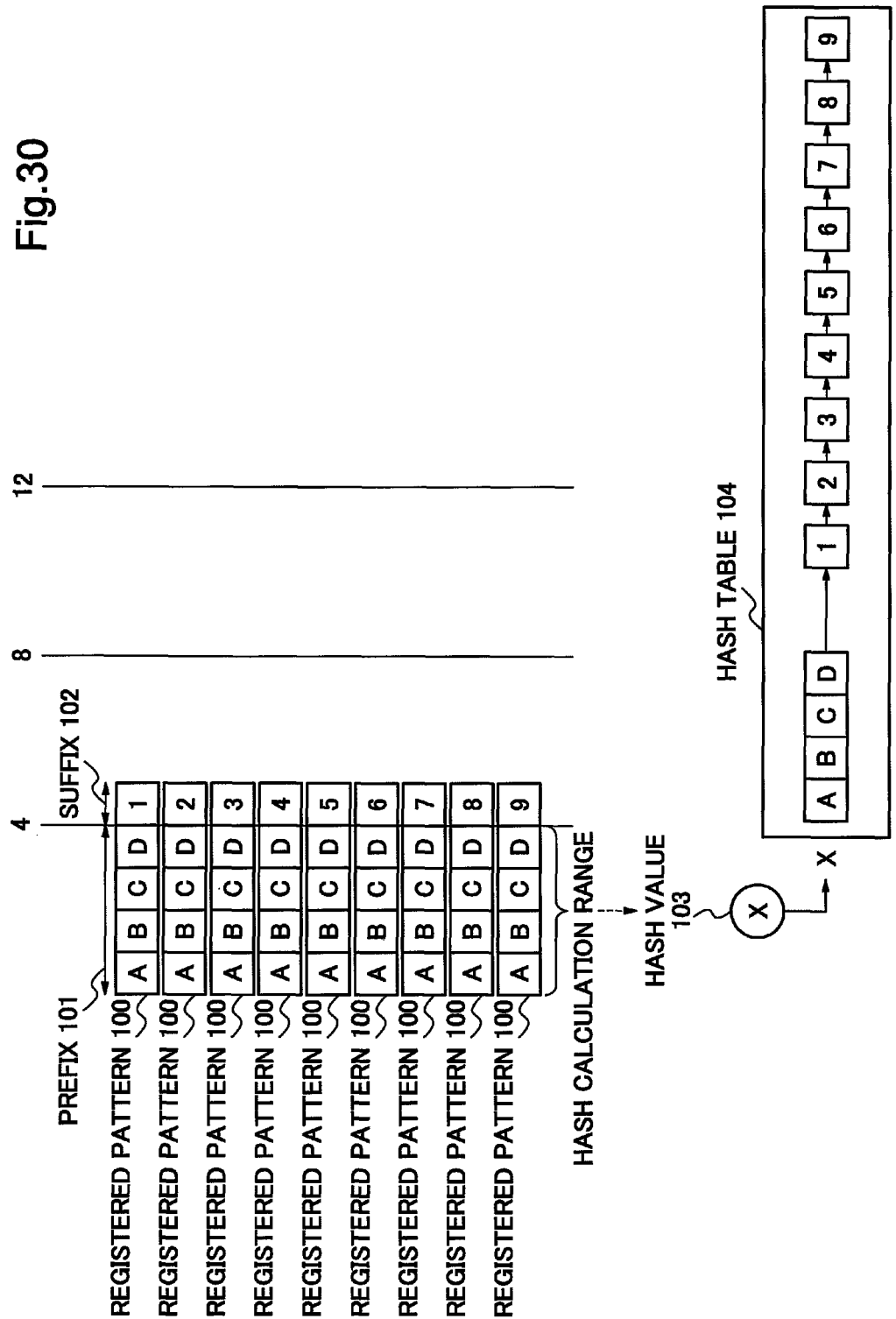

SEARCH DEVICE, A SEARCH METHOD AND A PROGRAM

CROSS REFERENCE TO RELATED APPLICATIONS

This application is a National Stage of International Application No. PCT/JP2009/064638 filed Aug. 21, 2009, claiming priority based on Japanese Patent Application No. 2008-214211 filed Aug. 22, 2008, the contents of all of which are incorporated herein by reference in their entirety.

TECHNICAL FIELD

The present invention relates to information search technology which searches based on inputted information and, in particular, relates to a search device, a search method and a program which search longest prefix or suffix match.

BACKGROUND ART

A search is one of important technologies in the field of information processing, and there are various search methods corresponding to its use. As one of search methods, there is a longest prefix or suffix match search. A longest match search is often used for a character string having a hierarchical structure such as an address of the real world or URI (Uniform Resource Identifier) which indicates the location on the internet. For example, in the address as "X prefecture Y city," an inclusion relation that "X prefecture" includes "Y city" is held. This shows that an address has a hierarchical structure.

Necessity of a longest match search is described. As an example, it is assumed that there is a database in which two areas as "A prefecture B city" and "A prefecture B city C ward" are registered. And consider finding an area closest to the address which is "A prefecture B city C ward XXX" from the database. Although both of above-mentioned two areas include the address, "A prefecture B city C ward" is more precise. In other words, number of characters which match with the address is larger in "A prefecture B city C ward" than in "A prefecture B city".

A search method which searches a database for a pattern whose matching part is longest by matching the pattern with a search key from the beginning to the end of a character string as mentioned above is called a longest prefix match search. Also, a longest suffix match search is the same as a longest prefix match search except for matching is done from the end to the beginning of a character string.

As a technology which carries out the longest prefix or suffix match search, for example, there is one disclosed in patent document 1.

Here, operation of a technological example related to the present invention (hereinafter, referred to as a related technology example) is described using a drawing. An example which registers two registered patterns 100: "ABCDEFGHIJ" and "VWXYZ" in a database is shown in FIG. 28.

First, registered pattern 100 is divided into prefix 101 which is a first part and suffix 102 which is a latter part. "ABCDEFGHIJ" of registered pattern 100 is divided into prefix 101 of 8 characters and suffix 102 of 2 characters. Similarly, "VWXYZ" of registered pattern 100 is divided into prefix 101 of 4 characters and suffix 102 of 1 character. The length of prefix 101 is the number of characters of a multiple of predetermined value N (N is a natural number and indicates an interval of a dividing position) and is the largest length which does not exceed the length of registered pattern 100. In this example, it is supposed that N=4.

Next, for each registered pattern 100, hash value 103 is obtained by applying a hash function to prefix 101 and registered pattern 100 is added to a bucket of hash table 104 where the hash value 103 indicates. In this case, registered pattern 100 is separated into prefix 101 and suffix 102, and these are stored in hash table 104. When hash table 104 has a plurality of registered patterns 100 whose prefix 101 is common and suffix 102 is different, those suffixes 102 are connected in descending order of length as a linked list.

A search procedure when "VWXYZABCD" is given as search key 110 is shown in FIG. 29.

First, search key 110 is divided into prefix 111 and suffix 112 similar to the operation at the time of registration, and "VWXYZABC" of prefix 111 of 8 characters and "D" of suffix 112 of 1 character are obtained.

Next, hash value 113 is obtained by applying a hash function to prefix 111. This hash function is identical with one used at the time of registration. After that, it is examined whether or not one or more registered pattern 100 is stored in a bucket of hash table 104 where the hash value 113 indicates. Hash value 113 at this time is 2 and the bucket corresponding to it is empty. Accordingly, it is found that registered pattern 100 starting from "VWXYZABC" does not exist in the database.

Next, dividing position which divides prefix 111 and suffix 112 moves for N characters (N=4) to the left. In other words, prefix 111 is shortened by 4 characters and suffix 112 is lengthened by 4 characters. New prefix 111 is "VWXY" and new suffix 112 is "ZABCD".

Next, after hash value 113 is obtained by applying the hash function to prefix 111, it is examined whether or not one or more registered pattern 100 is stored in a bucket of hash table 104 where the hash value 113 indicates. Hash value 113 at this time is 3 and "VWXYZ" of registered pattern 100 is stored in the bucket corresponding to it. When registered pattern 100 and search key 110 are matched, "VWXYZ" of registered pattern 100 matches with the first part of "VWXYZABCD" of search key 110. Accordingly, "VWXYZ" is a result of the longest prefix match search.

CITATION LIST

Patent Literature

Patent literature 1: Japanese Patent Application Laid-Open No. 2005-165598

BRIEFS SUMMARY OF INVENTION

Technical Problem

The above-mentioned related technology example has two problems.

The first problem is that a lot of processing required before failure of a search is determined, in case the search fails, that is, when registered pattern 100 whose prefix matches with search key 110 is not registered in the database.

The second problem is that a search speed is decreased, when there are a lot of registered patterns 100 with common prefix 101.

The first problem of the related technology example is derived from the search method easily.

As mentioned above, search key 110 is divided into prefix 111 and suffix 112 at the time of the search. The length of prefix 111 at the first time is the number of characters of a multiple of predetermined value N and is the largest length which does not exceed the length of search key 110.

After hash value 113 is obtained by applying a hash function to prefix 111 and when registered pattern 100 whose prefix matches with search key 110 is not found, as a result of a bucket of hash table 104 which the hash value 113 indicates being checked, the length of prefix 111 is shortened by N characters. This process is repeated until registered pattern 100 whose prefix matches with search key 110 is found or the length of prefix 111 is 0. In particular, in case registered pattern 100 whose prefix matches with search key 110 is not registered in the database, this process is repeated until the length of prefix 111 is 0.

In other words, the related technology example doesn't enable to know the failure of the search until above-mentioned process is repeated (length of search key 110/N) times (fractions rounded off). For example, when the length of search key 110 is 100 characters and N is 4, 25 times of repetitions are needed until the search finishes and failure is determined.

Above-mentioned process includes a process accompanied by memory access such as a search of hash table 104. Generally speaking, in a present computer, the time cost for memory access is larger than one for pure calculation. Accordingly, the first problem of the related technology example indicated here is not undersized.

The second problem of the related technology example is described using FIG. 30. FIG. 30 indicates a state when 9 registered patterns 100 of which prefix 101 is all common and suffix 102 is different each other are registered in a database. At this time, because all prefixes 101 are common, collision of hash value 103 occurs and a linked list of suffix 102 is built in hash table 104.

Here, when "ABCDX" is given, for example, as search key 110, then matching of suffix 102 in the linked list with "X" is carried out total of 9 times. In other words, the related technology example doesn't enable to enjoy a benefit of hash at all and remains a speed of a search of all items lower.

Database in which a lot of registered patterns 100 having common prefix 101 are included is not unusual. An address database is a typical example. For example, like "X prefecture Y city", "X prefecture Z city" and "X prefecture W city", there are cases only prefix "X prefecture" is common.

In the related technology example, it is possible to lower probability that prefix 101 is common by setting smaller numerical value of N which is an interval of a dividing position. As a result, an average length of a linked list in hash table 104 becomes shorter and processing time per one search of hash table 104 decreases. In particular, when N is set to 1, because the length of suffix 102 is always 0 and prefix 101 and registered pattern 100 is completely identical, collision probability of hash value 103 becomes very small.

However, even if N is set smaller, total of the search speed is not improved. The reason is as follows. For example, suppose the length of search key 110 is 13 characters. Then, if N=4, it is enough to evaluate only three cases of the length of prefix 111: 12 characters, 8 characters and 4 characters. However, if N=2, it is necessary to evaluate six cases of the length of prefix 111: 12 characters, 10 characters, . . . , 2 characters. That is, as search frequency of hash table 104 increases in inverse proportion to reduction rate of N, even if N is set smaller, search speed does not improve as a result. Accordingly, in the related technology example, it is impossible to adjust N and improve total of the search speed.

The present invention has been made in view of the above-mentioned circumstances, and in a longest prefix or suffix match search, has the object to provide a search device, a search method and a program which improve total of the search speed by making collision probability of hash value small and can determine failure of the search at high speed.

Solution to Problem

In order to achieve the object, as a first mode, a search device of the present invention is characterized by: generating one or more set including a first character string and a second character string by dividing a character string inputted as a registered pattern; obtaining a plurality of hash values by applying a plurality of hash functions to the first character string, determining an offset corresponding to a length of the second character string, and calculating a plurality of numerical values by applying a predetermined operation to the plurality of hash values and the offset; and treating the plurality of calculated numerical values as a plurality of addresses in a vector and updating each content corresponding to the plurality of addresses to a numerical value which is different from an initial value.

As a second mode, a search device of the present invention is characterized by: generating one or more set including a first character string and a second character string by dividing a character string inputted as a search key; obtaining a plurality of hash values by applying a plurality of hash functions to the first character string and calculating a plurality of numerical values by applying a predetermined operation to the plurality of hash values and an offset; treating the plurality of numerical values which are calculated as a plurality of addresses in a vector, and calculating a sum of a length corresponding to the offset and a length of the first character string as a length of a matching candidate in case all of contents corresponding to the plurality of addresses are different from initial values; and extracting a partial character string of a length which is equal to the length of the matching candidate from any one of beginning and end of the search key and determining whether the partial character string which is extracted is registered.

As a third mode, a search device of the present invention is a search device which carries out a longest prefix match search based on registered patterns and a search key which are character strings, and characterized by including: a dividing position list which stores a plurality of dividing positions for dividing a character string; a vector which is an array of numerical values; a hash table which stores the registered patterns; a first prefix extraction unit which selects one largest dividing position which does not exceed a length of an inputted registered pattern from the dividing position list, extracts a prefix from the inputted registered pattern with the selected dividing position as a boundary, and obtains a suffix length by subtracting the length of the prefix from the length of the inputted registered pattern; a first hash execution unit which calculates a plurality of hash values by applying a plurality of hash functions to the prefix extracted by the first prefix extraction unit; a vector update unit which calculates a plurality of numerical values by adding the plurality of hash values calculated by the first hash execution unit and the suffix length, treats the plurality of numerical values which are calculated as a plurality of addresses in the vector, and updates each content corresponding to the plurality of addresses to a numerical value which is different from an initial value; a hash table registration unit which stores the inputted registered pattern in the hash table; a second prefix extraction unit which selects a dividing position which does not exceed a length of an inputted search key in descending order from the dividing position list and extracts one or more prefix from the inputted search key with the selected dividing position as a boundary; a second hash execution unit which calculates a plurality of hash values by applying a plurality of the same hash functions as used by the first hash execution unit to the prefix extracted by the second prefix extraction unit; a pattern length estimation unit which calculates a plurality of numerical values by adding the plurality of hash values calculated by the second hash execution unit and an offset, treats the plurality of numerical values which are calculated as a plurality of addresses in the vector, and calculates a sum of a length of the prefix extracted by the second prefix extraction unit and the offset as a length of a matching candidate in case all of contents corresponding to the plurality of addresses are different from initial values; and a hash table search unit which extracts a character string which is equal to a length of a matching candidate calculated by the pattern length estimation unit from the beginning of the inputted search key and searches the hash table for a registered pattern which matches exactly with the character string which is extracted.

As a fourth mode, a search device of the present invention is a search device which carries out a longest prefix match search based on registered patterns and a search key which are character strings, and characterized by including: a vector which is an array of numerical values; a hash table which stores the registered patterns; a first prefix extraction unit which extracts one or more prefix with a length of a multiple of a predetermined number of characters from an inputted registered pattern and obtains a suffix length by subtracting a length of the prefix from a length of the inputted registered pattern; a first hash execution unit which calculates a plurality of hash values by applying a plurality of hash functions to the prefix extracted by the first prefix extraction unit; a correspondence table in which a relation between a length and an offset is recorded; an offset decision unit which determines a first offset from the suffix length by referring to the correspondence table in which the relation between the length and the offset is recorded; a vector update unit which calculates a plurality of numerical values by applying a predetermined operation to the plurality of hash values calculated by the first hash execution unit and the first offset determined by the offset decision unit, treats the plurality of numerical values which are calculated as a plurality of addresses in the vector, and updates each content corresponding to the plurality of addresses to a numerical value which is different from an initial value; a hash table registration unit which stores the inputted registered pattern in the hash table; a second prefix extraction unit which extracts a prefix with the length of the multiple of the predetermined number of characters from an inputted search key in ascending order of its length; a second hash execution unit which calculates a plurality of hash values by applying a plurality of the same hash functions as used by the first hash execution unit to the prefix extracted by the second prefix extraction unit; a pattern length estimation unit which calculates a plurality of numerical values by applying a predetermined operation to the plurality of hash values calculated by the second hash execution unit and the second offset for each of the second offset which is defined by the correspondence table in which the relation between the length and the offset is recorded, treats the plurality of numerical values which are calculated as a plurality of addresses in the vector, and calculates a sum of a length of the prefix extracted by the second prefix extraction unit and a length corresponding to the second offset as a length of a matching candidate in case all of contents corresponding to the plurality of addresses are different from initial values; and a hash table search unit which extracts a character string which is equal to a length of a matching candidate calculated by the pattern length estimation unit from beginning of the inputted search key and searches the hash table for a registered pattern which matches exactly with the character string which is extracted.

As a fifth mode, a search device of the present invention is a search device which carries out a longest suffix match search based on registered patterns and a search key which are character strings, and characterized by including: a dividing position list which stores a plurality of dividing positions for dividing a character string; a vector which is an array of numerical values; a hash table which stores the registered patterns; a first suffix extraction unit which selects one largest dividing position which does not exceed a length of an inputted registered pattern from the dividing position list, extracts a suffix from the inputted registered pattern with the selected dividing position as a boundary, and obtains a prefix length by subtracting the length of the suffix from the length of the inputted registered pattern; a first hash execution unit which calculates a plurality of hash values by applying a plurality of hash functions to the suffix extracted by the first suffix extraction unit; a vector update unit which calculates a plurality of numerical values by adding the plurality of hash values calculated by the first hash execution unit and the prefix length, treats the plurality of numerical values which are calculated as a plurality of addresses in the vector, and updates each content corresponding to the plurality of addresses to a numerical values which is different from an initial value; a hash table registration unit which stores the inputted registered pattern in the hash table; a second suffix extraction unit which selects a dividing position which does not exceed a length of an inputted search key in descending order from the dividing position list and extracts one or more suffix from the inputted search key with the selected dividing position as a boundary; a second hash execution unit which calculates a plurality of hash values by applying a plurality of the same hash functions as used by the first hash execution unit to the suffix extracted by the second suffix extraction unit; a pattern length estimation unit which calculates a plurality of numerical values by adding the plurality of hash values calculated by the second hash execution unit and an offset, treats the plurality of numerical values which are calculated as a plurality of addresses in the vector, and calculates a sum of a length of the suffix extracted by the second suffix extraction unit and the offset as a length of a matching candidate in case all of contents corresponding to the plurality of addresses are different from initial values; and a hash table search unit which extracts a character string which is equal to a length of a matching candidate calculated by the pattern length estimation unit from the end of the inputted search key and searches the hash table for a registered pattern which matches exactly with the character string which is extracted.

As a sixth mode, a search device of the present invention is a search device which carries out a longest suffix match search based on registered patterns and a search key which are character strings, and characterized by including: a vector which is an array of numerical values; a hash table which stores the registered patterns; a first suffix extraction unit which extracts one or more suffix with a length of a multiple of a predetermined number of characters from an inputted registered pattern and obtains a prefix length by subtracting a length of the suffix from a length of the inputted registered pattern; a first hash execution unit which calculates a plurality of hash values by applying a plurality of hash functions to the suffix extracted by the first suffix extraction unit; a correspondence table in which a relation between a length and an offset is recorded; an offset decision unit which determines a first offset from the prefix length by referring to the correspondence table in which the relation between the length and the offset is recorded; a vector update unit which calculates a plurality of numerical values by applying a predetermined operation to the plurality of hash values calculated by the first hash execution unit and the first offset determined by the offset decision unit, treats the plurality of numerical values which are calculated as a plurality of addresses in the vector, and updates each content corresponding to the plurality of addresses to a numerical value which is different from an initial value; a hash table registration unit which stores the inputted registered pattern in the hash table; a second suffix extraction unit which extracts a suffix with the length of the multiple of the predetermined number of characters from an inputted search key in ascending order of its length; a second hash execution unit which calculates a plurality of hash values by applying a plurality of the same hash functions as used by the first hash execution unit to the suffix extracted by the second suffix extraction unit; a pattern length estimation unit which calculates a plurality of numerical values by applying a predetermined operation to the plurality of hash values calculated by the second hash execution unit and the second offset for each of the second offset which is defined by the correspondence table in which the relation between the length and the offset is recorded, treats the plurality of numerical values which are calculated as a plurality of addresses in the vector, and calculates a sum of a length of the suffix extracted by the second suffix extraction unit and a length corresponding to the second offset as a length of a matching candidate in case all of contents corresponding to the plurality of addresses are different from initial values; and a hash table search unit which extracts a character string which is equal to a length of a matching candidate calculated by the pattern length estimation unit from the end of the inputted search key and searches the hash table for a registered pattern which matches completely with the character string which is extracted.

As a first mode, a search method of the present invention is characterized by: generating one or more set including a first character string and a second character string by dividing a character string inputted as a registered pattern; obtaining a plurality of hash values by applying a plurality of hash functions to the first character string, determines an offset corresponding to a length of the second character string, and calculates a plurality of numerical values by applying a predetermined operation to the plurality of hash values and an offset; and treating the plurality of numerical values which are calculated as a plurality of addresses in a vector and updates each content corresponding to the plurality of addresses to a numerical value which is different from an initial value.

As a second mode, a search method of the present invention is characterized by: generating one or more set including a first character string and a second character string by dividing a character string inputted as a search key; obtaining a plurality of hash values by applying a plurality of hash functions to the first character string and calculates a plurality of numerical values by applying a predetermined operation to the plurality of hash values and an offset; treating the plurality of numerical values which are calculated as a plurality of addresses in a vector, and calculate a sum of a length corresponding to the offset and a length of the first character string as a length of a matching candidate in case all of contents corresponding to the plurality of addresses are different from initial values; and a step which extracts a partial character string of a length which is equal to the length of the matching candidate from any one of beginning and end of the search key and determines whether the partial character string which is extracted is registered.

As a first mode, a storage medium of the present invention is storing thereon a program product causing a computer to execute steps of: processing which generates one or more set including a first character string and a second character string by dividing a character string inputted as a registered pattern; processing which obtains a plurality of hash values by applying a plurality of hash functions to the first character string, determines an offset corresponding to a length of the second character string, and calculates a plurality of numerical values by applying a predetermined operation to the plurality of hash values and the offset; and processing which treats the plurality of numerical values which are calculated as a plurality of addresses in a vector and updates each content corresponding to the plurality of addresses to a numerical value which is different from an initial value.

As a second mode, a storage medium of the present invention is storing thereon a program product causing a computer to execute steps of: processing which generates one or more set including a first character string and a second character string by dividing a character string inputted as a search key; processing which obtains a plurality of hash values by applying a plurality of hash functions to the first character string and calculates a plurality of numerical values by applying a predetermined operation to the plurality of hash values and an offset; processing which treats the plurality of numerical values which are calculated as a plurality of addresses in a vector, and calculates a sum of a length corresponding to the offset and a length of the first character string as a length of a matching candidate in case all of contents corresponding to the plurality of addresses are different from initial values; and processing which extracts a partial character string of a length equal to the length of the matching candidate from beginning or end of the search key and determines whether the partial character string which is extracted is registered.

Advantageous Effects of the Invention

The present invention can, in a longest prefix or suffix match search, improve total of the search speed by making collision probability of hash value small and determine failure of the search at high speed.

BRIEF DESCRIPTION OF DRAWINGS

FIG. 12 is an explanatory drawing showing a specific example of length-offset correspondence table 67 in registration unit 40.

FIG. 29 is an explanatory drawing of a related technology example showing a specific example which carries out a longest prefix match search using a hash table.

FIG. 30 is an explanatory drawing showing a problem of a related technology example.

DESCRIPTION OF EMBODIMENTS

Hereinafter, the embodiments for carrying out the present invention (hereinafter, referred to as an exemplary embodiment) are described in detail with reference to accompanying drawings. First, the first exemplary embodiment is described using FIGS. 1-10, and after that, the second exemplary embodiment is described using FIGS. 11-27.

The First Exemplary Embodiment

Figure 1:
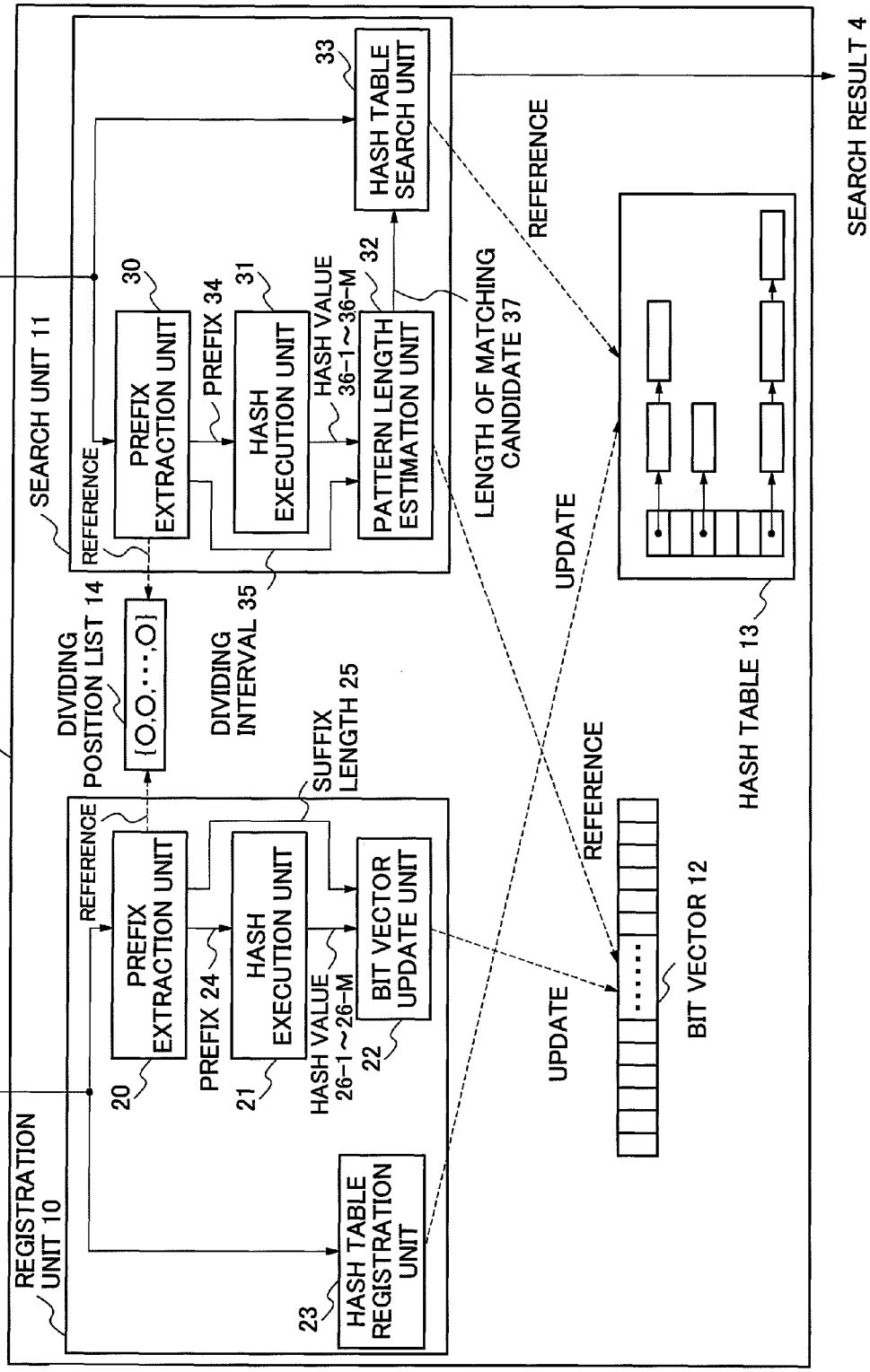
FIG. 1 is a block diagram according to one exemplary embodiment of the present invention showing an example of a structure which realizes a longest prefix match search.

FIG. 1 is a block diagram showing a structure of search device 1 which carries out a longest prefix match search to a character string.

In this exemplary embodiment, each character which constitutes a character string is not limited to the character that person can recognize and each character which constitutes a character string may be binary data. In order to represent 1 character, the required number of bits is not limited. Alternatively 1 character does not need to be represented by 1 byte.

Components of search device 1 are: registration unit 10 which registers registered pattern 2, search unit 11 which searches those longest prefix match with search key 3 from among one or more registered pattern 2 already registered, hash table 13 in which one or more registered pattern 2 is stored, bit vector 12 which is a source of estimating a length of registered pattern 2 having possibility that the registered pattern 2 is the longest prefix match with search key 3, and dividing position list 14 which determines the length of a prefix. Each of these units may be realized, as a hardware configuration, by a device such as a printed circuit board or a memory chip.

As a hardware configuration, for example, search device 1 may include: CPU (Central Processing Unit), ROM (Read Only Memory) which stores in advance fixed data such as a program which controls CPU (search program which is one exemplary embodiment of the present invention), RAM (Random Access Memory) which constitutes an area which stores various data temporarily, and a recording medium such as HDD (Hard Disk Drive). Therefore, registration unit 10 and search unit 11 may be realized by CPU, ROM and RAM. Also, hash table 13, bit vector 12 and dividing position list 14 may be realized by RAM or a recording medium.

Hash table 13 is used for an exact match search of registered pattern 2 in hash table search unit 33 within search unit 11 mentioned below. A data structure using a hash and an exact match search method is publicly known. Accordingly, hash table 13 can be realized easily by an existing hashing method. The contents of hash table 13 are empty in the initial state.

Bit vector 12 is a one dimensional array of a bit (numerical value) and initial values of the contents are all 0.

Registration unit 10 receives registered pattern 2 which is an unregistered character string as an input and registers the registered pattern 2 to bit vector 12 and hash table 13.

Components of registration unit 10 are: prefix extraction unit 20 which extracts a partial character string (part of a character string) which is a hash calculation target from registered pattern 2, hash execution unit 21 which calculates a plurality of hash values by applying a plurality of hash functions to the partial character string, bit vector update unit 22 which updates the contents of bit vector 12 which the hash value indicates, and hash table registration unit 23 which registers registered pattern 2 to hash table 13.

Prefix extraction unit 20 extracts a partial character string from the beginning of registered pattern 2 and outputs the partial character string to hash execution unit 21 as prefix 24. The length of this partial character string, that is, prefix 24, is determined uniquely based on the contents of dividing position list 14.

Dividing position list 14 is a set of natural numbers and each of the elements represents a candidate for the length of prefix 24. The length of prefix 24 is the largest element which does not exceed the length of registered pattern 2 among the elements included in dividing position list 14. For example, when dividing position list 14 is {10, 6, 3, 1}, and the length of registered pattern 2 is 7, the length of prefix 24 is 6.

There are four restrictions relating to the contents of dividing position list 14.

The first restriction is that the largest element in dividing position list 14 is equal to a numerical value which 1 is added to the maximum length of registered pattern 2 which registration unit 10 can process. For example, when dividing position list 14 is {10, 6, 3, 1}, the upper limit of the length of registered pattern 2 which registration unit 10 can process is 9 characters.

The second restriction is that the smallest element in dividing position list 14 is equal to the minimum length of registered pattern 2 which registration unit 10 can process. For example, when dividing position list 14 is {10, 6, 3, 1}, the lower limit of the length of registered pattern 2 which registration unit 10 can process is 1 character.

The third restriction is that the element of dividing position list 14 has to be different each other. For example, a set of {10, 6, 6, 1} is inappropriate as dividing position list 14.

The fourth restriction is that, in dividing position list 14, each element has to be arranged in descending order. This restriction is different from three points mentioned above, is not essential, and is a perfunctory one for simplifying the description.

After extracting prefix 24 based on dividing position list 14, prefix extraction unit 20 obtains suffix length 25 by subtracting the length of prefix 24 from the length of registered pattern 2 and outputs the suffix length to bit vector update unit 22. As above, because prefix extraction unit 20 divides registered pattern 2 into a prefix (the first character string) and a suffix (the second character string), it may also be called a registered pattern dividing unit or a suffix extraction unit.

Hash execution unit 21 obtains M hash values 26-1-26-M by applying M hash functions to prefix 24 and transmits them to bit vector update unit 22. Here, M is an integer not smaller than 2. In order to suppress collision of a hash, it is desirable that M hash functions generate hash values 26-1-26-M which do not correlate with each other.

Bit vector update unit 22 sets M bits in bit vector 12 to 1. The address of a bit which is set to 1 is determined based on hash values 26-1-26-M and suffix length 25. Details of operation of bit vector update unit 22 are described below.

Hash table registration unit 23 adds registered pattern 2 to hash table 13. In this case, a hash value is calculated by applying a hash function to all part of registered pattern 2. There is no relation between the hash functions used in hash table registration unit 23 and the hash functions used in hash execution unit 21.

Search unit 11 receives search key 3 which is a character string as an input, searches bit vector 12 and hash table 13 in order to specify registered pattern 2 whose longest prefix matches with search key 3, and outputs the result as search result 4.

Components of search unit 11 are: prefix extraction unit 30 which extracts one or more partial character string (part of a character string) which becomes a hash calculation target from search key 3, hash execution unit 31 which calculates a plurality of hash values by applying a plurality of hash functions to the partial character string, pattern length estimation unit 32 which estimates the length of registered pattern 2 which has possibility that the registered pattern 2 is the longest prefix match with search key 3 by referring to the contents of bit vector 12 which the hash value indicates, and hash table search unit 33 which extracts a partial character string equal to the estimated length from the beginning of search key 3, and determines whether or not hash table 13 has registered pattern 2 which matches exactly with the partial character string.

Prefix extraction unit 30 extracts a partial character string from the beginning of search key 3 and outputs the partial character string to hash execution unit 31 as prefix 34. The length of this partial character string, that is, prefix 34, is determined based on the contents of dividing position list 14.

The length of prefix 34 is equal to an element which does not exceed the length of search key 3 among the elements included in dividing position list 14. In case there are a plurality of elements which satisfy this condition, prefixes 34 of that number of the elements are outputted in descending order of length. For example, when dividing position list 14 is {10, 6, 3, 1}, and the length of search key 3 is 7, prefix 34 of 6 characters, prefix 34 of 3 characters and prefix 34 of 1 character are outputted in order, respectively.

Prefix extraction unit 30 calculates dividing interval 35 each time prefix 34 is extracted and outputs it to pattern length estimation unit 32. Calculation of dividing interval 35 is carried out by the following formula.

Dividing interval 35=$X$–(length of prefix 34)

X in the above-mentioned formula is the smallest element which is larger than the length of prefix 34 among the elements included in dividing position list 14. As above, because prefix extraction unit 30 divides search key 3 into a prefix (the first character string) and a dividing interval (suffix, the second character string), it may also be called a search key dividing unit or a suffix extraction unit.

For example, when dividing position list 14 is {10, 6, 3, 1} and if the length of prefix 34 is 6 characters, dividing interval 35 is 4 (=10–6), and if the length of prefix 34 is 3 characters, dividing interval 35 is 3 (=6–3).

Hash execution unit 31 obtains M hash values 36-1-36-M by applying M hash functions to prefix 34 and transmits them to pattern length estimation unit 32. The number of the hash functions, that is M, and the form of the hash functions have to be identical with those of hash execution unit 21 in registration unit 10.

Pattern length estimation unit 32 refers to the contents of M points in bit vector 12 which M hash values 36-1-36-M indicate and estimates the length of registered pattern 2 which has possibility that the registered pattern 2 is the longest prefix match with search key 3 by carrying out a predetermined operation to the obtained values. And pattern length estimation unit 32 outputs the estimated length to hash table search unit 33 as length of matching candidate 37. Details of operation of pattern length estimation unit 32 are described below.

Hash table search unit 33 extracts a partial character string with the length which is equal to length of matching candidate 37 from the beginning of search key 3 and treats the partial character string as matching candidate 53. After that, hash table search unit 33 searches hash table 13 and determines whether or not hash table 13 has registered pattern 2 which matches exactly with matching candidate 53. The hash function and the hash algorithm used by this search have to be identical with those stored in hash table registration unit 23 of registration unit 10. In case registered pattern 2 which matches exactly with matching candidate 53 is found, matching candidate 53 is outputted as search result 4. When registered pattern 2 which matches exactly with matching candidate 53 is not found, search result 4 indicating that the search is failed is outputted.

Next, operation of search device 1 which carries out a longest prefix match search to a character string is described.

Figure 2:
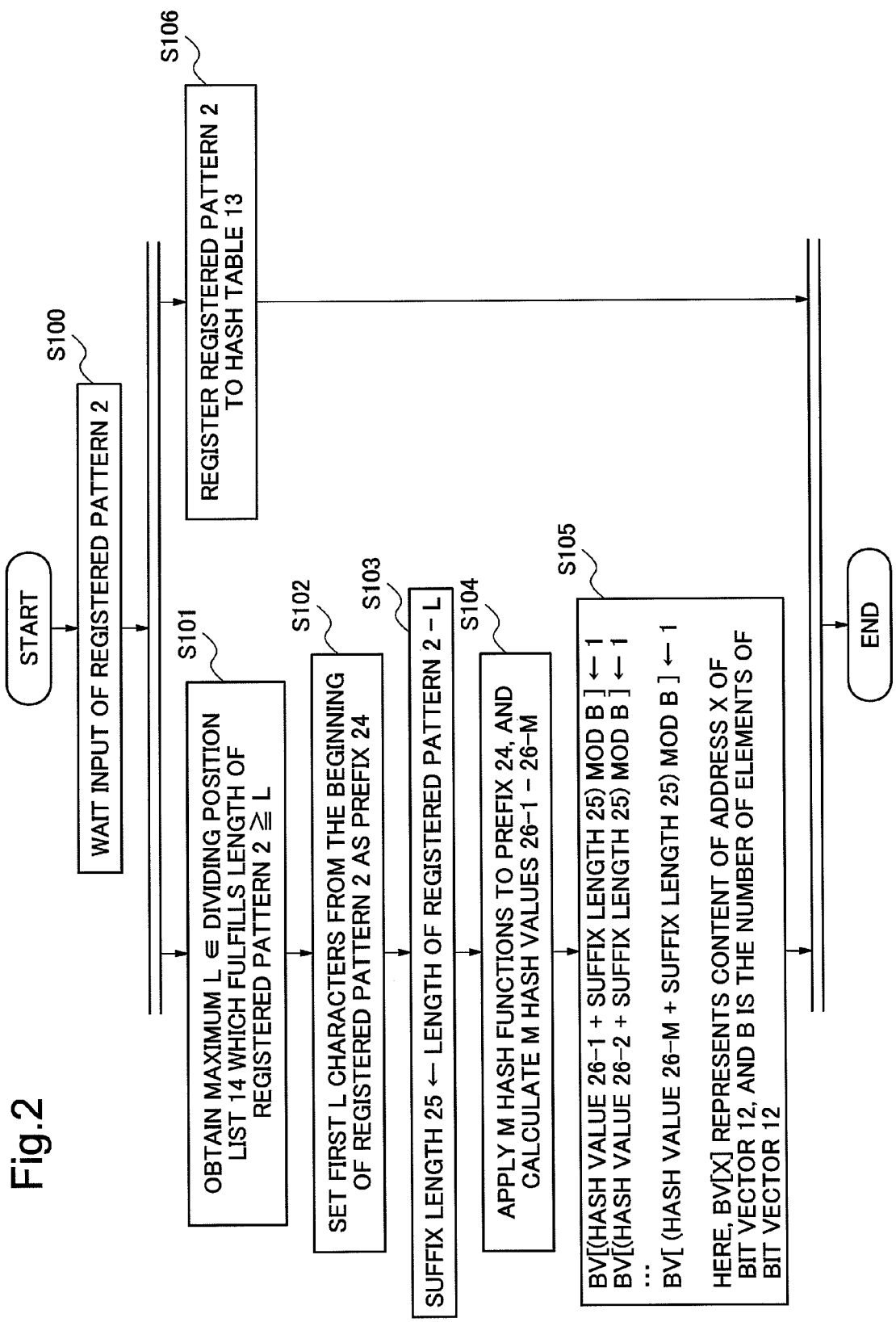
FIG. 2 is a flow chart showing an example of operation of registration unit 10.

First, registration unit 10 which registers registered pattern 2 is described. FIG. 2 is a flow chart illustrating operation of registration unit 10. By using a specific example of FIGS. 3-5 together, a flow chart of FIG. 2 is described.

Figure 3:
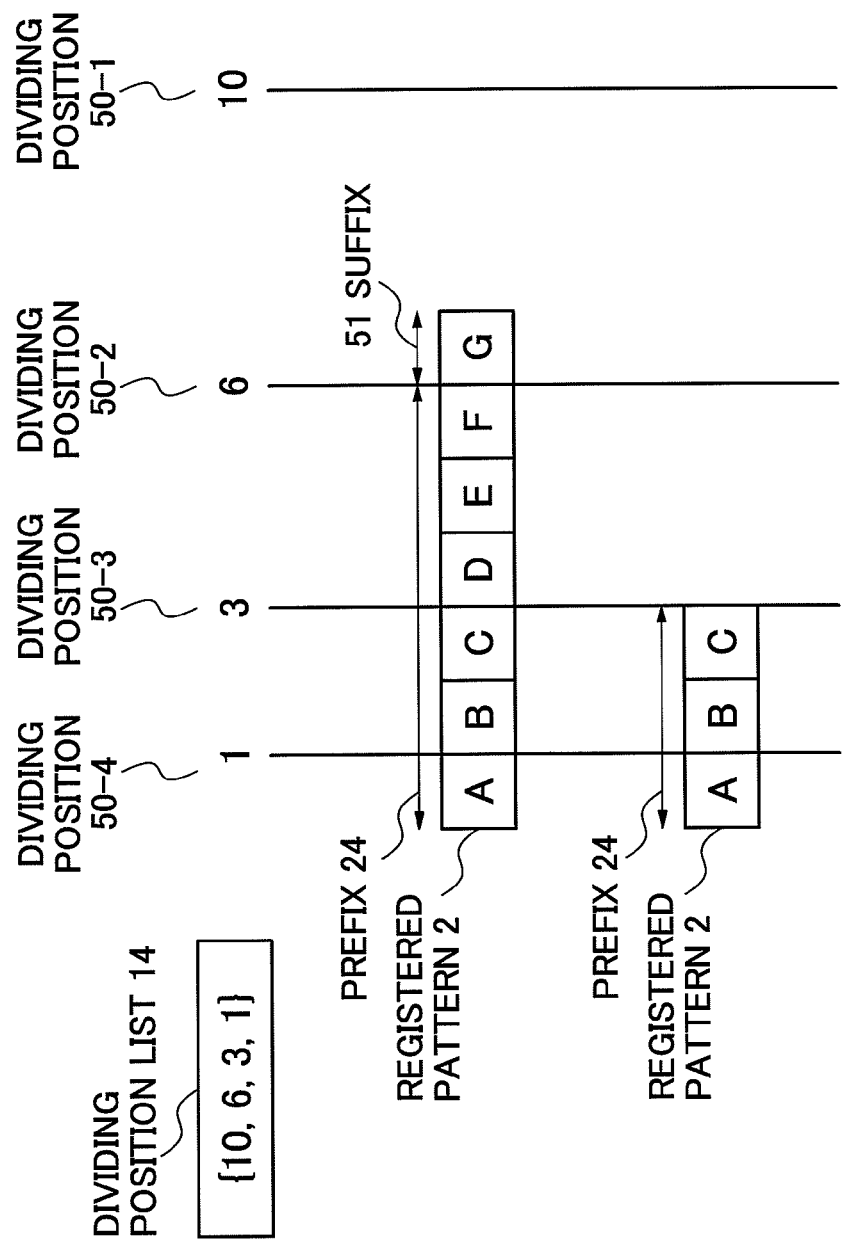
FIG. 3 is an explanatory drawing showing an example of operation of prefix extraction unit 20.

In this example, "ABCDEFG" and "XYZ" which are two registered patterns 2 shown in FIG. 3 are registered one by one to search device 1 in order. Also, the contents of dividing position list 14 are supposed to be {10, 6, 3, 1}.

Prefix extraction unit 20 and hash table registration unit 23 wait for an input of registered pattern 2 (Step S100). In this example, registered pattern 2 is 7 characters of "ABCDEFG".

After Step S100, processing in this example goes to Step S101 and Step S106. Steps S101-S105 and Step S106 can be carried out in parallel. Parallel execution is not indispensable. Also, steps S101-S105 have to be carried out serially in that order.

Operation of Steps S101-S105 is described.

Prefix extraction unit 20 determines L, that is, the length of prefix 24 (Step S101). As mentioned above, the length of prefix 24 is the largest element which does not exceed the length of registered pattern 2 among the elements included in dividing position list 14. In this example, as shown in FIG. 3 (top), because the length of registered pattern 2 is 7 characters, the length of prefix 24 is 6 characters. In this specification, for example, notation such as "FIG. 3 (top)" means "upper part of FIG. 3", and similarly, for example, notation such as "FIG. 3 (bottom)" means "lower part of FIG. 3".

Prefix extraction unit 20 extracts L characters from the beginning of registered pattern 2 and treats the partial character string as prefix 24 (Step S102). In this example, as shown in FIG. 3 (top), because the length of prefix 24 is 6 characters (L=6), prefix 24 is "ABCDEF".

Prefix extraction unit 20 obtains suffix length 25 by subtracting L from the length of registered pattern 2 (Step S103). In this example, suffix length 25 is 1 (=7−L=7−6).

Figure 4:
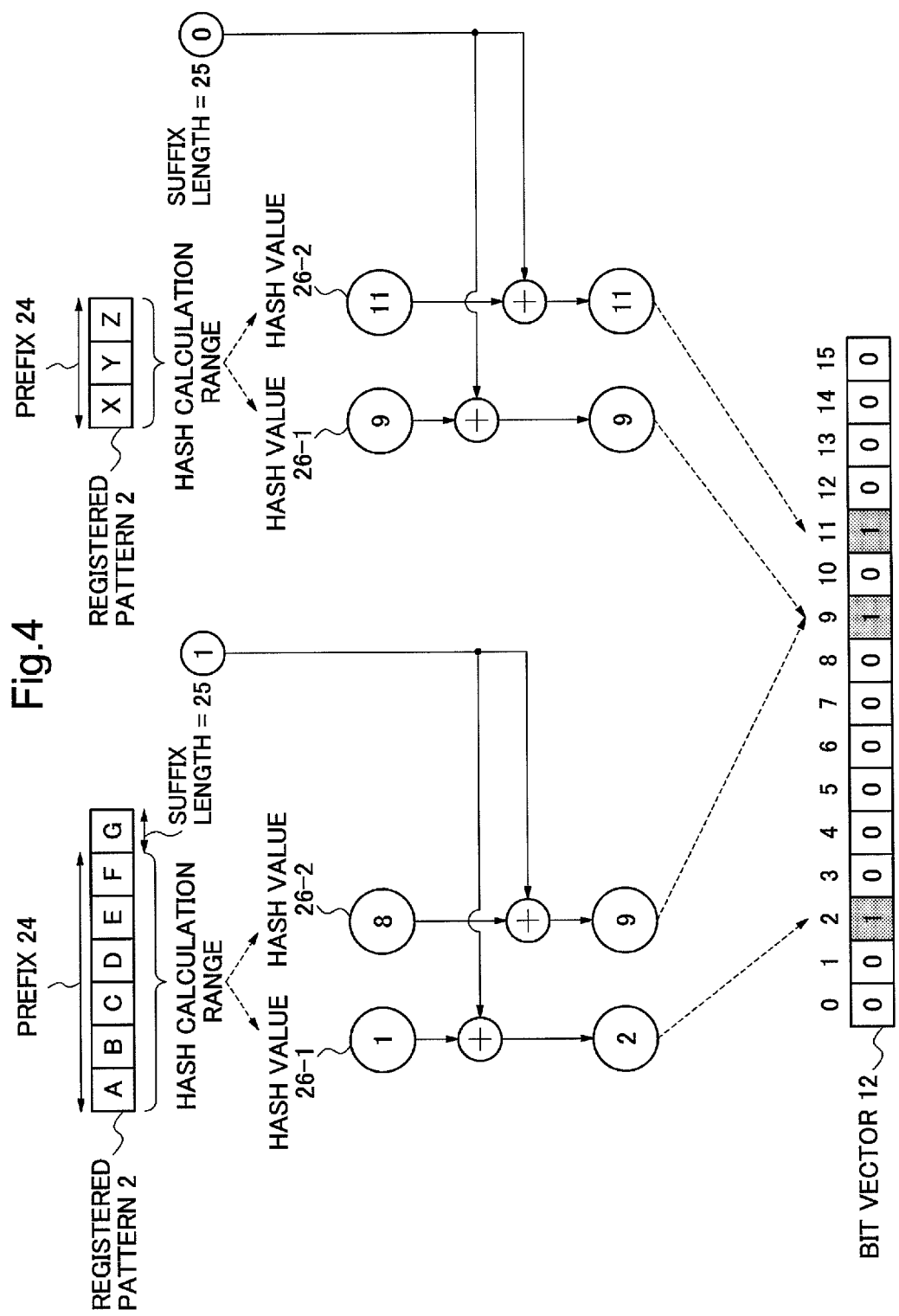
FIG. 4 is an explanatory drawing showing an example of operation of hash execution unit 21 and bit vector update unit 22.

Hash execution unit 21 calculates M hash values 26-1-26-M by applying M hash functions to prefix 24 (Step S104). In this example, as shown in FIG. 4 (left), it is supposed that number M of hash functions is 2 and it is assumed that hash values 26-1-26-2 calculated from "ABCDEF" of prefix 24 are 1 and 8 respectively. In this specification, for example, notation such as "FIG. 4 (left)" means "left part of FIG. 4", and similarly, for example, notation such as "FIG. 4 (right)" means "right part of FIG. 4".

Bit vector update unit 22 sets M bits in bit vector 12 to 1 (Step S105). Addresses of the bit to which 1 is set in bit vector 12 are: remainder of dividing the sum of hash value 26-1 and suffix length 25 by B, remainder of dividing the sum of hash value 26-2 and suffix length 25 by B, (omission), and remainder of dividing the sum of hash value 26-M and suffix length 25 by B, in total of M. Here, B is the number of elements of bit vector 12.

The reason why remainder is used is in order to avoid the situation that the sum of hash value 26-X ($1 \leq X \leq M$) and suffix length 25 exceeds the length of bit vector 12, and that the address to be set to 1 is outside the range of bit vector 12.

In this example, as shown in FIG. 4 (left), addresses to be set to 1 are 2 (=(1+1)mod 16) and 9 (=(8+1)mod 16).

Hash table registration unit 23 adds registered pattern 2 to hash table 13 (Step S106).

At the time both of processing of Step S105 and Step S106 have finished, registration of one registered pattern 2 is completed. In this example, registration of "ABCDEFG" of registered pattern 2 is completed at this time. Because registration of "XYZ" of another registered pattern 2 is carried out similar to the above-mentioned, the description is omitted here.

Figure 5:
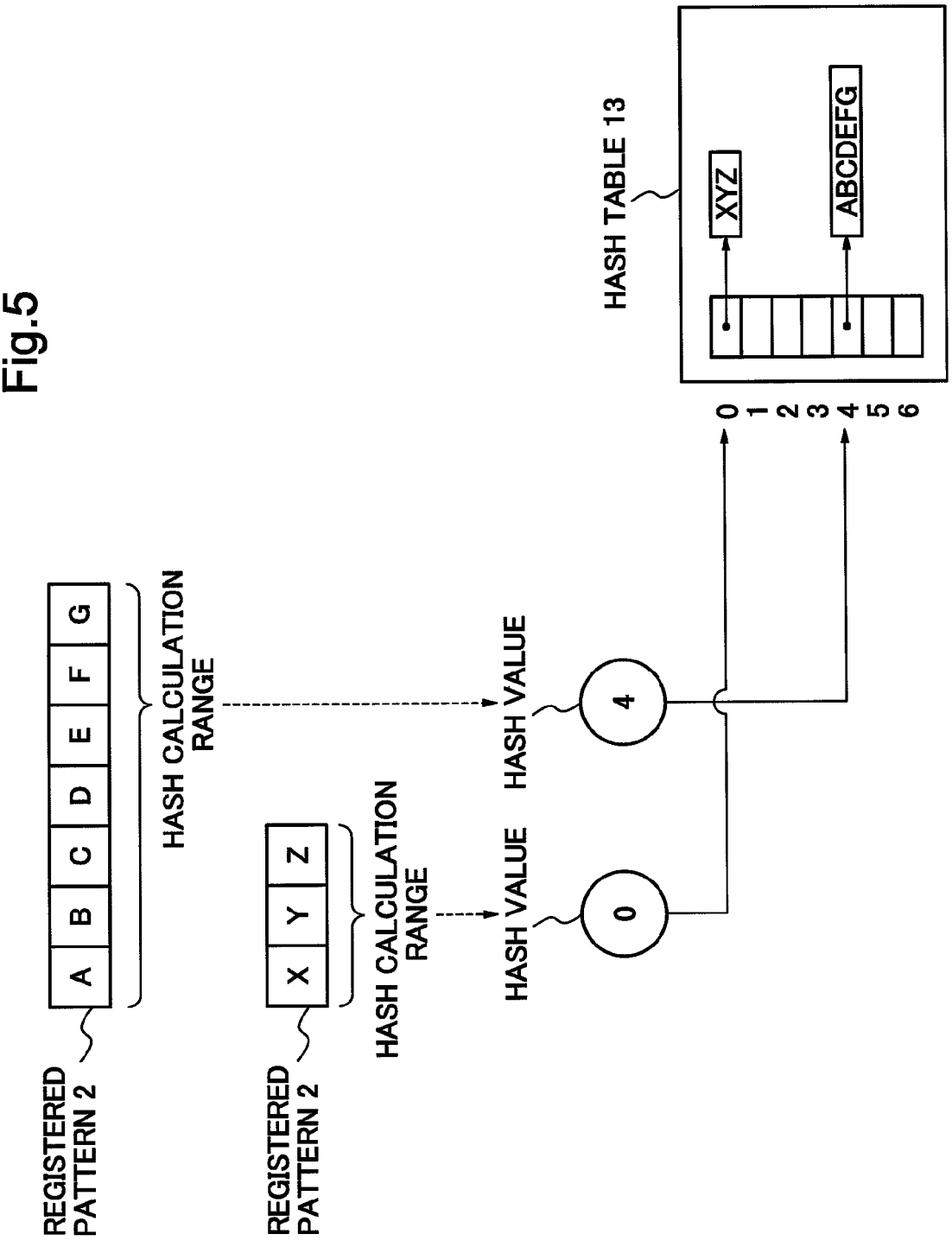
FIG. 5 is an explanatory drawing showing a specific example which registers a pattern to hash table 13.

An example of hash table 13 at the time when registration of "ABCDEFG" and "XYZ" which are two registered patterns 2 has completed is shown in FIG. 5 (bottom).

Figure 6:
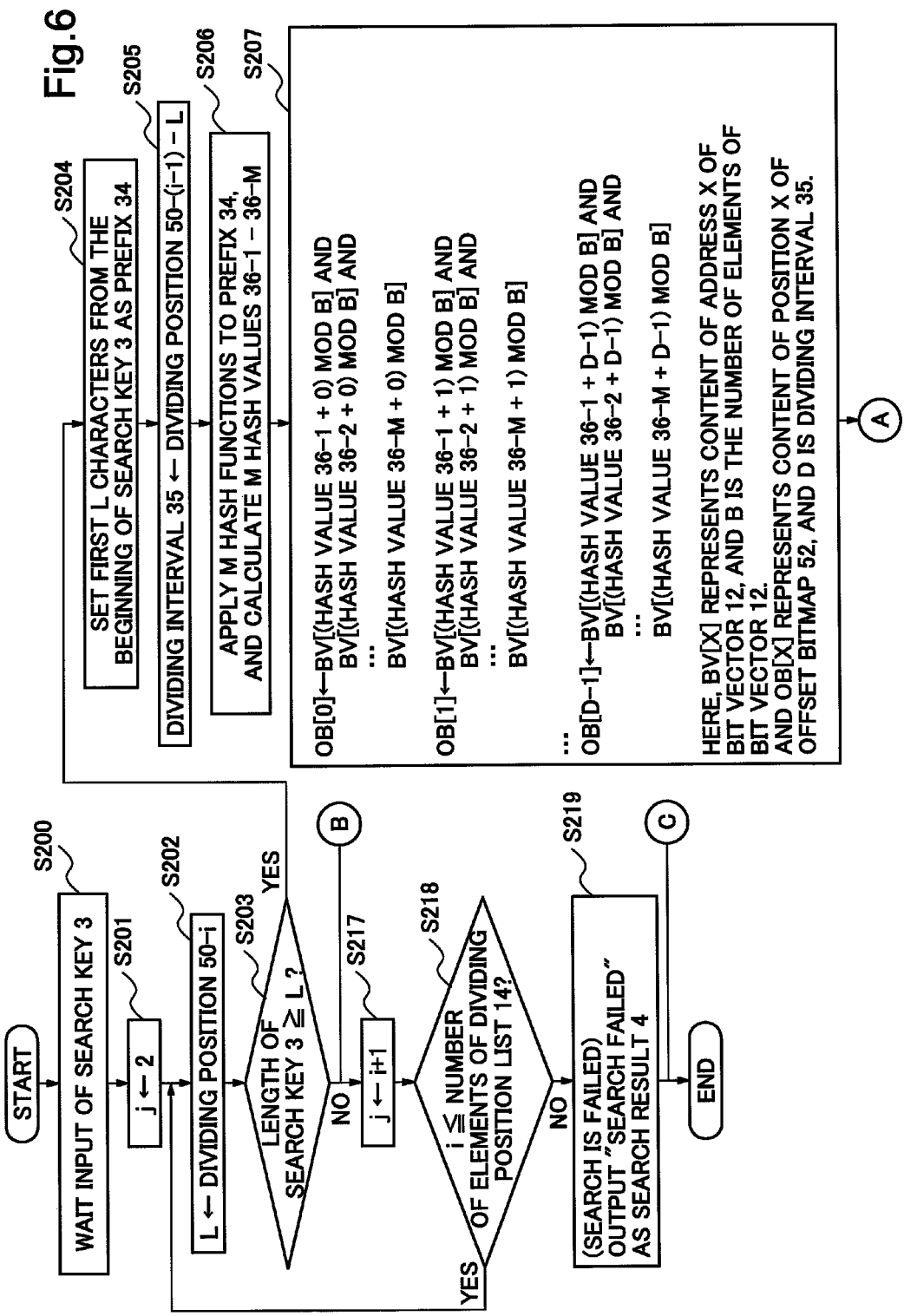
FIG. 6 is a flow chart showing an example of operation of search unit 11.
Figure 7:
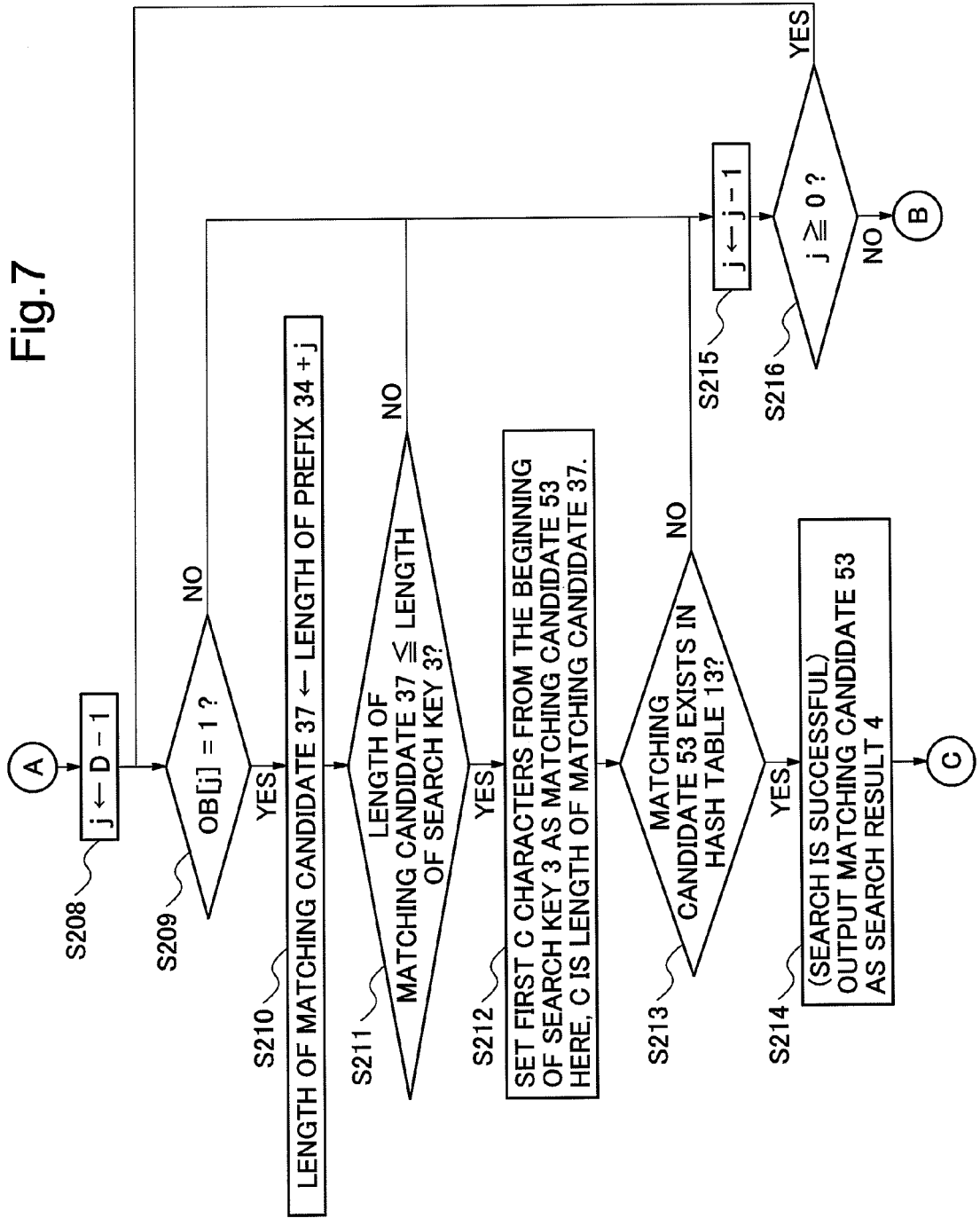
FIG. 7 is a flow chart showing an example of operation of search unit 11.

Next, operation of search unit 11 which specifies registered pattern 2 whose longest prefix matches with search key 3 is described. FIGS. 6-7 are flow charts illustrating operation of search unit 11. By using a specific example of FIGS. 8-9 together, flow charts of FIG. 6 and FIG. 7 are described in order.

In this example, it is assumed that "ABCDEFG" and "XYZ" which are two registered patterns 2 shown in FIG. 3 are registered. That is, it is supposed that the contents of bit vector 12 are set to the state of FIG. 4 (bottom) and the contents of hash table 13 are set to the state of FIG. 5 (bottom) respectively. Also, the contents of dividing position list 14 are {10, 6, 3, 1}. Each element of dividing position list 14 is written as dividing position 50-X ($X \geq 1$). Dividing position 50-1 corresponds to the first element of dividing position list 14, and in this example, dividing position 50-1 is 10.

Prefix extraction unit 30 and hash table search unit 33 wait for an input of search key 3 (Step S200). In this example, search key 3 is supposed to be "ABCDEFGH".

Prefix extraction unit 30 initializes loop counter "i" to 2. Loop counter "i" represents an index of dividing position 50 which is focused on at present (Step S201).

Prefix extraction unit 30 substitutes dividing position 50-$i$ for variable L (Step S202). Because i=2 at this time of this example, L=dividing position 50-2=6.

Prefix extraction unit 30 determines whether the length of search key 3 is not smaller than L (Step S203). When the condition is satisfied (Step S203/Yes), processing in this example branches to Step S204, and otherwise (Step S203/No), processing in this example branches to Step S217. At this time of this example, because the length of search key 3 is 8 and L=6, the condition is met (Step S203/Yes) and processing in this example branches to Step S204.

Prefix extraction unit 30 extracts L characters from the beginning of search key 3 and treats the partial character string as prefix 34 (Step S204). Because L=6 at this time of this example, prefix 34 is "ABCDEF".

Prefix extraction unit 30 obtains dividing interval 35 by subtracting L from dividing position 50-(I−1) (Step S205). At this time of this example, because i=2 and L=6, dividing interval 35=(dividing position 50-1)−6=10−6=4.

Figure 8:
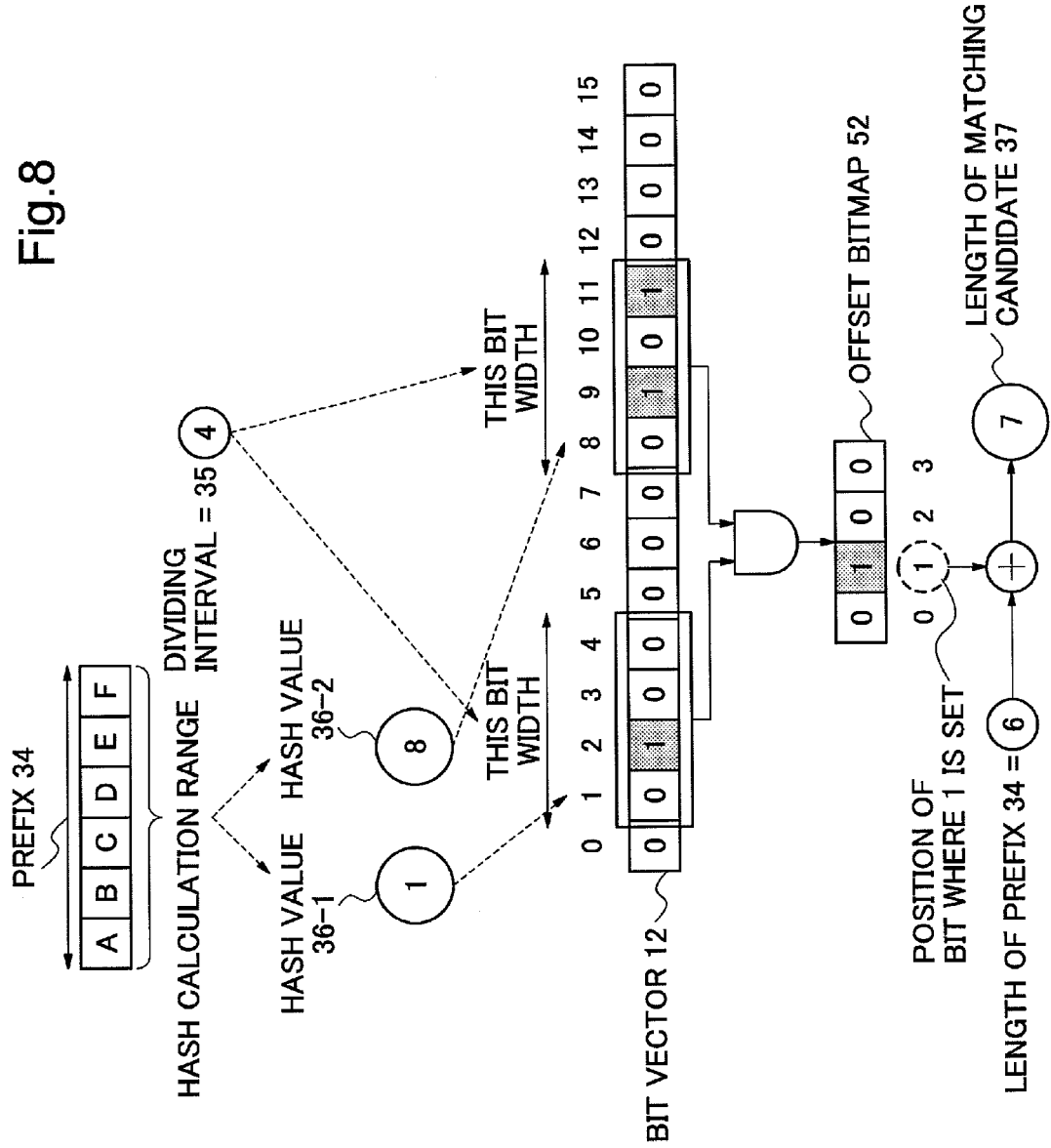
FIG. 8 is an explanatory drawing showing an example of operation of hash execution unit 31 and pattern length estimation unit 32.

Hash execution unit 31 calculates M hash values 36-1-36-M by applying M hash functions to prefix 34 (Step S206). In this example, as shown in FIG. 8 (top), hash values 36-1-36-2 calculated by "ABCDEF" of prefix 34 are 1 and 8 respectively.

Pattern length estimation unit 32 calculates offset bitmap 52 from bit vector 12, hash values 36-1-36-M and dividing interval 35 (Step S207). The effective bit width of offset bitmap 52 is equal to dividing interval 35. In this example, because dividing interval 35 is 4, the width of offset bitmap 52 is 4 bits.

A value of an (X+1)-th bit ($0 \leq X <$ dividing interval 35) from the left of offset bitmap 52 is a logical product of: the content of the address which is equal to the sum of hash value 36-1 and X in bit vector 12, the content of the address which is equal to the sum of hash value 36-2 and X in bit vector 12, (omission), and the content of the address which is equal to the sum of hash value 36-M and X in bit vector 12.

Here, in order that a referred address is not outside the range of bit vector 12, pattern length estimation unit 32 uses the remainder of dividing the sum of hash value 36 and X by the number of elements of bit vector 12 as an address of bit vector 12 to which pattern length estimation unit 32 accesses actually.

In this example, because hash values 36-1-36-2 are 1 and 8 respectively, as shown in FIG. 8 (bottom), offset bitmap 52 is a logical product of 4 bits from address "1" to address "4" and 4 bits from address "8" to address "11" of bit vector 12, that is, "0100".

Pattern length estimation unit 32 initializes loop counter "j" to the numerical value obtained by subtracting 1 from dividing interval 35 (Step S208). Loop counter "j" represents an index of the bit of offset bitmap 52 which is focused on at present. In this example, because dividing interval 35 is 4, j=3.

Pattern length estimation unit 32 determines whether or not a (j+1)-th bit from the left of offset bitmap 52 is 1 (Step S209). When it is 1 (Step S209/Yes), processing in this example branches to Step S210, and when it is 0 (Step S209/No), processing in this example branches to Step S215. At this time of this example, because offset bitmap 52="0100" and j=3, the fourth bit from the left of offset bitmap 52 is referred to. Because the value is 0 (Step S209/No), processing in this example branches to Step S215.

Pattern length estimation unit 32 subtracts 1 from loop counter "j" (Step S215). At this time of this example, j changes from 3 to 2.

Pattern length estimation unit 32 determines continuation of the loop corresponding to loop counter "j" (Step S216). When j is not smaller than 0 (Step S216/Yes), processing in this example returns to Step S209, and otherwise (Step S216/No), processing in this example leaves the loop and transits to Step S217 of FIG. 6. At this time of this example, because j=2 (Step S216/Yes), the loop is continued and processing in this example returns to Step S209.

Because operation of Step S209 is already described, the description is omitted. At this time of this example, because offset bitmap 52="0100" and j=2, the third bit from the left of offset bitmap 52 is referred to by pattern length estimation unit 32. Because the value is 0 (Step S209/No), processing in this example branches to Step S215.

Pattern length estimation unit 32 subtracts 1 from loop counter "j" (Step S215). At this time of this example, j changes from 2 to 1.

Because operation of Step S216 is already described, the description is omitted. At this time of this example, because j=1 (Step S216/Yes), the loop is continued and processing in this example returns to Step S209.

Because operation of Step S209 is already described, the description is omitted. At this time of this example, because offset bitmap 52="0100" and j=1, the second bit from the left of offset bitmap 52 is referred to by pattern length estimation unit 32. Because the value is 1 (Step S209/Yes), processing in this example branches to Step S210 this time.

Pattern length estimation unit 32 treats the sum of the loop counter "j" and the length of prefix 34 as length of matching candidate 37 (Step S210). At this time of this example, prefix 34 is "ABCDEF" and the length is 6. Also, because j=1, length of matching candidate 37 is 7 (=6+1).

Hash table search unit 33 determines whether or not length of matching candidate 37 is not larger than the length of search key 3 (Step S211). When the condition is met (Step S211/Yes), processing in this example branches to Step S212, and otherwise (Step S211/No), processing in this example branches to Step S215. At this time of this example, because length of matching candidate 37 is 7 and the length of "ABCDEFGH" of search key 3 is 8, the condition of this step is satisfied (Step S211/Yes) and processing in this example branches to Step S212.

Hash table search unit 33 extracts a partial character string of the number of characters which is equal to length of matching candidate 37 from the beginning of search key 3 and treats the partial character string as matching candidate 53 (Step S212). At this time of this example, because length of matching candidate 37 is 7 and search key 3 is "ABCDEFGH", matching candidate 53 becomes the seven leading characters, "ABCDEFG".

Hash table search unit 33 searches hash table 13 and determines whether or not registered pattern 2 which matches exactly with matching candidate 53 exists in hash table 13 (Step S213). When it exists (Step S213/Yes), processing in this example branches to Step S214, and otherwise (Step S213/No), processing in this example branches to Step S215. At this time of this example, matching candidate 53 is "ABCDEFG" and the contents of hash table 13 are in the state of FIG. 5 (bottom). Because hash table 13 of FIG. 5 (bottom) has "ABCDEFG" which is registered pattern 2, the condition of this step is met (Step S213/Yes) and processing in this example branches to Step S214.

Hash table search unit 33 notifies that search is successful (Step S214). When this step is reached, matching candidate 53 is equal to registered pattern 2 whose longest prefix matches with search key 3. Accordingly, hash table search unit 33 outputs matching candidate 53 as search result 4. At this time of this example, because matching candidate 53 is "ABCDEFG", search result 4 is "ABCDEFG".

Step S214 is the final step at the time that the search is successful.

In this example mentioned above, because it was judged that search is successful during the execution of the first loop of loop counter "i" and search processing finished, Steps S217-S219 of FIG. 6 were never carried out. Below, operation of those steps is described.

Pattern length estimation unit 32 adds 1 to loop counter "i" (Step S217).

Pattern length estimation unit 32 determines continuation of the loop corresponding to loop counter "i" (Step S218). When i is not larger than the number of elements of dividing position list 14 (Step S218/Yes), processing in this example returns to Step S202, and otherwise (Step S218/No), processing in this example leaves the loop and transits to Step S219. In this example, because the contents of dividing position list 14 are {10, 6, 3, 1} and the number of elements is 4, when i is not larger than 4 (Step S218/Yes), the loop is continued.

Figure 9:
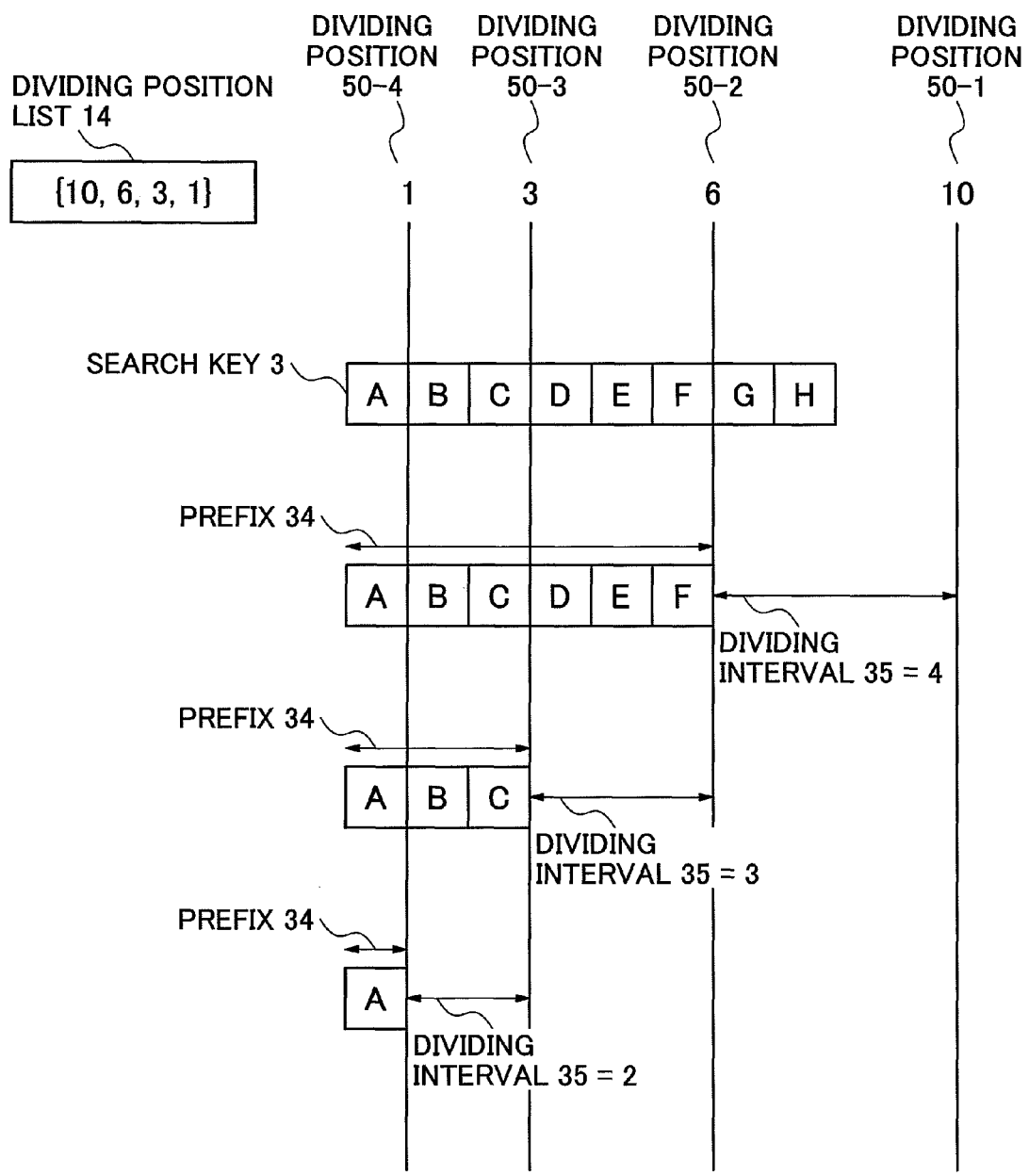
FIG. 9 is an explanatory drawing showing an example of operation of prefix extraction unit 30.

Whenever the loop corresponding to loop counter "i" is carried out repeatedly, the length of prefix 34 becomes shorter by 1 level. In this example, as shown in FIG. 9, because i=2 during the first loop, the length of prefix 34 is equal to dividing position 50-2 and is 6 characters. Because i=3 during the second loop, the length of prefix 34 is equal to dividing position 50-3 and is 3 characters. The reason why these evaluations are started from the longest prefix 34 is that a longest match search is performed.

Hash table search unit 33 notifies that the search is failed (Step S219). That this step is reached means that registered pattern 2 whose longest prefix matches with search key 3 does not exist. Accordingly, hash table search unit 33 outputs search result 4 meaning that the search is failed.

Step S219 is the final step at the time that the search is failed.

Above is details of a structure and operation of search device 1 of this exemplary embodiment. Details mentioned above can be summarized simply as follows.

In case of registration, search device 1 first selects one largest dividing position which does not exceed the length of registered pattern 2 from dividing positions list 14 which stores a plurality of dividing positions of registered pattern 2 or search key 3. And search device 1 divides registered pattern 2 into prefix 24 and a suffix with the dividing position as a boundary. Next, search device 1 obtains M hash values 26-1-26-M by applying M hash functions (M≧2) to prefix 24 and calculates M numerical values by adding suffix length 25 to each of hash values 26-1-26-M. Next, search device 1 treats those M numerical values as M address of bit vector 12 and sets the contents of the respective addresses to 1. Also, search device 1 registers registered pattern 2 to hash table 13.

In case of a search, search device 1 first selects a dividing position which does not exceed the length of search key 3 from dividing position list 14 in descending order and divides search key 3 into prefix 34 and a suffix with the dividing position as a boundary. Also, search device 1 treats the difference between the neighboring dividing positions as dividing interval 35. Next, search device 1 obtains M hash values 36-1-36-M by applying M hash functions to prefix 34 and calculates M numerical values by adding an offset of not smaller than 0 and smaller than dividing interval 35 to each of hash values 36-1-36-M. Next, search device 1 treats those M numerical values as M addresses of bit vector 12, and when all contents of these addresses are 1, search device 1 calculates the sum of the length of prefix 34 and the offset and treats the sum as length of matching candidate 37. Next, search device 1 extracts a partial character string of the length which is equal to length of matching candidate 37 from the beginning of search key 3 and determines whether the partial character string exists in hash table 13.

Below, advantages of this exemplary embodiment to the related technology example described in background art are described.

Although both of this exemplary embodiment and the related technology example store a registered pattern in a hash table, a calculation target of a hash value at that time is different between this exemplary embodiment and the related technology example.

Figure 28:
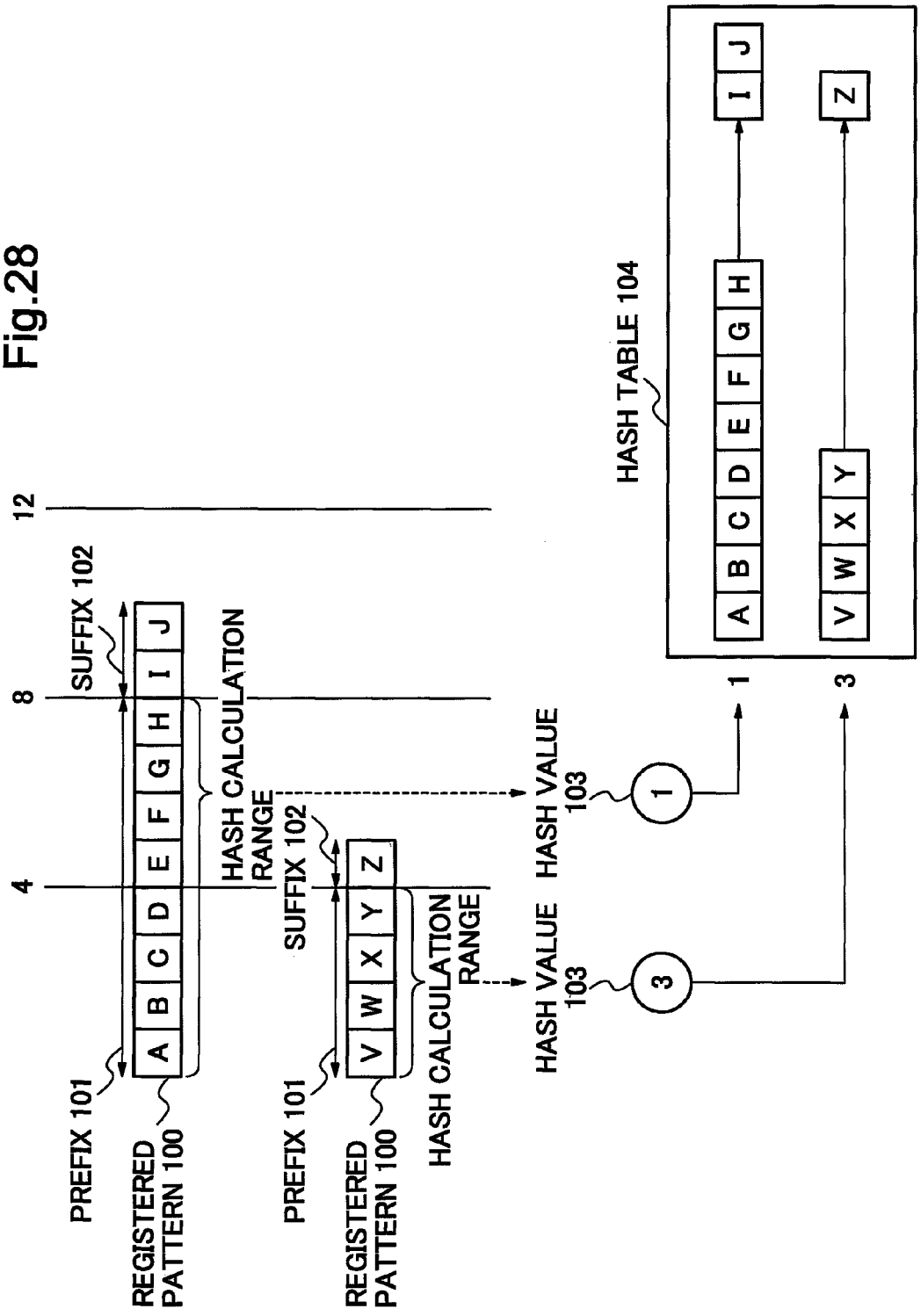
FIG. 28 is an explanatory drawing of a related technology example showing a specific example which registers a pattern to a hash table.

In the related technology example, as shown in FIG. 28, hash value 103 is calculated by applying a hash function to prefix 101 of registered pattern 100 and registered pattern 100 is stored in a bucket of hash table 104 corresponding to hash value 103.

On the other hand, in this exemplary embodiment, as shown in FIG. 5, a hash value is calculated by applying a hash function to all part of registered pattern 2 and registered pattern 2 is stored in a bucket of hash table 13 corresponding to the hash value.

In the related technology example, a calculation target of a hash value is limited to prefix 101. Therefore, when there are a lot of registered patterns 100 of which prefix 101 is common and suffix 102 is different, in the related technology example, collision of hash value 103 occurs frequently in hash table 104 and a long linked list is built. For example, the linked list is in the state as shown in FIG. 30. In a hashing method, as is known widely, collision probability of a hash value or an average length of a linked list influences a speed of registration and a search greatly.

On the other hand, according to this exemplary embodiment, a calculation target of a hash value is all part of registered pattern 2. Therefore, according to this exemplary embodiment, even if there are a lot of registered patterns 2 of which prefix 24 is common and suffix 51 is different, probability that collision of a hash value occurs frequently in hash table 13 is very small. The reason is that a portion of suffix 51 is also included in a calculation target of a hash value, thus the hash value tends to be distributed uniformly without bias.

Now, according to this exemplary embodiment, bit vector 12 needs to be updated at the time of registration and also bit vector 12 needs to be referred to for calculation of offset bitmap 52 at the time of a search. These processing are not included in the related technology example. Their amounts of processing are described.

Bit vector 12 is updated at Steps S101-S105 of a flow chart of FIG. 2 and offset bitmap 52 is calculated at Steps S204-S207 of a flow chart of FIG. 6. As is clear from the contents of processing, regardless of whether or not there are a lot of registered patterns of which a prefix is common and a suffix is different, these amounts of processing are almost constant.

Therefore, in contrast to the fact that the performance of the related technology example tends to be influenced by the distribution of a shape of registered pattern 2, search device 1 according to this exemplary embodiment has an advantage that it undergoes almost no such influence and shows stable performance.

As mentioned above, in a longest prefix or suffix match search, this exemplary embodiment can improve total of the search speed by reducing the collision probability of a hash value. The reason is as follows. Because this exemplary embodiment estimates the length of a registered pattern which has possibility that the registered pattern is the longest match with a search key beforehand and narrows down the number of patterns that should be matched with the search key, it is possible to decrease the reference frequency of a hash table compared with a case when the hash table is searched with no prior information. Also, because this exemplary embodiment can match directly a part of the search key with a registered pattern which is in the hash table, it is not necessary to separate the registered pattern into a prefix and a suffix and to register them in the hash table, and even if there are a lot of registered patterns with a common prefix, search speed is not decreased any more.

Although search device 1 according to this exemplary embodiment carries out a longest prefix match search, it can be applied to a longest suffix match search by a slight modification. Specifically, search device 1 becomes to function as a search device of a longest suffix match only by replacing the description which says " . . . X characters from the beginning . . . " by " . . . X characters from the end . . . " in three points: Step S102 of a flow chart of FIG. 2, Step S204 of a flow chart of FIG. 6 and Step S212 of a flow chart of FIG. 7. In case of the longest prefix match search mentioned above, a prefix was called as a first character string and a suffix was called as a second character string. In case of the longest suffix match search, a suffix may be called as a first character string and a prefix may be called as a second character string.

Each element of bit vector 12 of search device 1 may be a numerical value of multiple values, not a binary bit. In case each element of bit vector 12 of search device 1 is a multiple value, when bit vector 12 is updated in Step S105 of a flow chart of FIG. 2, the content of the address of a target is increased or decreased. For example, 1 is added. Also, when bit vector 12 is referred to in Step S207 of a flow chart of FIG. 6, a logical product is calculated by regarding bit vector 12 as bit "0" when the content of the address of the target is 0, and as bit "1" when the content of the address of the target is other than 0.

In place of hash table 13 of search device 1, other search means which can carry out an exact match search may be used. For example, a binary search tree can be employed.

Although an exemplary embodiment of the present invention has been described above, it is not limited to the above-mentioned exemplary embodiment and various transformations are possible within the range which does not depart from the scope of the invention.

For example, in search device 1 of the above-mentioned exemplary embodiment, in FIG. 1, although registration unit 10 and search unit 11 include each unit respectively, both units may be integrated and functions and operations which are mentioned above may be changed at the time of a search and at the time of registration. For example, prefix extraction unit 20 and prefix extraction unit 30 are integrated into one, and also, hash execution unit 21 and hash execution unit 31 may be integrated into one. Also, because a function to access (update/refer) to hash table 13 is common in both of hash table registration unit 23 and hash table search unit 33, they may be integrated into one. Also, because a function to access (update/refer) to bit vector 12 is common in both of bit vector update unit 22 and pattern length estimation unit 32, they may be integrated into one.

Figure 10:
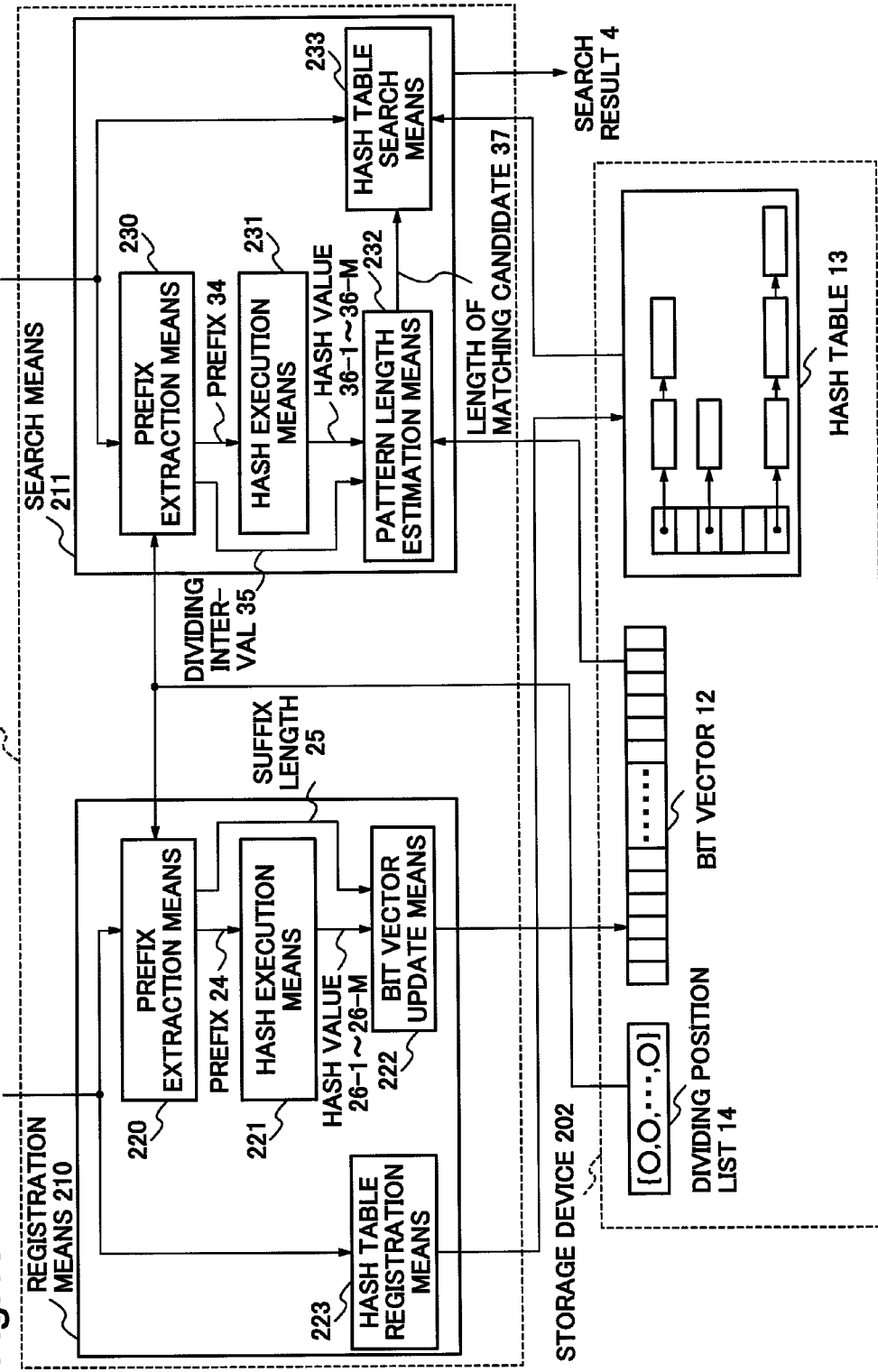
FIG. 10 is a block diagram showing an example of a structure in which a search device according to one exemplary embodiment of the present invention is applied to an information processing device.

Also, for example, search device 1 of the above-mentioned exemplary embodiment can be applied to, for example, an information processing device such as a PC (Personal Computer). FIG. 10 is a block diagram showing an exemplary configuration that a search device of the present invention is applied to an information processing device.

In an example shown in FIG. 10, the information processing device includes data processing device 201 and storage device 202. Data processing device 201 is a control device such as CPU. Data processing device 201 includes registration means 210 and search means 211. Because registration means 210 and search means 211 function and operate like registration unit 10 and search unit 11 shown in FIG. 1 respectively, the description here is omitted. Registration means 210 includes prefix extraction means 220, hash execution means 221, bit vector update means 222 and hash table registration means 223. Because each of these means in registration means 210 functions and operates like each unit shown in FIG. 1 (prefix extraction unit 20, hash execution unit 21, bit vector update unit 22 and hash table registration unit 23), the description here is omitted. Also, search means 211 includes prefix extraction means 230, hash execution means 231, pattern length estimation means 232 and hash table search means 233. Because each of these means in search means 211 functions and operates like each unit shown in FIG. 1 (prefix extraction unit 30, hash execution unit 31, pattern length estimation unit 32 and hash table search unit 33), the description here is omitted. Also, in storage device 202, dividing position list 14, bit vector 12 and hash table 13 which are the same as described in FIG. 1 are stored respectively. Storage device 202 is a recording medium such as HDD.

For example, operation in an exemplary embodiment mentioned above (operation shown in each flow chart) may be carried out by hardware, software or a compound structure of both of them.

In case processing by software is carried out, a program in which processing sequence is recorded may be installed and carried out in a memory in a computer included in special-purpose hardware. Alternatively, a program may be installed and carried out in a general-purpose computer which can carry out various processing.

For example, a program may be recorded in a hard disk or ROM (Read Only Memory) as a recording medium in advance. Alternatively, a program may be stored (recorded) in a removable recording medium such as CD-ROM (Compact Disc Read Only Memory), MO (Magneto optical) disk, DVD (Digital Versatile Disc), a magnetic disk or a semiconductor memory temporarily or permanently. Such a removable recording medium can be provided as so-called packaged software.

A program may, in addition to being installed in a computer from the removable recording medium mentioned above, also be transmitted by wireless transmission method from a download site to the computer. Alternatively a program may be transmitted to the computer by wired transmission method via a network such as LAN (Local Area Network) or the internet. The computer can receive a transmitted program and can install it in a built-in recording medium such as a hard disk.

Also, a system is may be arranged not only to carry out in time series according to a processing operation described in the above-mentioned exemplary embodiment, but also to carry out in parallel or separately depending on the processing capability of the device on which processing is carried out or on the need.

The Second Exemplary Embodiment

Figure 11:
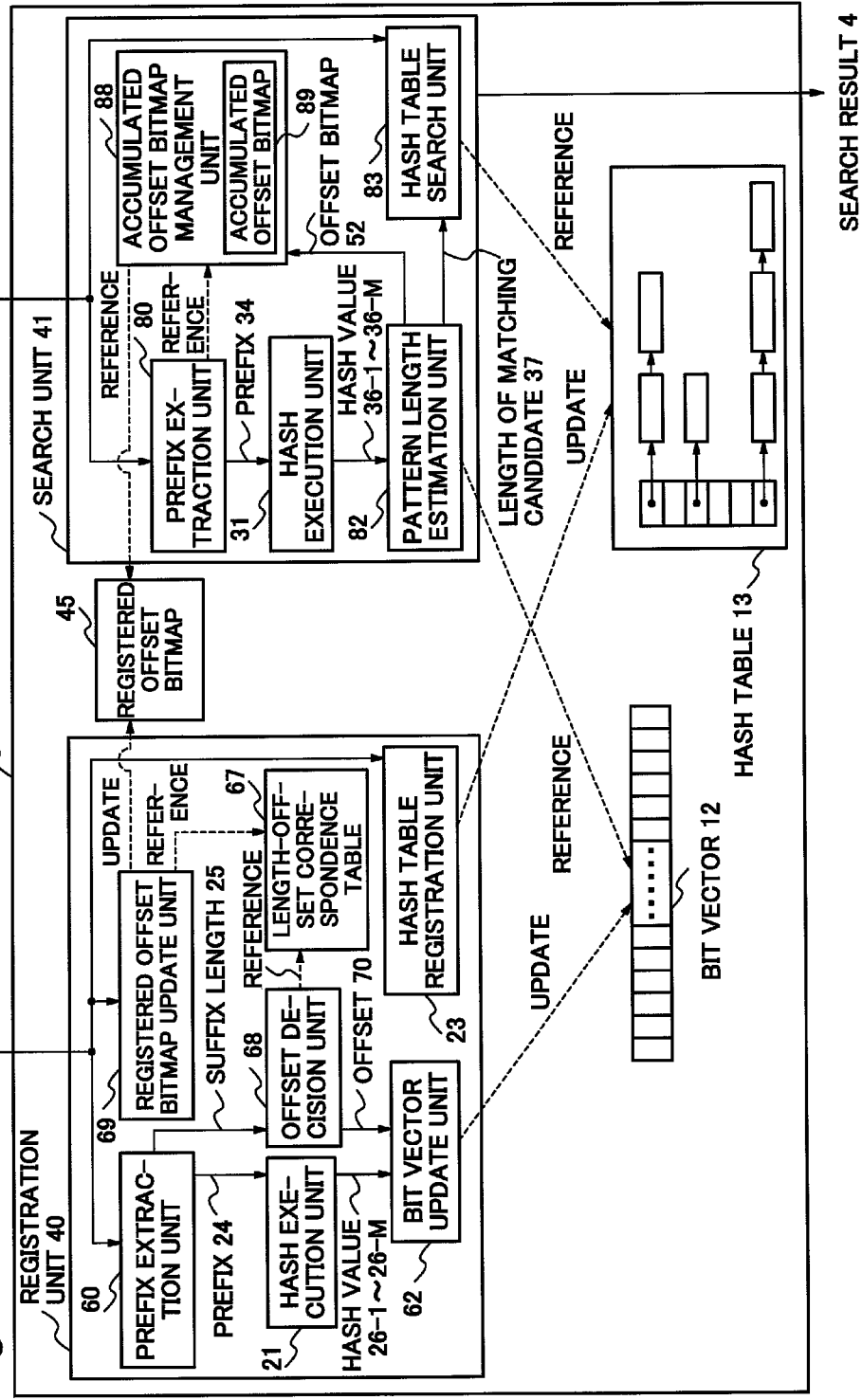
FIG. 11 is a block diagram according to one exemplary embodiment of the present invention showing an example of a structure which realizes a longest prefix match search.

FIG. 11 is a block diagram showing a structure of search device 5 which carries out a longest prefix match search to a character string.

In this exemplary embodiment, each character which constitutes a character string is not limited to the character that person can recognize and each character which constitutes a character string may be binary data. In order to represent 1 character, the required number of bits is not limited. Alternatively 1 character does not need to be represented by 1 byte.

Components of search device 5 are: registration unit 40 which registers registered pattern 2, search unit 41 which searches those longest prefix match with search key 3 from among one or more registered pattern 2 already registered, hash table 13 in which one or more registered pattern 2 is stored, bit vector 12 which is a source for estimating a length of registered pattern 2 having possibility that the registered pattern 2 is the longest prefix match with search key 3, and registered offset bitmap 45 which is recorded a length of one or more registered pattern 2 already registered. Each of these units may be realized, as a hardware configuration, by a device such as a printed circuit board or a memory chip.

As a hardware configuration, for example, search device 5 may include: CPU (Central Processing Unit), ROM (Read Only Memory) which stores in advance fixed data such as a program which controls CPU (search program which is one exemplary embodiment of the present invention), RAM (Random Access Memory) which constitutes an area which stores various data temporarily and a recording medium such as HDD (Hard Disk Drive). Therefore, registration unit 40 and search unit 41 may be realized by CPU, ROM and RAM. Also, hash table 13, bit vector 12 and registered offset bitmap 45 may be realized by RAM or a recording medium.

Hash table 13 is used for an exact match search of registered pattern 2 in hash table search unit 83 within search unit 41 mentioned below. A data structure using a hash and an exact match search method is publicly known. Accordingly, hash table 13 can be realized easily by an existing hashing method. The contents of hash table 13 are empty in the initial state.

Bit vector 12 is a one dimensional array of a bit (numerical value) and initial values of the contents are all 0.

Registered offset bitmap 45 is a one dimensional array of a bit (numerical value) and initial values of the contents are all 0.

Registration unit 40 regards registered pattern 2 which is an unregistered character string as an input and carries out the operation which registers the registered pattern 2 to bit vector 12, hash table 13 and registered offset bitmap 45.

Components of registration unit 40 are: prefix extraction unit 60 which extracts one or more partial character string (part of a character string) which is a hash calculation target from registered pattern 2, hash execution unit 21 which calculates a plurality of hash values by applying a plurality of hash functions to the partial character string, length-offset correspondence table 67 which stores a relation between an offset in bit unit in bit vector 12 and an offset bitmap mentioned below and a length of a character string, offset decision unit 68 which obtains an offset corresponding to the length of the partial character string which was not a hash calculation target among registered pattern 2 by referring to length-offset correspondence table 67, bit vector update unit 62 which updates the content of the bit in bit vector 12 which the hash value and the offset indicate, registered offset bitmap update unit 69 which obtains an offset corresponding to the length of registered pattern 2 by referring to length-offset correspondence table 67 and updates the content of a bit in registered offset bitmap 45 which the offset indicates, and hash table registration unit 23 which registers registered pattern 2 to hash table 13.

Prefix extraction unit 60 extracts a partial character string from the beginning of registered pattern 2 and outputs the partial character string to hash execution unit 21 as prefix 24. The length of prefix 24 is a multiple of stride 54 and is less or equal to the length of registered pattern 2.

Stride 54 is an integer of not smaller than 2 and is an increment of the length of prefix 24. Stride 54 is related to the contents of length-offset correspondence table 67 closely.

An example of length-offset correspondence table 67 when stride 54 is 3 is shown in FIG. 12. Length-offset correspondence table 67 includes a column of length and a column of offset. The contents of the column of offset are serial numbers from the top of the table such as 0, 1, 2, . . . . The contents of the column of length from first row to an S-th row are serial numbers such as 0, 1, 2, . . . . Here, S is stride 54. The content of an (S+N)-th row of the column of length is "not smaller than (S times N) and smaller than {S times (N+1)}". Here, N is a natural number. The content of the last row of the column of length is "not smaller than {S times (W−S)}". Here, W is window size 55. Window size 55 is equal to the number of rows of length-offset correspondence table 67. Window size 55 must be not smaller than (S+2). In length-offset correspondence table 67 of FIG. 12, window size 55 is 6.

Prefix extraction unit 60 generates one or more prefix 24 for one registered pattern 2. Whenever prefix extraction unit 60 generates one prefix 24, prefix extraction unit 60 obtains suffix length 25 by subtracting the length of prefix 24 from the length of registered pattern 2 and outputs it to offset decision unit 68. As above, because prefix extraction unit 60 divides registered pattern 2 into a prefix (the first character string) and a suffix (the second character string), it may also be called a suffix extraction unit.

Hash execution unit 21 obtains M hash values 26-1-26-M by applying M hash functions to prefix 24 and transmits them to bit vector update unit 62. Here, M is an integer not smaller than 2. In order to suppress collision of a hash, it is desirable that M hash functions generate hash values 26-1-26-M which do not correlate with each other.

Offset decision unit 68 obtains offset 70 corresponding to suffix length 25 by referring to length-offset correspondence table 67 and outputs it to bit vector update unit 62. For example, in case of length-offset correspondence table 67 of FIG. 12, when suffix length 25 is 5, then offset 70 is 3.

Bit vector update unit 62 sets M bits in bit vector 12 to 1. The address of a bit set to 1 is determined based on hash values 26-1-26-M and offset 70. Details of operation of bit vector update unit 62 are described below.

Registered offset bitmap update unit 69 obtains an offset corresponding to the length of registered pattern 2 by referring to length-offset correspondence table 67 and sets a bit in registered offset bitmap 45 which the offset indicates to 1. The number of elements of registered offset bitmap 45 is equal to window size 55. For example, when the length of registered pattern 2 is 2, because the offset is known to be 2 by referring to length-offset correspondence table 67 of FIG. 12, registered offset bitmap update unit 69 sets bit "2" of registered offset bitmap 45, that is, third bit (=2+1) from the left to 1.

Thus, the content of an (X+1)-th bit from the left of registered offset bitmap 45 is 1 whenever one or more registered pattern 2 of the length corresponding to the offset "X" in length-offset correspondence table 67 is registered in search device 5, and is 0 whenever none is registered.

Hash table registration unit 23 adds registered pattern 2 to hash table 13. In this case, a hash value is calculated by applying a hash function to all part of registered pattern 2. There is no relation between the hash functions used in hash table registration unit 23 and the hash functions used in hash execution unit 21.

Search unit 41 receives search key 3 which is a character string as an input, searches bit vector 12 and hash table 13 in order to specify registered pattern 2 whose longest prefix matches with search key 3 and outputs the result as search result 4.

Components of search unit 41 are: prefix extraction unit 80 which extracts one or more partial character string (part of a character string) which becomes a hash calculation target from search key 3, hash execution unit 31 which calculates a plurality of hash values by applying a plurality of hash functions to the partial character string, pattern length estimation unit 82 which estimates the length of registered pattern 2 which has possibility that the registered pattern 2 is the longest prefix match with search key 3 by referring to the contents of bit vector 12 which the hash value indicates, hash table search unit 83 which extracts a partial character string equal to the estimated length from the beginning of search key 3 and determines whether or not registered pattern 2 which matches exactly with the partial character string exists in hash table 13, accumulated offset bitmap 89 which is a source for determining the length of the partial character string extracted in prefix extraction unit 80, and accumulated offset bitmap management unit 88 which controls update of accumulated offset bitmap 89.

Prefix extraction unit 80 extracts a partial character string from the beginning of search key 3 and outputs the partial character string to hash execution unit 31 as prefix 34. The length of prefix 34 is equal to a multiple of stride 54 and is determined based on the contents of accumulated offset bitmap 89.

Accumulated offset bitmap 89 is a one dimensional array of a bit and the number of elements is equal to window size 55. Basically, when the content of an (S+N)-th bit from the left of accumulated offset bitmap 89 is 1, the length of prefix 34 is (S times N) characters. Here, S is stride 54 and N is a natural number.

In case accumulated offset bitmap 89 has plural bits in which 1 is set, prefix extraction unit 80 outputs prefix 34 of the length corresponding to the leftmost bit among them. That is, prefix extraction unit 80 generates, for one search key 3, one or more prefix 34 in ascending order of their length.

Accumulated offset bitmap 89 is shifted by accumulated offset bitmap management unit 88 to the left by 1 bit. Whenever this shift is carried out, the length of prefix 34 is adjusted by S in the plus direction. They are mentioned below.

As above, because prefix extraction unit 80 divides search key 3 into a prefix (the first character string) and a suffix (the second character string), it may also be called a suffix extraction unit.

Hash execution unit 31 obtains M hash values 36-1-36-M by applying M hash functions to prefix 34 and transmits them to pattern length estimation unit 82. The number of the hash functions, that is M, and the form of the hash functions have to be identical with those of hash execution unit 21 of registration unit 40.

Pattern length estimation unit 82 reads M bit strings whose bit-width are W respectively from bit vector 12, obtains a logical product of those bit strings and transmits the logical product to accumulated offset bitmap management unit 88 as offset bitmap 52. Here, W is window size 55. Offset bitmap 52 is a one dimensional array of a bit and the number of elements of the array is equal to window size 55. The referred addresses of M points in bit vector 12 are determined based on M hash values 36-1-36-M. Pattern length estimation unit 82 estimates the length of registered pattern 2 which has possibility that the registered pattern 2 is the longest prefix match with search key 3 based on the obtained offset bitmap 52 and outputs the estimated length to hash table search unit 83 as length of matching candidate 37.

Hash table search unit 83 extracts a partial character string of the length which is equal to length of matching candidate 37 from the beginning of search key 3 and treats the partial character string as matching candidate 53. After that, hash table search unit 83 searches hash table 13 and determines whether or not registered pattern 2 which matches exactly with matching candidate 53 exists in hash table 13. The hash function and the hash algorithm used by this search have to be identical with each one of hash table registration unit 23 of registration unit 40. In case registered pattern 2 which matches exactly with matching candidate 53 is found, matching candidate 53 is outputted as search result 4. Otherwise, search result 4 meaning that the search is failed is outputted.

When search key 3 is inputted to search unit 41, accumulated offset bitmap management unit 88 initializes the contents of accumulated offset bitmap 89 based on the contents of registered offset bitmap 45. Also, accumulated offset bitmap management unit 88 shifts accumulated offset bitmap 89 to the left by 1 bit during the operation of prefix extraction unit 80. However, in case of this shift, content of the right most bit of accumulated offset bitmap 89 is held as a previous value. Whenever accumulated offset bitmap management unit 88 received offset bitmap 52 from pattern length estimation unit 82, accumulated offset bitmap management unit 88 calculates a logical product of the contents of offset bitmap 52 and contents of accumulated offset bitmap 89, and accumulated offset bitmap management unit 88 substitutes the logical product for accumulated offset bitmap 89.

Next, operation of search device 5 which carries out a longest prefix match search to a character string is described.

Figure 13:
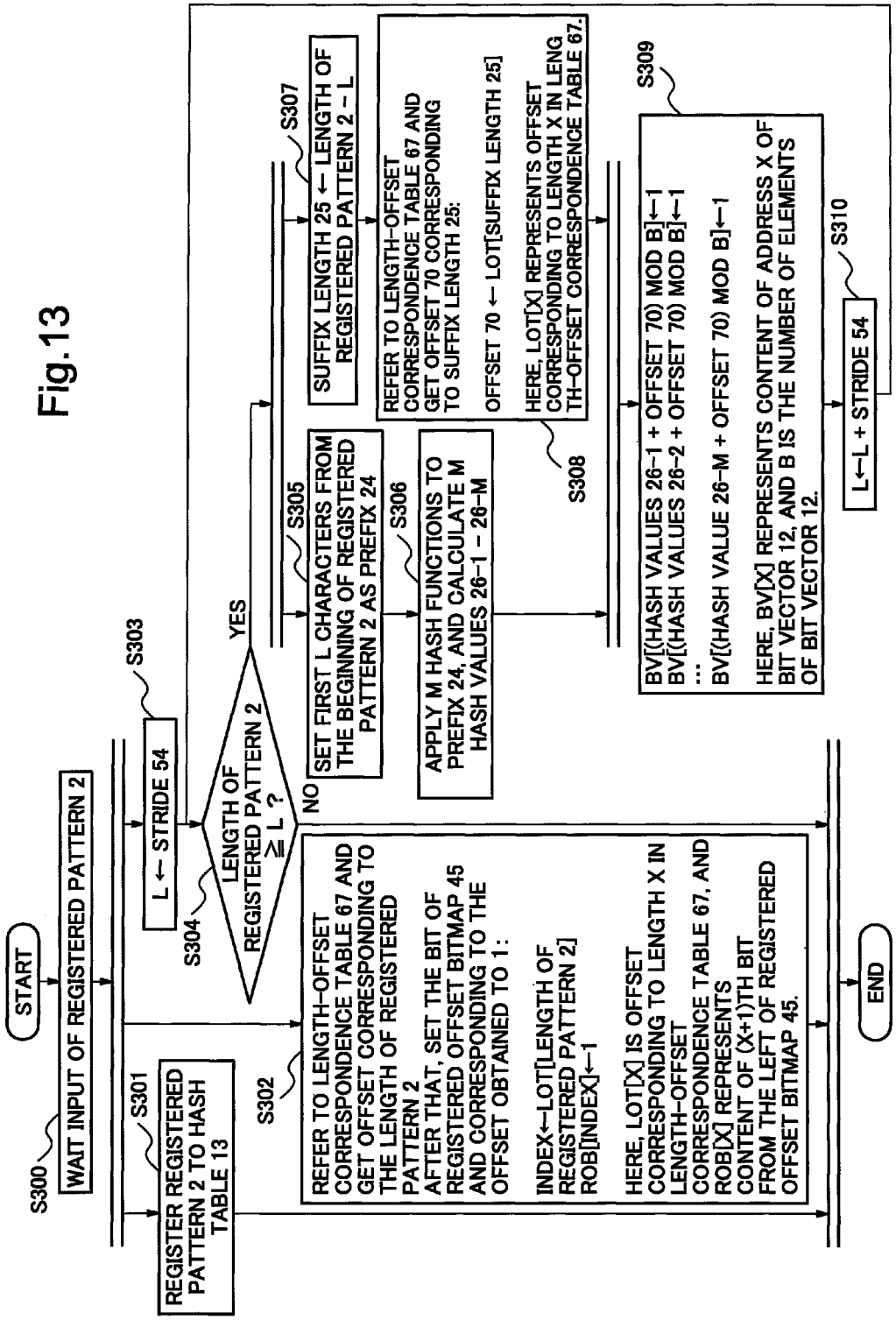
FIG. 13 is a flow chart showing an example of operation of registration unit 40.

First, registration unit 40 which registers registered pattern 2 is described. FIG. 13 is a flow chart illustrating operation of registration unit 40. By using a specific example of FIGS. 14-20 together, a flow chart of FIG. 13 is described.

In this example, it is assumed that "ABCDEFGHIJ" (10 characters in length) and "XYZ" which are two registered patterns 2 are registered one by one to search device 5 in order. Also, it is supposed that stride 54 is 3 and the contents of length-offset correspondence table 67 of registration unit 40 are as shown in FIG. 12. Window size 55 is 6.

Registration processing for first registered pattern 2 begins.

Prefix extraction unit 60, hash table registration unit 23 and registered offset bitmap update unit 69 wait for an input of registered pattern 2 (Step S300). In this example, registered pattern 2 is 10 characters of "ABCDEFGHIJ".

After Step S300, processing in this example goes to Step S301, Step S302 and Step S303. Step S301, Step S302 and Steps S303-S310 can be carried out in parallel. Parallel execution is not indispensable.

Figure 14:
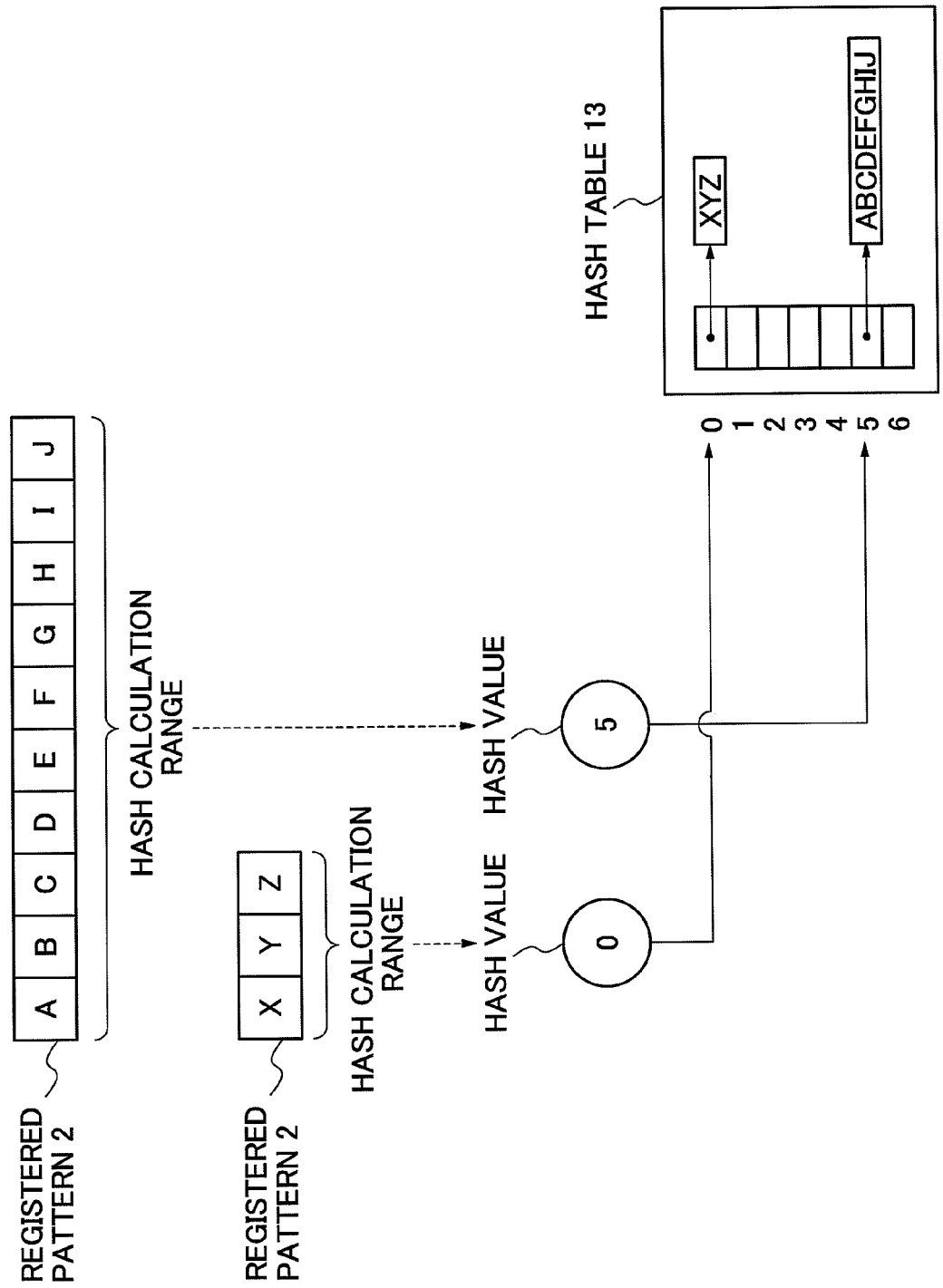
FIG. 14 is an explanatory drawing showing a specific example which registers a pattern to hash table 13.

Hash table registration unit 23 adds registered pattern 2 to hash table 13 (Step S301). In this example, registered pattern 2 is added to hash table 13 as shown in FIG. 14.

Figure 15:
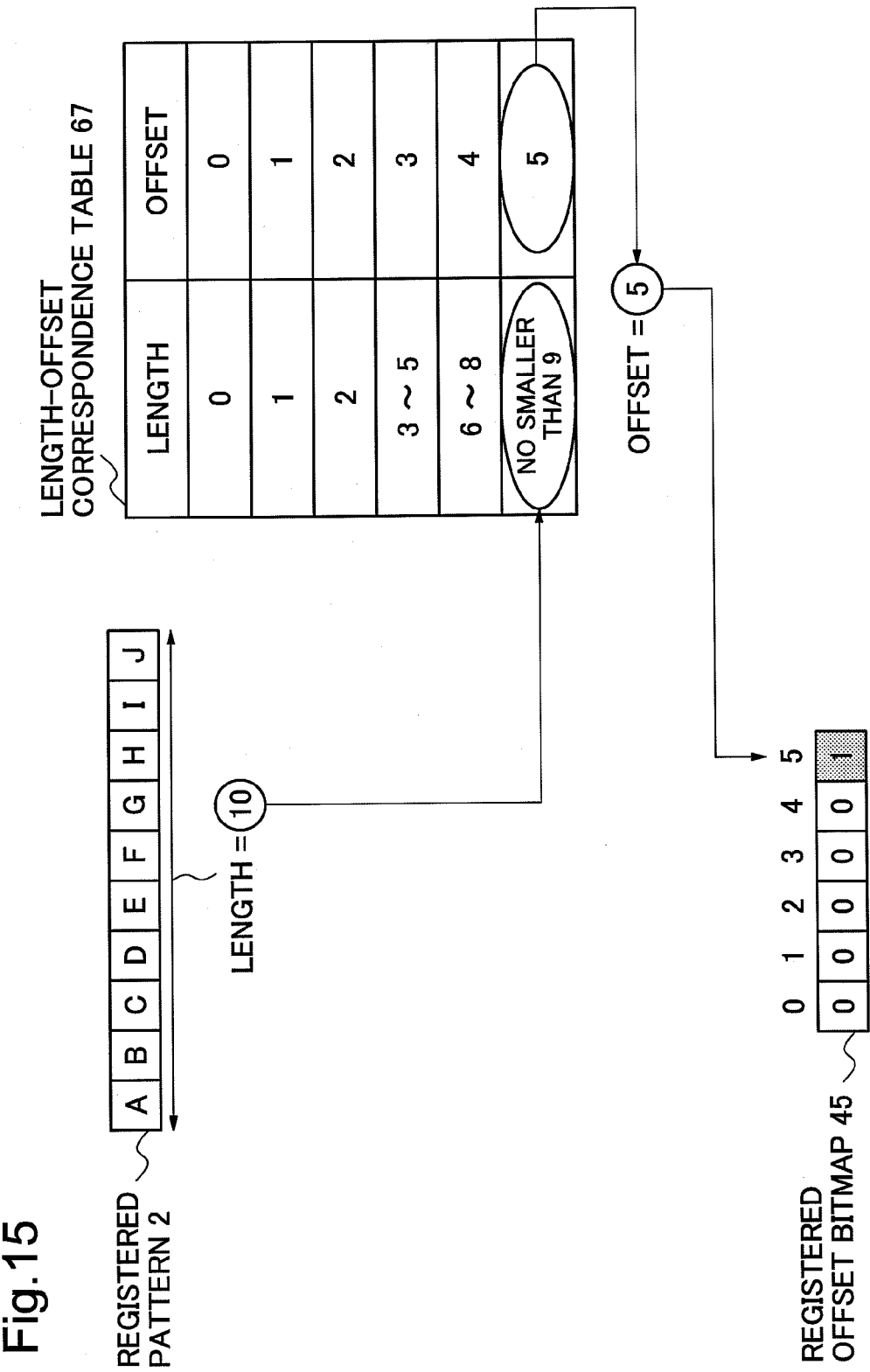
FIG. 15 is an explanatory drawing showing an example of operation of registered offset bitmap update unit 69 in registration unit 40.

Registered offset bitmap update unit 69 obtains an offset corresponding to the length of registered pattern 2 by referring to length-offset correspondence table 67 and sets a (X+1)-th bit from the left of registered offset bitmap 45 to 1 (Step S302). Here, X is the obtained offset. In this example, as the length of registered pattern 2 is 10 characters, it is known that the offset corresponding to length "10" is 5 by referring to length-offset correspondence table 67 of FIG. 12. Accordingly, a sixth (=5+1) bit from the left of registered offset bitmap 45 is set to 1 as shown in FIG. 15.

Prefix extraction unit 60 initializes length "L" of prefix 24 based on stride 54 (Step S303). In this example, because stride 54 is 3, L=3.

Prefix extraction unit 60 determines whether or not the length of registered pattern 2 is not smaller than L (Step S304). When the length of registered pattern 2 is not smaller than L, processing in this example transits to Step S305 and Step S307, and otherwise, processing of registration unit 40 waits for completion of processing of Step S301 and Step S302, and processing of registration unit 40 finishes. In this example, because the length of registered pattern 2 is 10 characters and L=3, the condition of Step S304 is met and processing in this example transits to Step S305 and Step S307.

Steps S305-S306 and Steps S307-S308 can be carried out in parallel. Parallel execution is not indispensable.

Figure 16:
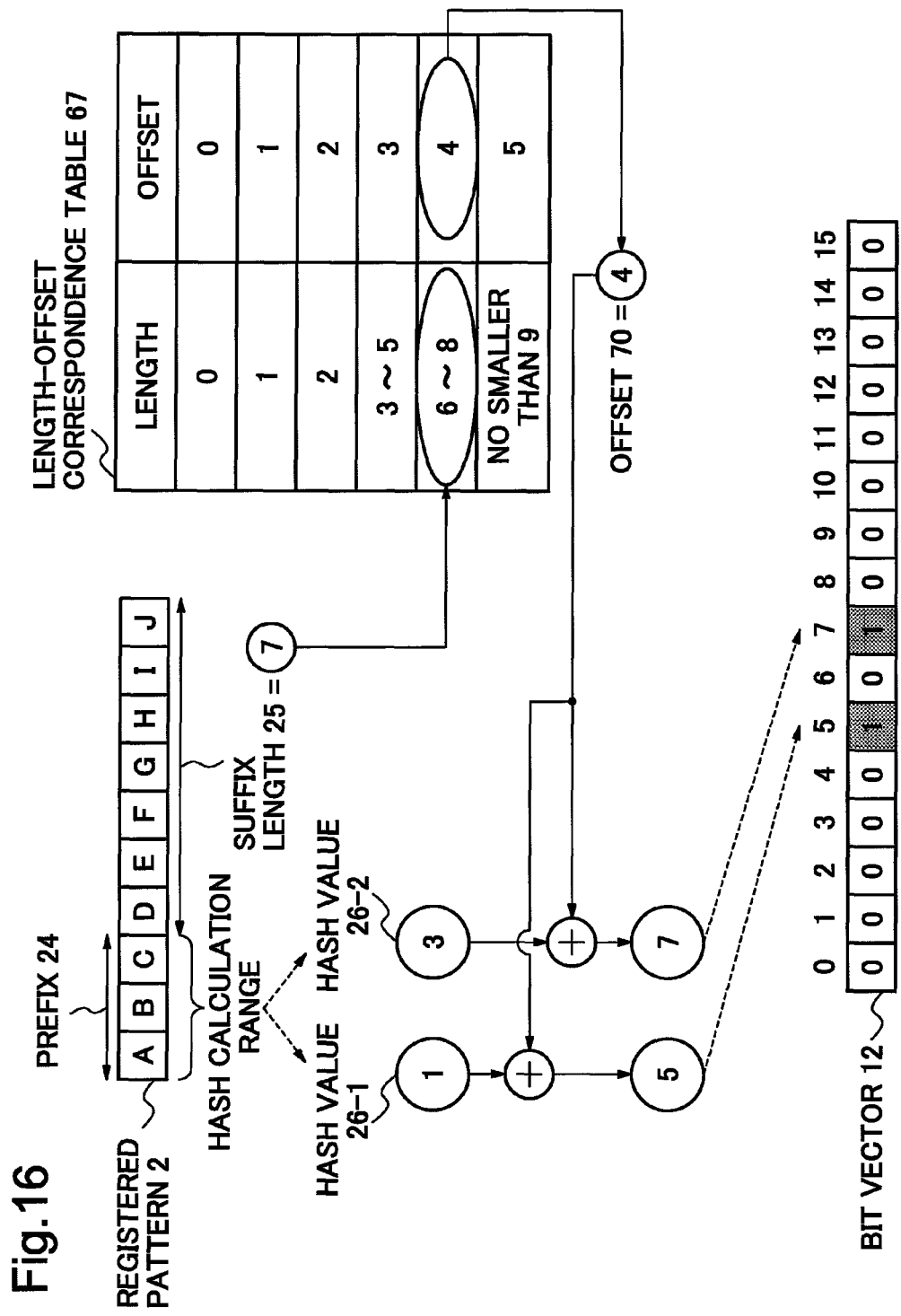
FIG. 16 is an explanatory drawing showing an example of operation of hash execution unit 21 and bit vector update unit 62 in registration unit 40.

Prefix extraction unit 60 extracts L characters from the beginning of registered pattern 2 and treats the partial character string as prefix 24 (Step S305). In this example, because the length of prefix 24 is 3 characters (L=3), prefix 24 is "ABC" as shown in FIG. 16 (top).

Hash execution unit 21 calculates M hash values 26-1-26-M by applying M hash functions to prefix 24 (Step S306). In this example, it is supposed that number M of hash functions is 2 and hash values 26-1-26-2 calculated from prefix 24 "ABC" is assumed to be 1 and 3 respectively as shown in FIG. 16.

Prefix extraction unit 60 obtains suffix length 25 by subtracting L from the length of registered pattern 2 (Step S307). In this example, suffix length 25 is 7 (=10−3).

Offset decision unit 68 obtains offset 70 corresponding to suffix length 25 by referring to length-offset correspondence table 67 (Step S308). In this example, suffix length 25 is 7. Accordingly, by referring to length-offset correspondence table 67 of FIG. 12, 4 is obtained as an offset and offset 70 becomes 4.

At the time both of processing of Step S306 and Step S308 finished, processing in this example transits to Step S309.

Bit vector update unit 62 sets M bits of bit vector 12 to 1 (Step S309). Addresses of bits to which 1 is set in bit vector 12 are: remainder of dividing the sum of hash value 26-1 and offset 70 by B, remainder of dividing the sum of hash value 26-2 and offset 70 by B, (omission), and remainder of dividing the sum of hash value 26-M and offset 70 by B, in total of M. Here, B is the number of elements of bit vector 12. The reason why remainder is used is in order to avoid the situation that the sum of hash value 26-X ($1 \leq X \leq M$) and offset 70 exceeds the length of bit vector 12 and that the address to be set to 1 is outside the range of bit vector 12. In this example, as shown in FIG. 16 (bottom), addresses to be set to 1 are 5 (=(1+4)mod 16) and 7 (=(3+4)mod 16).

Prefix extraction unit 60 adds stride 54 to length "L" of prefix 24 (Step S310). In this example, L=6 (=3+3). After that, processing in this example returns to Step S304.

In this example, because the length of registered pattern 2 is 10 characters and L=6, the condition of Step S304 is met and processing in this example transits to Step S305 and Step S307.

Because the description of Steps S305-S310 has already been done, only the result in this example is described.

In Step S305, because L=6, prefix 24 is "ABCDEF".

Figure 17:
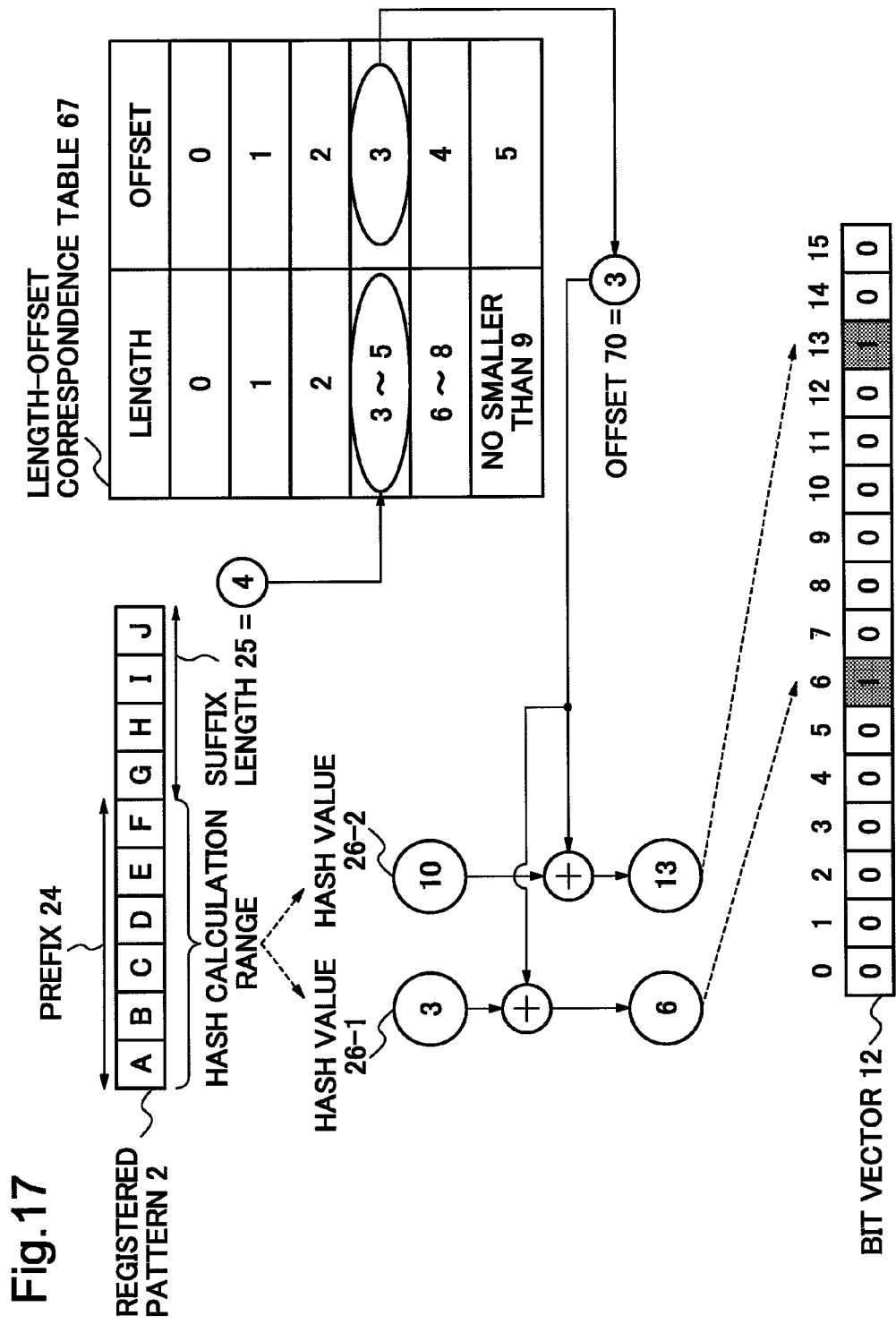
FIG. 17 is an explanatory drawing showing an example of operation of hash execution unit 21 and bit vector update unit 62 in registration unit 40.

In Step S306, it is assumed that hash values 26-1-26-2 calculated from "ABCDEF" of prefix 24 are 3 and 10 respectively as shown in FIG. 17.

In Step S307, because the length of registered pattern 2 is 10 characters and L=6, suffix length 25 is 4 (=10−6).

In Step S308, offset 70 corresponding to suffix length 25 (=4) is obtained by referring to length-offset correspondence table 67, in FIG. 12 and 3 is obtained.

In Step S309, as shown in FIG. 17 (bottom), addresses set to 1 in bit vector 12 are 6 (=(3+3)mod 16) and 13 (=(10+3) mod 16).

In Step S310, stride 54 is added to length "L" of prefix 24 and L=9 (=6+3). After that, processing in this example returns to Step S304.

Because L=9, the condition of Step S304 is met and processing in this example transits to Step S305 and Step S307.

Figure 18:
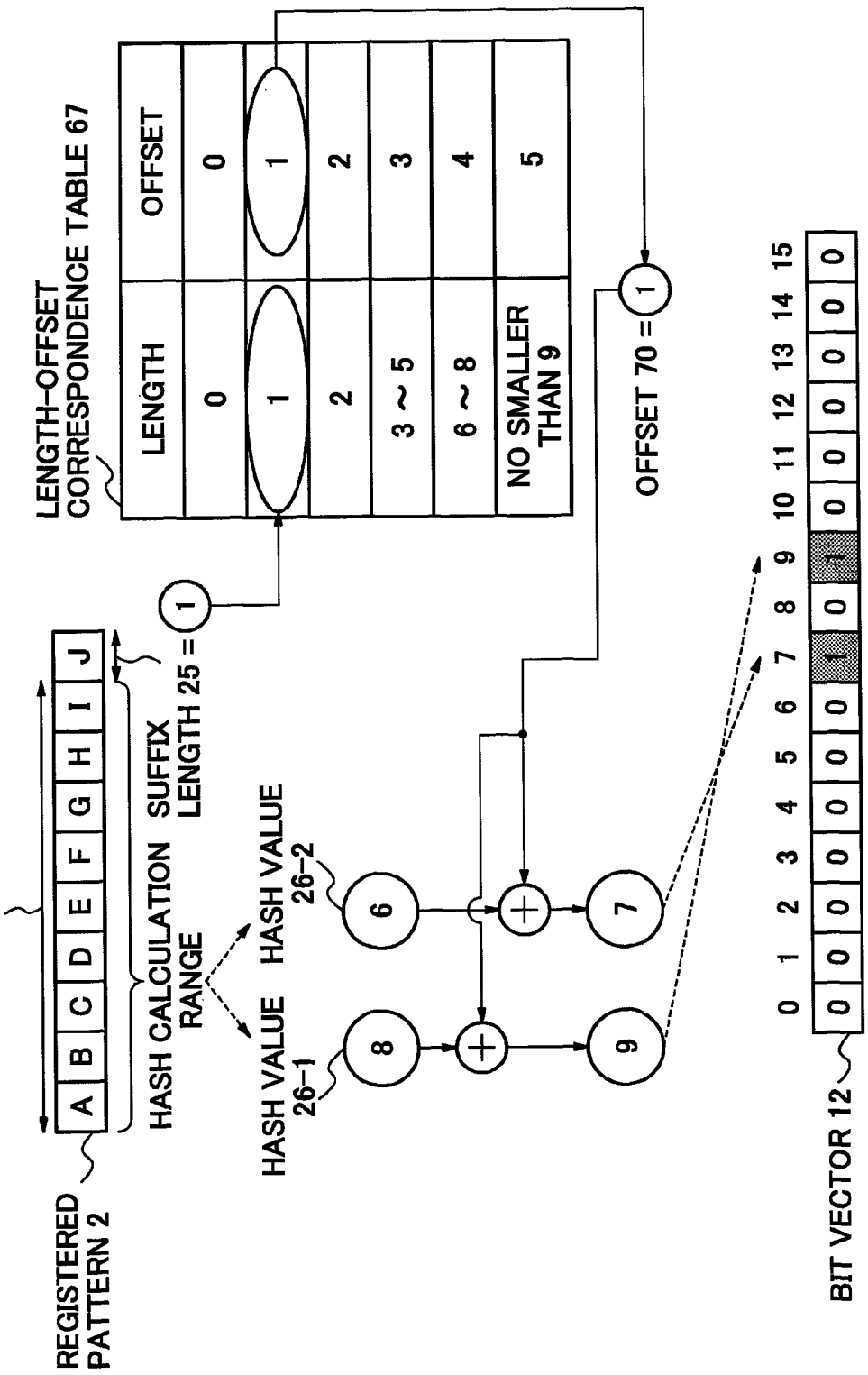
FIG. 18 is an explanatory drawing showing an example of operation of hash execution unit 21 and bit vector update unit 62 in registration unit 40.

When processing of Steps S305-S310 is completed, the contents of bit vector 12 are as shown in FIG. 18 (bottom) and L=12. After that, processing in this example returns to Step S304.

Because L=12 at this time, the condition of Step S304 is not met. Also, because processing of Step S301 and Step S302 is completed, processing of registration unit 40 finishes and registration of "ABCDEFGHIJ" of registered pattern 2 is completed.

Figure 19:
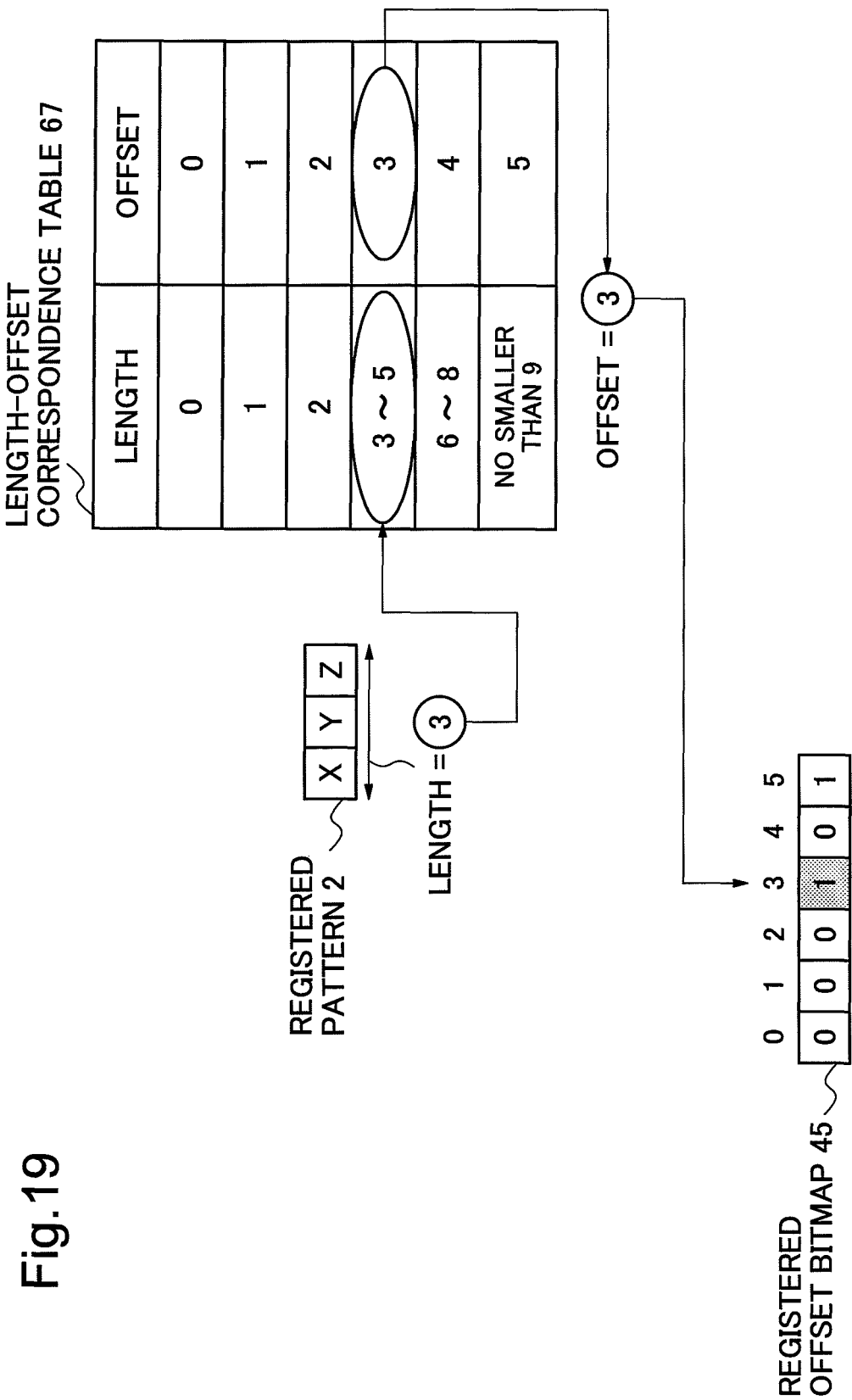
FIG. 19 is an explanatory drawing showing an example of operation of registered offset bitmap update unit 69 in registration unit 40.
Figure 20:
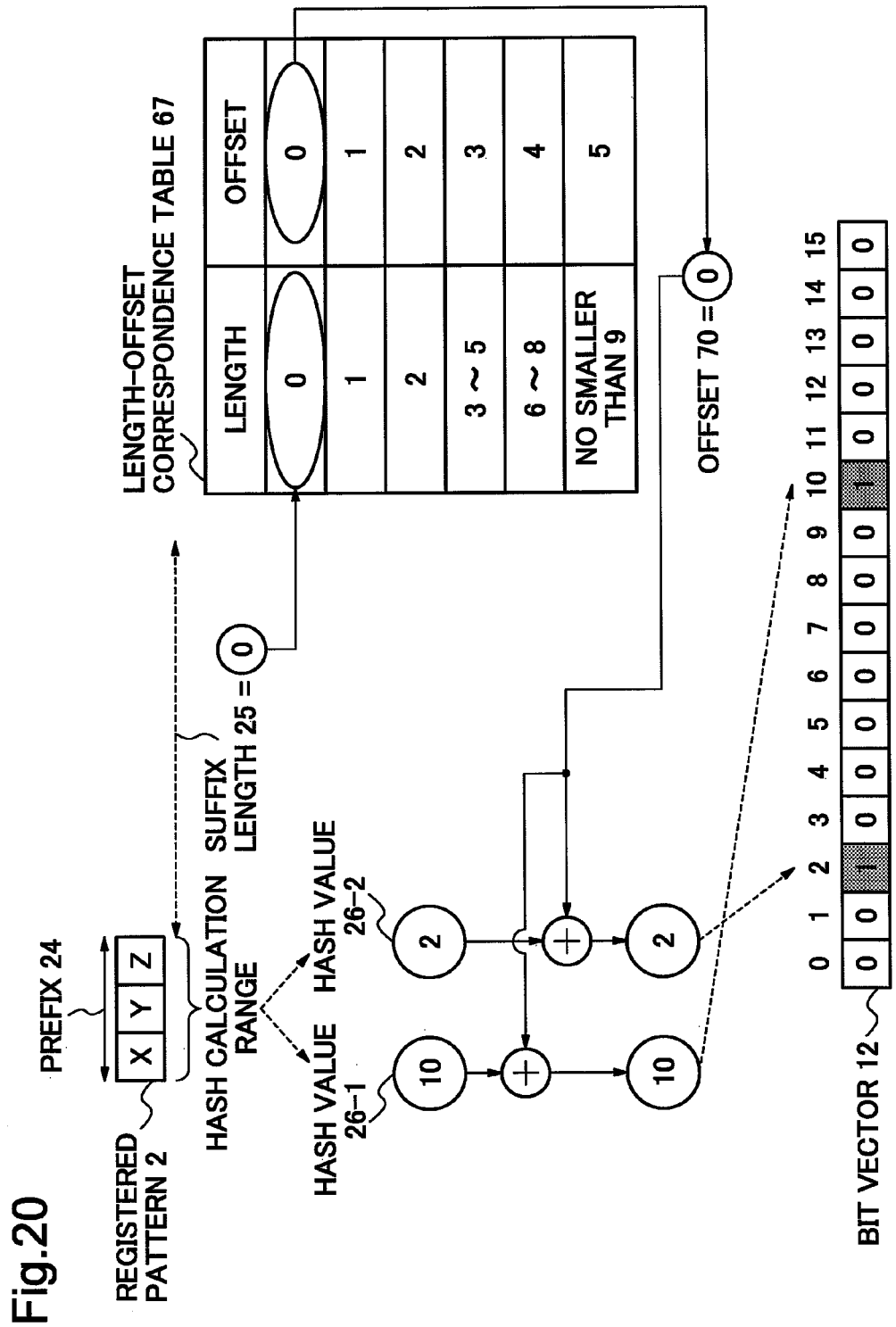
FIG. 20 is an explanatory drawing showing an example of operation of hash execution unit 21 and bit vector update unit 62 in registration unit 40.

Because registration of "XYZ" of the second registered pattern 2 is carried out in the same way as above-mentioned, the description is omitted and only the result is described. The contents of registered offset bitmap 45 and bit vector 12 at the time when registration of "ABCDEFGHIJ" and "XYZ" which are two registered patterns 2 has completed are as shown in FIG. 19 (bottom) and in FIG. 20 (bottom) respectively. Also, an example of the contents of hash table 13 at this time is shown in FIG. 14 (bottom).

Figure 21:
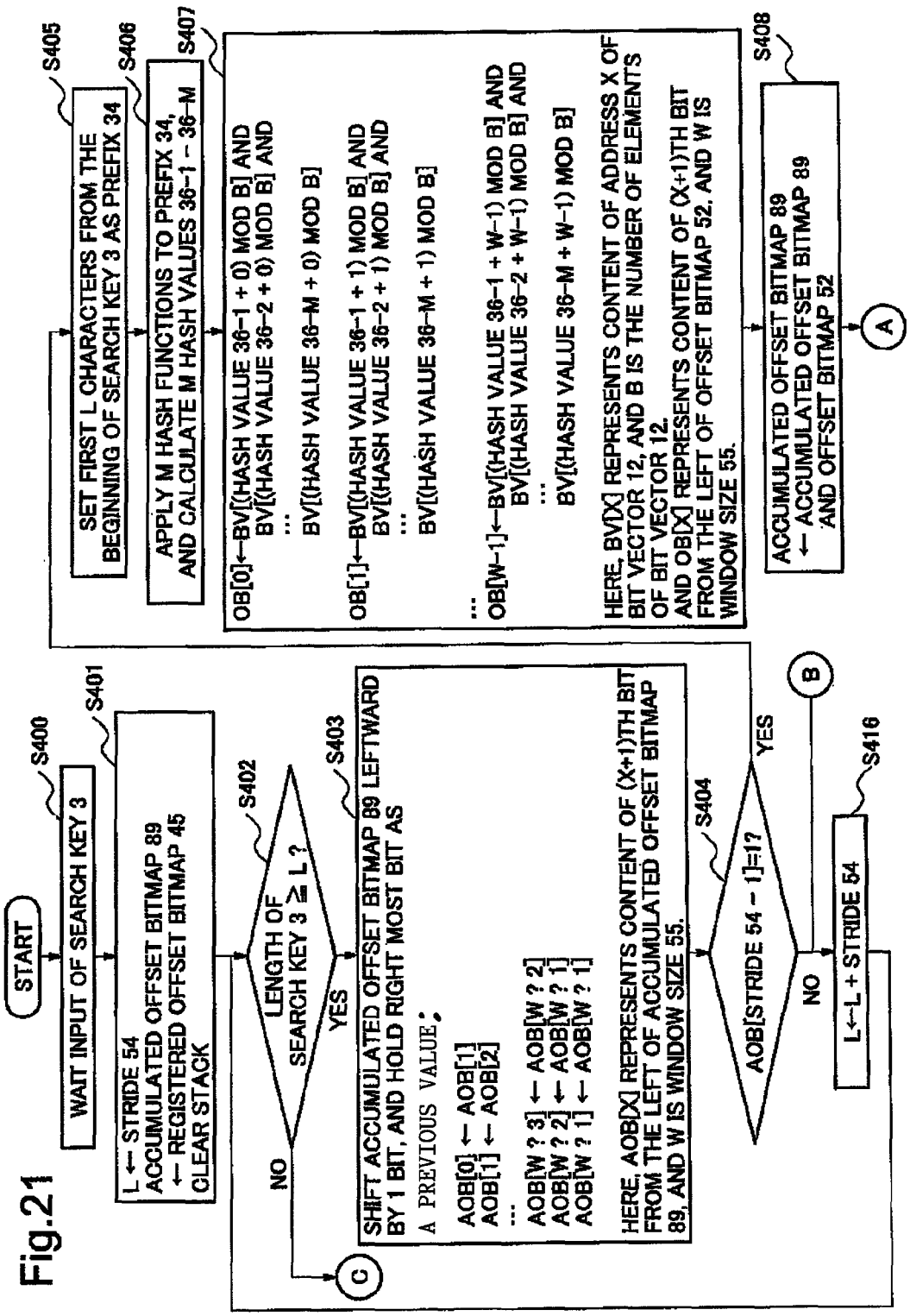
FIG. 21 is a flow chart showing an example of operation of search unit 41.
Figure 22:
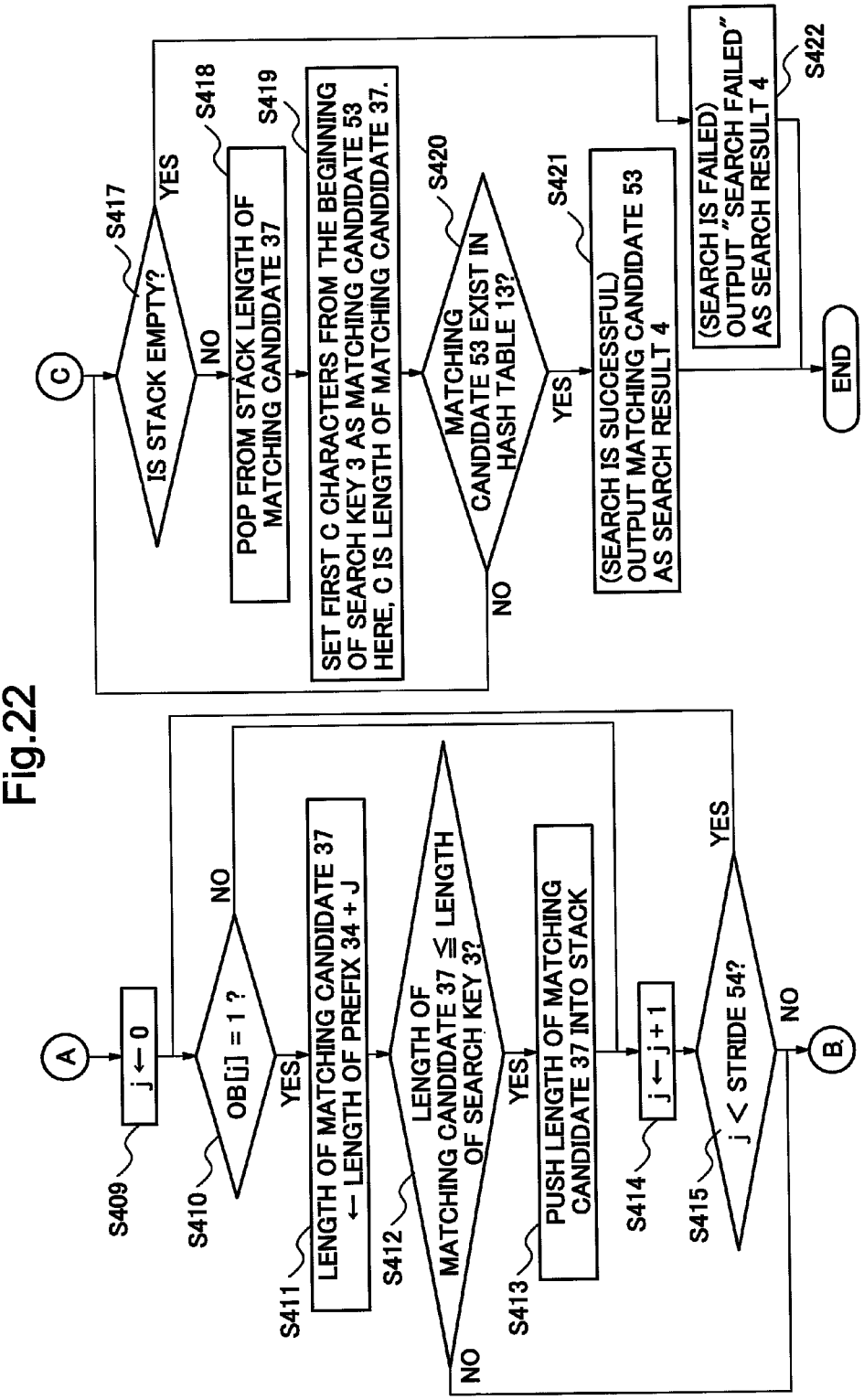
FIG. 22 is a flow chart showing an example of operation of search unit 41.

Next, operation of search unit 41 which specifies registered pattern 2 whose longest prefix matches with search key 3 is described. FIGS. 21-22 are flow charts illustrating operation of search unit 41. By using a specific example of FIGS. 23-26 together, flow charts of FIGS. 21-22 is described.

In this example, it is assumed that "ABCDEFGHIJ" and "XYZ" which are two registered patterns 2 and which are used in a description of operation of registration unit 40 are registered. That is, it is assumed that the contents of registered offset bitmap 45 are set to "000101" as shown in FIG. 19 (bottom), that the contents of bit vector 12 are set in the state of FIG. 20 (bottom) and that the contents of hash table 13 are set in the state of FIG. 14 (bottom) respectively. Also, stride 54 is 3 which are the same as at the time of registration and window size 55 is 6.

In this example, it is assumed that "ABCDEFGHIJK" (11 characters in length) and "ZZZZZZZZZZZZZZZZZZZZ" (20 characters in length) which are two search keys 3 are inputted one by one to search device 5 in order.

Search processing for first search key 3 begins.

Prefix extraction unit 80 and hash table search unit 83 wait for an input of search key 3 (Step S400). In this example, search key 3 is "ABCDEFGHIJK".

Prefix extraction unit 80 initializes length "L" of prefix 34 based on stride 54, accumulated offset bitmap management unit 88 initializes the contents of accumulated offset bitmap 89 based on the contents of registered offset bitmap 45, and, hash table search unit 83 initializes a stack which accumulates one or more length of matching candidate 37 temporarily to empty (Step S401). In this example, L=3 and the contents of accumulated offset bitmap 89 are "000101" as shown in row A of FIG. 23.

Prefix extraction unit 80 determines whether or not the length of search key 3 is not smaller than L (Step S402). When the length of search key 3 is not smaller than L, processing in this example transits to Step S403, and otherwise, processing in this example transits to Step S417. In this example, because the length of search key 3 is 11 characters and L=3, the condition is met and processing in this example transits to Step S403.

Accumulated offset bitmap management unit 88 shifts the contents of accumulated offset bitmap 89 to the left by 1 bit (Step S403). However, in this case, the content of the right most bit of accumulated offset bitmap 89 is not changed before and after the shift. In this example, the contents of accumulated offset bitmap 89 are "001011" as shown in row B of FIG. 23.

Prefix extraction unit 80 determines whether or not the content of an S-th bit from the left of accumulated offset bitmap 89 is 1 (Step S404). Here, S is stride 54. When the content of the bit is 1, processing in this example branches to Step S405, and otherwise, processing in this example branches to Step S416. In this example, because the contents of accumulated offset bitmap 89 are "001011" and the content of the third bit from the left is 1, the condition of Step S404 is met and processing in this example transits to Step S405.

Prefix extraction unit 80 extracts L characters from the beginning of search key 3 and treats the partial character string as prefix 34 (Step S405). Because L=3 in this example, prefix 34 is "ABC".

Hash execution unit 31 calculates M hash values 36-1-36-M by applying M hash functions to prefix 34 (Step S406). In this example, hash values 36-1-36-2 which are calculated from "ABC" of prefix 34 are 1 and 3 respectively as shown in FIG. 24.

Pattern length estimation unit 82 reads M bit strings whose bit-width are W respectively from bit vector 12, calculates a logical product of those bit strings and treats the logical product as offset bitmap 52 (Step S407). Here, W is window size 55. The referred addresses of M points in bit vector 12 are determined based on M hash values 36-1-36-M. Specifically, the content of a (X+1)-th bit ($0 \leq X < W$) from the left of offset bitmap 52 is a logical product of: the content of the address which is equal to the sum of hash value 36-1 and X in bit vector 12, the content of the address which is equal to the sum of hash value 36-2 and X in bit vector 12, (omission), and the content of the address which is equal to the sum of hash value 36-M and X in bit vector 12.

Here, in order that a referred address is not outside the range of bit vector 12, pattern length estimation unit 82 uses the remainder of dividing the sum of hash value 36 and X by the number of elements of bit vector 12 as an address of bit vector 12 to which pattern length estimation unit 82 accesses actually.

Figure 24:
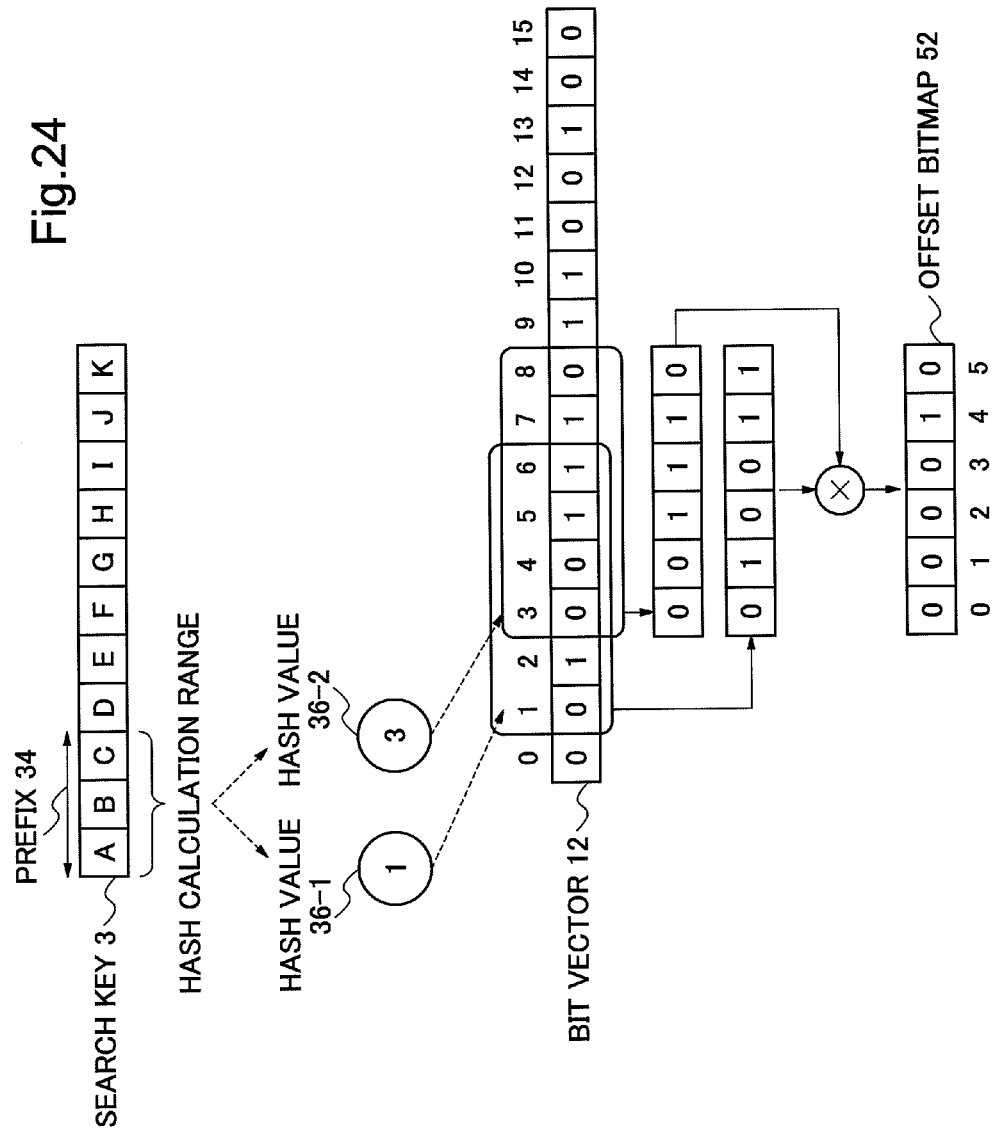
FIG. 24 is an explanatory drawing showing an example of operation of hash execution unit 31 and pattern length estimation unit 82 in search unit 41.

In this example, because hash values 36-1-36-2 are 1 and 3 respectively, as shown in FIG. 24 (bottom), the contents of offset bitmap 52 are a logical product of the contents of 6 bits from address "1" to address "6" and the contents of 6 bits from address "3" to address "8" of bit vector 12, that is, "000010".

Accumulated offset bitmap management unit 88 calculates a logical product of the contents of offset bitmap 52 and the contents of accumulated offset bitmap 89, and substitutes the logical product for accumulated offset bitmap 89 (Step S408). In this example, the contents of accumulated offset bitmap 89 are "000010" as shown in row C of FIG. 23.

Pattern length estimation unit 82 initializes loop counter "j" to 0 (Step S409). Loop counter "j" represents an index of a bit of offset bitmap 52 focused on at present.

Pattern length estimation unit 82 determines whether or not the content of a (j+1)-th bit from the left of offset bitmap 52 is 1 (Step S410). When the content of the bit is 1, processing in this example branches to Step S411, and otherwise, processing in this example branches to Step S414. In this example, because j=0, the first bit from the left of offset bitmap 52 is referred to. Because the contents of offset bitmap 52 are "000010" and the content of the first bit from the left is 0, the condition of Step S410 is not met and processing in this example transits to Step S414.

Pattern length estimation unit 82 adds 1 to loop counter "j" (Step S414). In this example, j changes from 0 to 1.

Pattern length estimation unit 82 determines continuation of the loop corresponding to loop counter "j" (Step S415). When j is smaller than stride 54, processing in this example returns to Step S410 at the beginning of the loop, and otherwise, processing in this example transits to Step S416. In this example, because j=1 and stride 54 is 3, the loop is continued and processing in this example returns to Step S410.

In this example, because the contents of offset bitmap 52 are "000010" and the contents of the second and the third bit from the left are both 0, the condition of Step S410 is not met either for j=1 or j=2. Accordingly, with Steps S411-S413 being never carried out, the loop corresponding to loop counter "j" finishes and processing in this example transits to Step S416.

Prefix extraction unit 80 adds stride 54 to length "L" of prefix 34 (Step S416). In this example, L=6 (=3+3). After that, processing in this example returns to Step S402.

Because L=6, the condition of Step S402 is met and processing in this example transits to Step S403.

Figure 23:
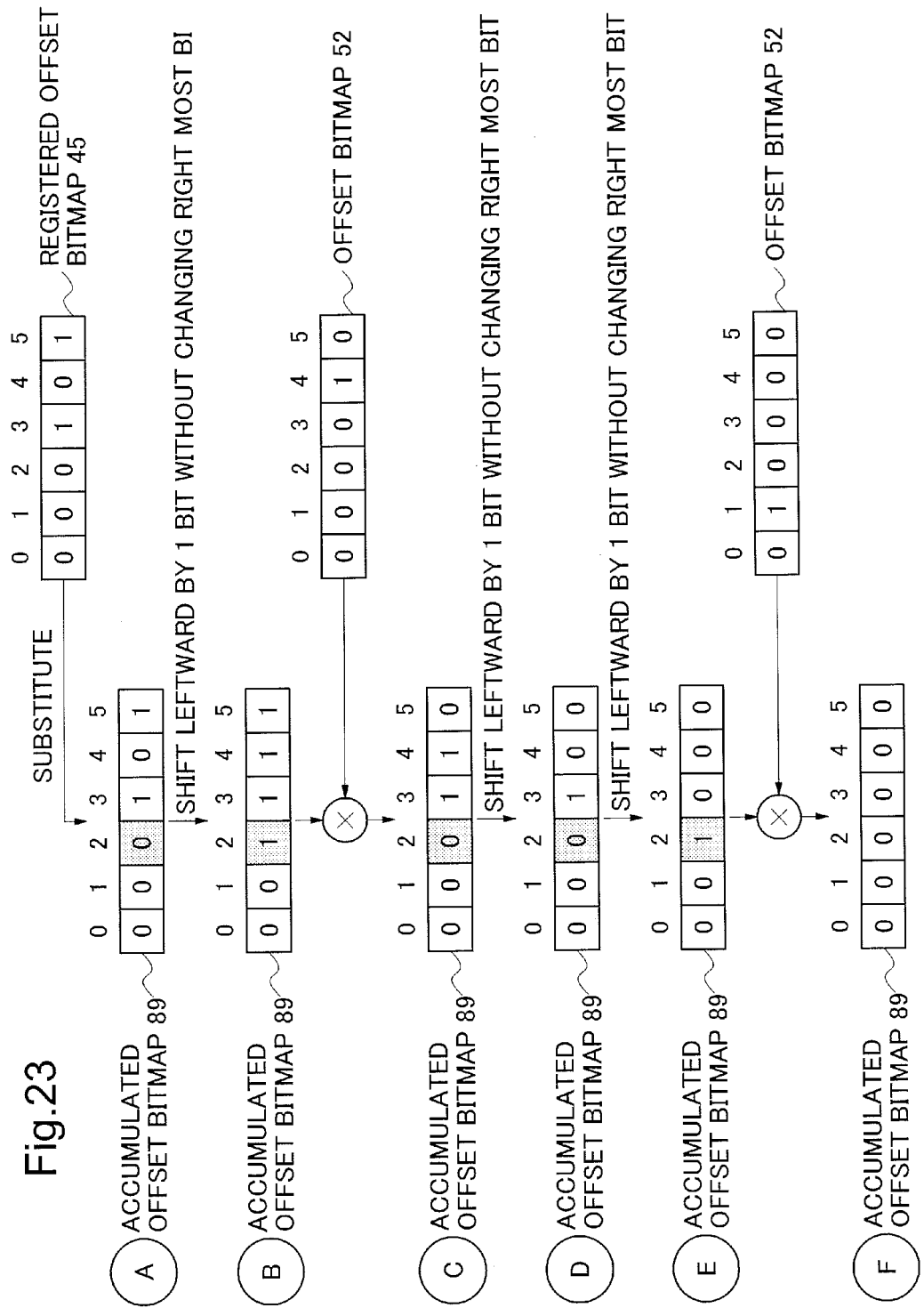
FIG. 23 is an explanatory drawing showing a specific example of accumulated offset bitmap 89 in search unit 41.

In Step S403, the contents of accumulated offset bitmap 89 are shifted to the left by 1 bit and are "000100" as shown in row D of FIG. 23.

In Step S404, because the contents of accumulated offset bitmap 89 are "000100" and the content of the third bit from the left is 0, the condition is not met and processing in this example transits to Step S416.

In Step S416, stride 54 is added to length "L" of prefix 34 and L=9 (=6+3). After that, processing in this example returns to Step S402.

Because L=9, the condition of Step S402 is met and processing in this example transits to Step S403.

In Step S403, the contents of accumulated offset bitmap 89 are shifted to the left by 1 bit and are "001000" as shown in row E of FIG. 23.

In Step S404, because the contents of accumulated offset bitmap 89 are "001000" and the content of the third bit from the left is 1, the condition is met and processing in this example transits to Step S405.

In Step S405, because L=9, a partial character string of 9 characters from the beginning of search key 3, that is "ABCDEFGHI", is prefix 34.

Figure 25:
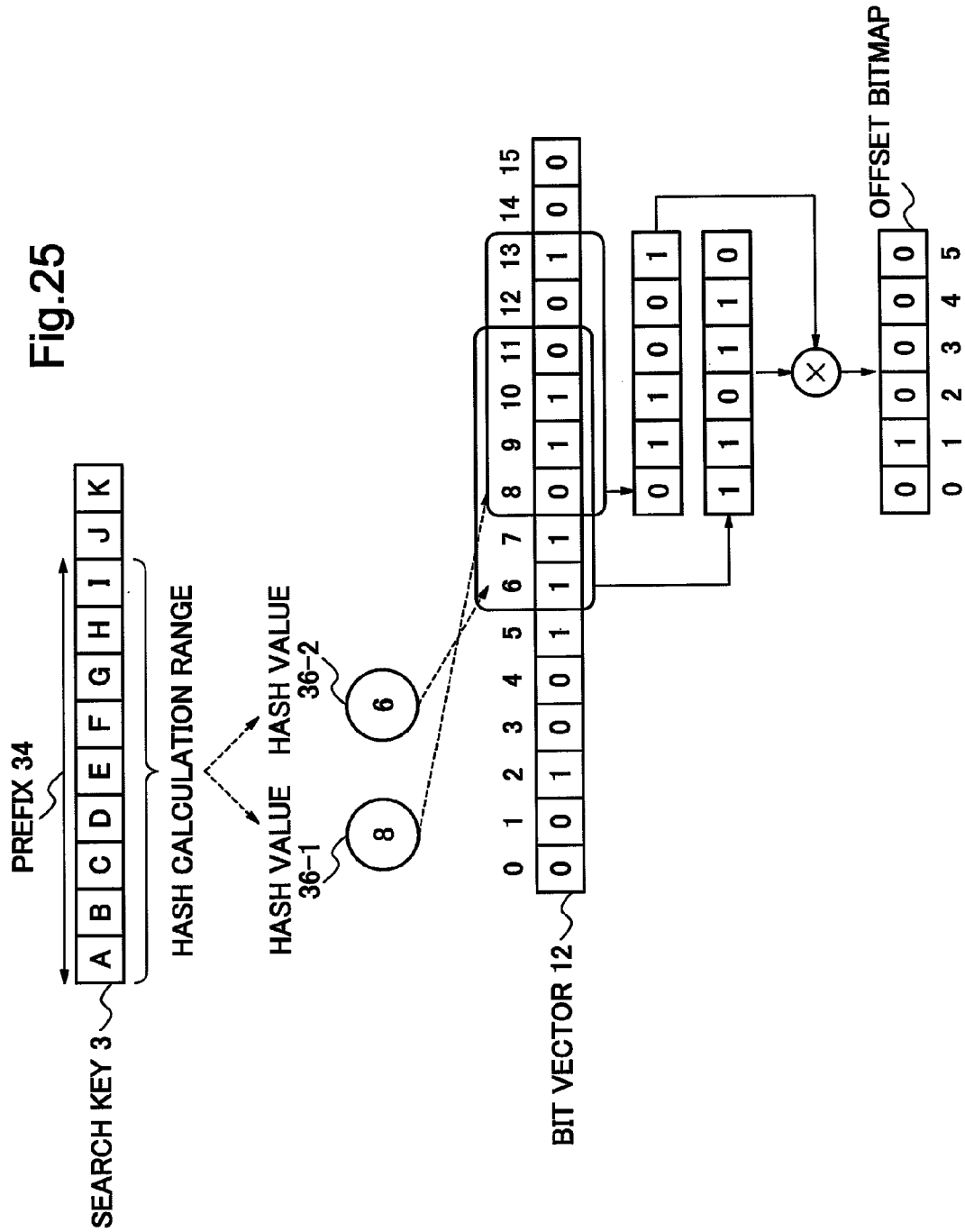
FIG. 25 is an explanatory drawing showing an example of operation of hash execution unit 31 and pattern length estimation unit 82 in search unit 41.

In Step S406, hash values 36-1-36-2 calculated from "ABCDEFGHI" of prefix 34 are 8 and 6 respectively as shown in FIG. 25.

In Step S407, because hash values 36-1-36-2 are 8 and 6 respectively, the contents of offset bitmap 52 are, as shown in FIG. 25 (bottom), a logical product of the contents of 6 bits from address "8" to address "13" and the contents of 6 bits from address "6" to address "11" of bit vector 12, that is, "010000".

In Step S408, the contents of accumulated offset bitmap 89 are updated by the logical product of the contents of offset bitmap 52 and the contents of accumulated offset bitmap 89 and are "000000" as shown in row F of FIG. 23.

In Step S409, loop counter "j" is initialized to 0.

In Step S410, because j=0, the first bit from the left of offset bitmap 52 is referred to. Because the contents of offset bitmap 52 are "010000", the content of the first bit from the left is 0 and the condition is not met, processing in this example transits to Step S414.

In Step S414, 1 is added to j and it is 1.

In Step S415, because j is smaller than stride 54, the loop corresponding to loop counter "j" is continued and processing in this example returns to Step S410.

In Step S410, because j=1, the second bit from the left of offset bitmap 52 is referred to. Because the contents of offset bitmap 52 are "010000", the content of the second bit from the left is 1 and the condition is met, processing in this example transits to Step S411.

Pattern length estimation unit 82 calculates the sum of loop counter "j" and the length of prefix 34 and treats the sum as length of matching candidate 37 (Step S411). In this example, prefix 34 is "ABCDEFGHI" and the length is 9. Also, because j=1, length of matching candidate 37 is 10 (=9+1).

Hash table search unit 83 determines whether or not length of matching candidate 37 is not larger than the length of search key 3 (Step S412). When length of matching candidate 37 is not larger than the length of search key 3, processing in this example branches to Step S413, and otherwise, processing in this example branches to Step S416. In this example, because length of matching candidate 37 is 10 and the length of "ABCDEFGHIJK" of search key 3 is 11, the condition of Step S412 is satisfied and processing in this example transits to Step S413.

Hash table search unit 83 pushes length of matching candidate 37 into a stack (Step S413). In this example, the content of the stack is {10}.

In Step S414, 1 is added to j and it becomes 2.

In Step S415, because j is smaller than stride 54, the loop corresponding to loop counter "j" is continued and processing in this example returns to Step S410.

In Step S410, because j=2, the third bit from the left of offset bitmap 52 is referred to. Because the contents of offset bitmap 52 are "010000", the content of the third bit from the left is 0 and the condition is not met, processing in this example transits to Step S414.

In Step S414, 1 is added to j and it becomes 3.

In Step S415, because j is not smaller than stride 54, the loop corresponding to loop counter "j" finishes and processing in this example transits to Step S416.

In Step S416, stride 54 is added to length "L" of prefix 34 and L=12 (=9+3). After that, processing in this example returns to Step S402.

Because the length of search key 3 is 11 characters and L=12, the condition of Step S402 is not met and processing in this example transits to Step S417.

Hash table search unit 83 determines whether or not the stack is empty (Step S417). When the stack is empty, processing in this example branches to Step S422, and otherwise, processing in this example branches to Step S418. In this example, because the content of the stack is {10} and is not empty, the condition of Step S417 is not met and processing in this example transits to Step S418.

Hash table search unit 83 pops one length of matching candidate 37 from the stack (Step S418). In this example, length of matching candidate 37 which is popped is 10 and the stack becomes empty.

Hash table search unit 83 extracts a partial character string of C characters from the beginning of search key 3 and treats the partial character string as matching candidate 53 (Step S419). Here, C is length of matching candidate 37 which is popped from the stack at Step S418. In this case, because length of matching candidate 37 which is popped is 10 and search key 3 is "ABCDEFGHIJK", matching candidate 53 is the leading 10 characters, which is "ABCDEFGHIJ".

Hash table search unit 83 searches hash table 13 and determines whether or not registered pattern 2 which matches exactly with matching candidate 53 exists in hash table 13 (Step S420). When the matching candidate 53 exists, processing in this example branches to Step S421, and otherwise, processing in this example branches to Step S417. In this example, matching candidate 53 is "ABCDEFGHIJ" and the contents of hash table 13 are in the state of FIG. 14 (bottom). Because "ABCDEFGHIJ" which is one of registered patterns 2 exists in hash table 13 of FIG. 14 (bottom), the condition of Step S420 is met and processing in this example branches to Step S421.

Hash table search unit 83 notifies that the search is successful (Step S421). When the processing reaches Step S421, matching candidate 53 is equal to registered pattern 2 whose longest prefix matches with search key 3. Thus, hash table search unit 83 outputs matching candidate 53 as search result 4. In this example, search result 4 is "ABCDEFGHIJ".

Step S421 is the final step at the time that the search is successful. As above, search processing for "ABCDEFGHIJK" of search key 3 finishes.

Next, search processing for second search key 3 begins.

In Step S400, search key 3 is "ZZZZZZZZZZZZZZZZZZZZ".

In Step S401, length "L" of prefix 34 is initialized based on stride 54 and becomes 3. Also, the contents of accumulated offset bitmap 89 are initialized based on the contents of registered offset bitmap 45 and are "000101". A stack which accumulates one or more length of matching candidate 37 temporarily is initialized to empty.

Because the length of search key 3 is 20 characters and L=3, the condition of Step S402 is met and processing in this example transits to Step S403.

In Step S403, the contents of accumulated offset bitmap 89 are shifted to the left by 1 bit and are "001011".

In Step S404, because the contents of accumulated offset bitmap 89 are "001011" and the content of the third bit from the left is 1, the condition is met and processing in this example transits to Step S405.

In Step S405, a partial character string of 3 characters from the beginning of search key 3, that is "ZZZ", becomes prefix 34.

Figure 26:
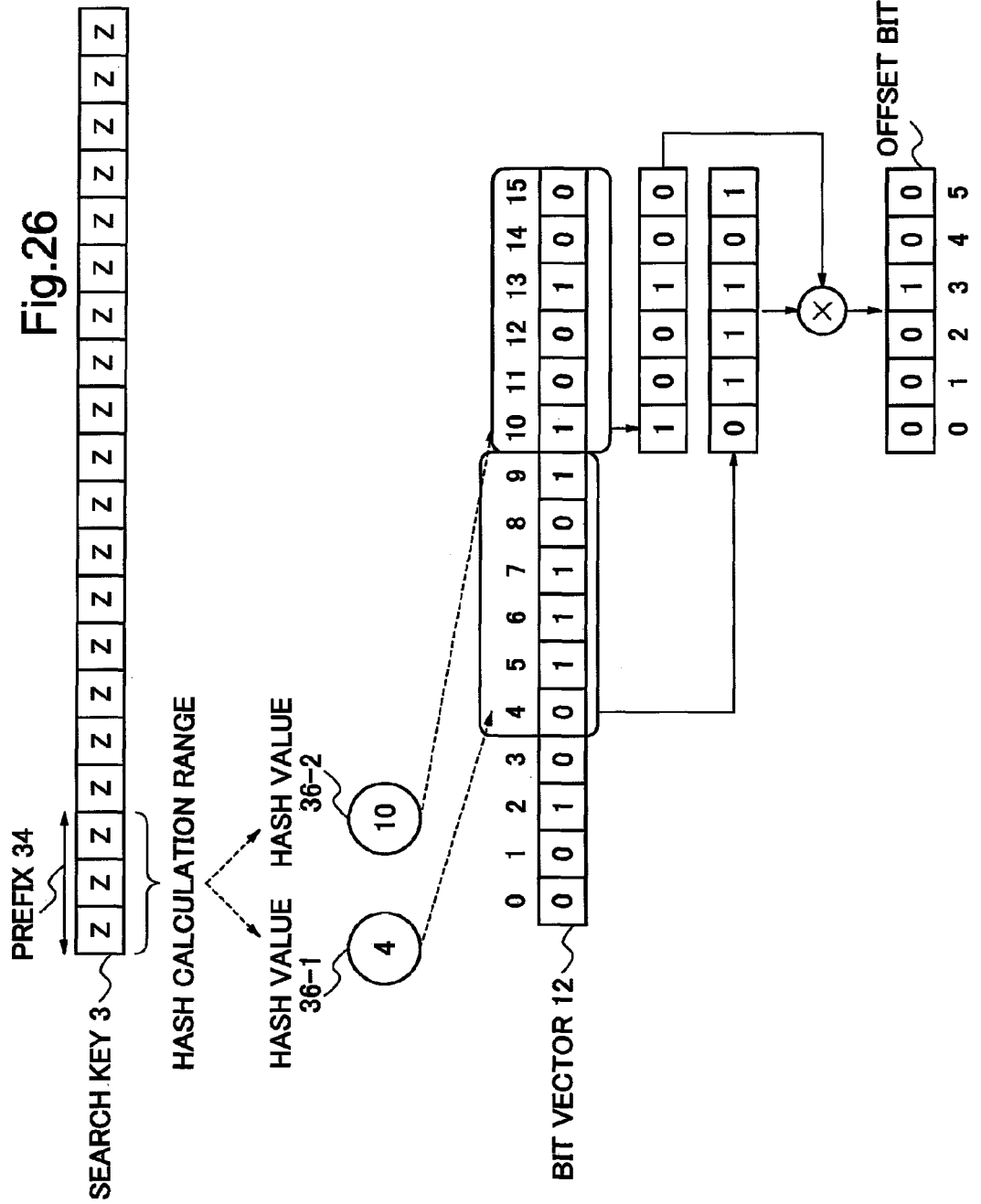
FIG. 26 is an explanatory drawing showing an example of operation of hash execution unit 31 and pattern length estimation unit 82 in search unit 41.

In Step S406, it is assumed that hash values 36-1-36-2 calculated from "ZZZ" of prefix 34 are 4 and 10 respectively as shown in FIG. 26.

In Step S407, because hash values 36-1-36-2 are 4 and 10 respectively, the contents of offset bitmap 52 are a logical product of the contents of 6 bits from address "4" to address "9" and the contents of 6 bits from address "10" to address "15" of bit vector 12, that is, "000100", as shown in FIG. 26 (bottom).

In Step S408, the contents of accumulated offset bitmap 89 are updated by the logical product of the contents of offset bitmap 52 and the contents of accumulated offset bitmap 89, and become "000000".

Because the contents of offset bitmap 52 are "000100" and the contents of the first to third bit from the left are all 0, the condition of Step S410 is not met for all the numerical values of j which it can take (0≦j<3). Accordingly, with Steps S411-S413 being never carried out, the loop corresponding to loop counter "j" finishes and processing in this example transits to Step S416.

Also, the contents of accumulated offset bitmap 89 are "000000" and the contents of from the (S+1)-th to the W-th bit from the left are all 0. Here, S is stride 54 (=3) and W is window size 55 (=6). This situation persists no matter how many times the left shift of accumulated offset bitmap 89 is repeated in Step S403. Accordingly, after that, the condition of Step S404 is not satisfied and increase of length "L" of prefix 34 is repeated in Step S416.

When L reaches 21, the condition of Step S402 is not met any more and processing in this example transits to Step S417.

Because the stack stays to be empty, the condition of Step S417 is satisfied and processing in this example transits to Step S422.

Hash table search unit 83 notifies that the search is failed (Step S422). That Step S422 is reached means that registered pattern 2 whose prefix matches with search key 3 does not even exist. Accordingly, hash table search unit 83 outputs search result 4 meaning that the search is failed.

Step S422 is the final step at the time that the search is failed.

Although a search for second search key 3 has finished in failure, the number of executions of Step S407 of a flow chart of FIG. 21 at this time, that is, the reference times of bit vector 12, is suppressed to be one time.

As stated in the background art, in case a search fails, that is, when registered pattern 100 whose prefix matches with search key 110 is not registered in a database, the related technology example has a problem that a lot of memory accesses are generated until failure of the search is determined. On the other hand, according to this exemplary embodiment, as described above, the number of times of memory access which occurs in case the search fails is small.

There are two reasons why this exemplary embodiment can reduce the number of times of memory access under the situation that a search fails. The first reason is that search unit 41 evaluates serially from short prefix 34. The second reason is that registration unit 40 stores information about the length of registered pattern 2 for each prefix 24 in bit vector 12, and search unit 41 determines possible existence of registered pattern 2 which starts from prefix 34 by referring to bit vector 12 for each prefix 34.

As a result of referring to bit vector 12 by search unit 41, in case it is determined that registered pattern 2 which starts from present prefix 34 does not exist in a database, processing of the next and following steps for prefix 34 can be cancelled and failure of the search can be notified immediately. This reason is that, when registered pattern 2 which starts from present prefix 34 does not exist, registered pattern 2 which starts from next prefix 34 cannot exist. Because prefix 34 is evaluated in ascending order of its length, next prefix 34 always becomes longer than present prefix 34.

For example, in search processing for second search key 3 in an operation description of search unit 41 mentioned above, as a result of referring to bit vector 12 about "ZZZ" of prefix 34 at the first time by search unit 41, it is determined that registered pattern 2 which starts from "ZZZ" does not exist in the database. Accordingly, search unit 41 skips processing which refers to bit vector 12 about "ZZZZZ" or "ZZZZZZZZ" and so on which are second and later prefixes 34, and reduces the number of times for memory access.

Now, as stated in the background art, when there are a lot of registered patterns 100 with common prefix 101, the related technology example also has a problem that the search speed is decreased. How this exemplary embodiment solves this problem is described.

Although both of this exemplary embodiment and the related technology example store a registered pattern in a hash table, a calculation target of a hash value at that time is different in this exemplary embodiment and the related technology example.

In the related technology example, as shown in FIG. 28, hash value 103 is calculated by applying a hash function to prefix 101 of registered pattern 100 and registered pattern 100 is stored in a bucket of hash table 104 corresponding to hash value 103.

On the other hand, in this exemplary embodiment, as shown in FIG. 14, a hash value is calculated by applying a hash function to all part of registered pattern 2 and registered pattern 2 is stored in a bucket of hash table 13 corresponding to the hash value.

In the related technology example, a calculation target of a hash value is limited to prefix 101. Therefore, in the related technology example, when there are a lot of registered patterns 100 of which prefix 101 is common and suffix 102 is different, collision of hash value 103 occurs frequently in hash table 104 and a long linked list is built. For example, the linked list is in the state such as shown in FIG. 30. In a hashing method, as is known widely, collision probability of a hash value and an average length of a linked list influence a speed of registration and a search greatly.

On the other hand, according to this exemplary embodiment, a calculation target of a hash value is all part of registered pattern 2. Therefore, according to this exemplary embodiment, even if there are a lot of registered patterns 2 of which prefix 24 is common and suffix 51 is different, probability that collision of a hash value occurs frequently in hash table 13 is very small. The reason is that a portion of suffix 51 is also included in a calculation target of a hash value, thus the hash value tends to be distributed uniformly without bias.

Therefore, this exemplary embodiment is different from the related technology example and does not cause a fall of a search speed even under the situation that there are a lot of registered patterns 2 of which prefix 24 is common and suffix 51 is different.

Although search device 5 according to this exemplary embodiment carries out a longest prefix match search, it can be applied to a longest suffix match search by a slight modification. Specifically, search device 5 becomes to function as a search device of a longest suffix match only by replacing the description which says " . . . X characters from the beginning . . . " by " . . . X characters from the end . . . " in three points: Step S305 of a flow chart of FIG. 13, Step S405 of a flow chart of FIG. 21 and Step S419 of a flow chart of FIG. 22. In case of the longest prefix match search mentioned above, a prefix was called as a first character string and a suffix was called as a second character string. In case of the longest suffix match search, a suffix may be called as a first character string and a prefix may be called as a second character string.

Each element of bit vector 12 of search device 5 may be a numerical value of multiple values, not a binary bit. In case each element of bit vector 12 of search device 5 is a multiple value, when bit vector 12 is updated in Step S309 of a flow chart of FIG. 13, the content of the address of a target is increased or decreased. For example, 1 is added. Also, when bit vector 12 is referred to in Step S407 of a flow chart of FIG. 21, a logical product is calculated by regarding bit vector 12 as bit "0" when the content of the address of the target is 0, and as bit "1" when the content of the address of the target is other than 0.

Similarly, each element of registered offset bitmap 45 of search device 5 may be a numerical value of multiple values, not a binary bit. In case each element of registered offset bitmap 45 of search device 5 is a multiple value, when registered offset bitmap 45 is updated in Step S302 of a flow chart of FIG. 13, the content which the index of a target indicates is increased or decreased. For example, 1 is added. Also, in Step S401 of a flow chart of FIG. 21, when the content of each element of registered offset bitmap 45 is 0, it is regarded as bit "0", and when the content of each element of registered offset bitmap 45 is other than 0, regarded as bit "1", and the binary value is substituted for each bit of accumulated offset bitmap 89.

Bit vector update unit 62 of registration unit 40 of search device 5 obtains the sums of offset 70 and hash values 26-1-26-M and treats the sums as addresses of bit vector 12 (Step S309 of a flow chart of FIG. 13). Similarly, pattern length estimation unit 82 of search unit 41 of search device 5 obtains the sums of offsets which are not smaller than 0 and which are smaller than window size 55 and M hash values 36-1-36-M, and treats the sums as addresses of bit vector 12 (Step S407 of a flow chart of FIG. 21). Thus, according to this exemplary embodiment, although the hash value and the offset are simply added when an address of bit vector 12 is obtained, operation other than addition is also usable. To generalize, an arithmetic expression for obtaining an address of bit vector 12 from a hash value and an offset takes a form of a function which has at least the hash value and the offset as arguments. For example, this function may be "(hash value) times 2-(offset) times 3+456" (there is no special meaning in this example). This function is required to determine the numerical value uniquely for any hash value and offset. Also, the function used in bit vector update unit 62 of registration unit 40 and the function used in pattern length estimated unit 82 of search unit 41 have to be identical.

In place of hash table 13 of search device 5, other search means which can carry out an exact match search may be used. For example, a binary search tree can be employed.

Although an exemplary embodiment of the present invention has been described above, it is not limited to the above-mentioned exemplary embodiment and various transformations are possible within the range which does not depart from the scope of the invention.

For example, in search device 5 of the above-mentioned exemplary embodiment, in FIG. 11, although registration unit 40 and search unit 41 include each unit respectively, both units may be integrated and functions and operations which are mentioned above may be changed at the time of a search and at the time of registration. For example, prefix extraction unit 60 and prefix extraction unit 80 are integrated into one, and also, hash execution unit 21 and hash execution unit 31 may be integrated into one. Also, because a function to access (update/refer) to hash table 13 is common in both of hash table registration unit 23 and hash table search unit 83, they may be integrated into one. Also, because a function to access (update/refer) to bit vector 12 is common in both of bit vector update unit 62 and pattern length estimation unit 82, they may be integrated into one.

Figure 27:
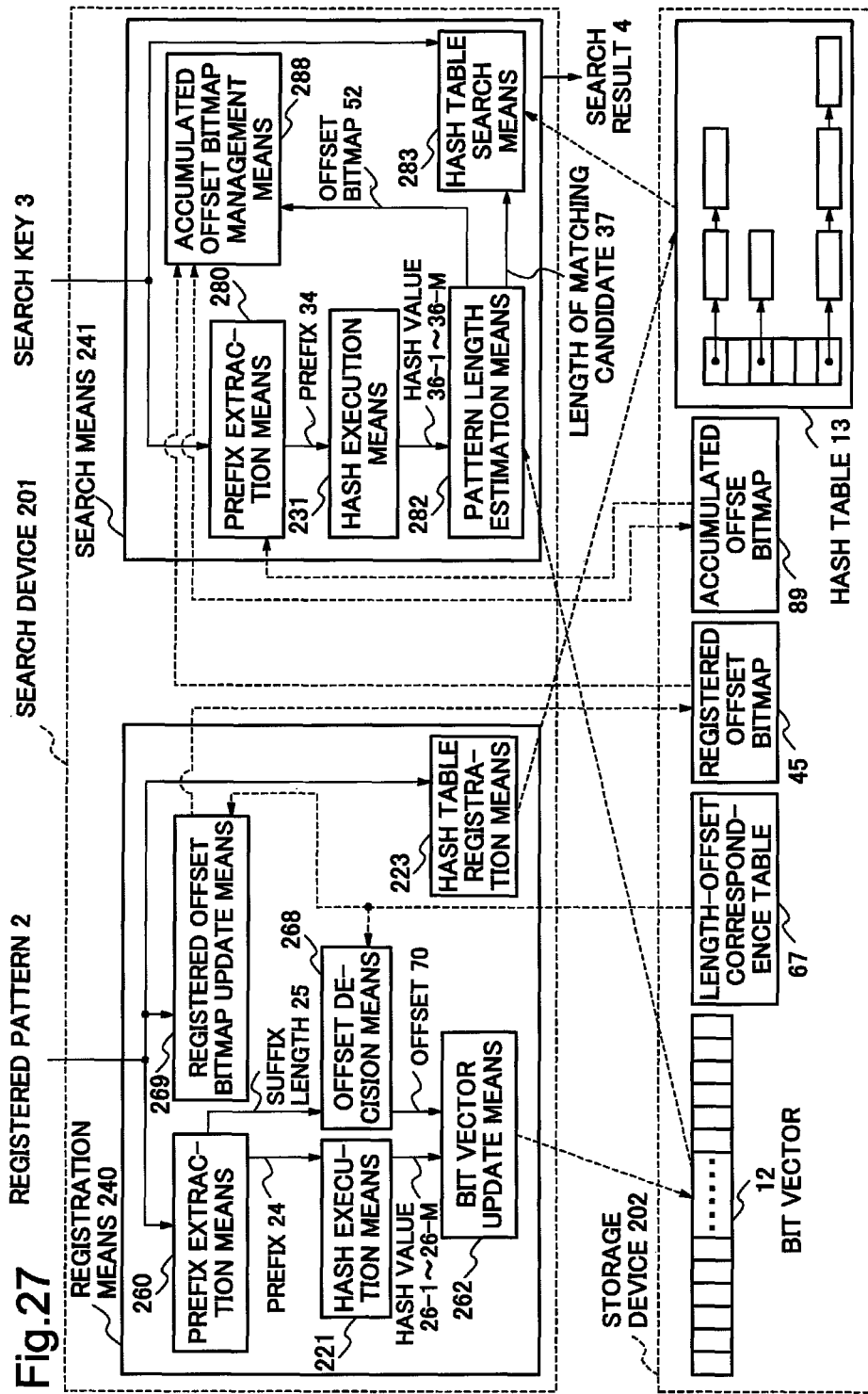
FIG. 27 is a block diagram showing an example of a structure in which a search device according to one exemplary embodiment of the present invention is applied to an information processing device.

Also, for example, search device 5 of the above-mentioned exemplary embodiment can be applied to, for example, an information processing device such as a PC (Personal Computer). FIG. 27 is a block diagram showing an exemplary configuration that search device 5 of the present invention is applied to an information processing device.

In an example shown in FIG. 27, search device 5 of the present invention includes data processing device 201 and storage device 202.

Data processing device 201 is a control device such as CPU. Data processing device 201 includes registration means 240 and search means 241.

Because registration means 240 and search means 241 function and operate like registration unit 40 and search unit 41 shown in FIG. 11 respectively, the description here is omitted.

Registration means 240 includes prefix extraction means 260, hash execution means 221, offset decision means 268, bit vector update means 262, hash table registration means 223 and registered offset bitmap update means 269.

Because each of these means in registration means 240 functions and operates like each unit shown in FIG. 11 (prefix extraction unit 60, hash execution unit 21, offset decision unit 68, bit vector update unit 62, hash table registration unit 23 and registered offset bitmap update unit 69), the description here is omitted.

Also, search means 241 includes prefix extraction means 280, hash execution means 231, pattern length estimation means 282, hash table search means 283 and accumulated offset bitmap management means 288.

Because each of these means in search means 241 functions and operates like each unit shown in FIG. 11 (prefix extraction unit 80, hash execution unit 31, pattern length estimation unit 82, hash table search unit 83 and accumulated offset bitmap management unit 88), the description here is omitted.

Also, in storage device 202, bit vector 12, hash table 13, registered offset bitmap 45, length-offset correspondence table 67 and accumulated offset bitmap 89 which are the same as described in FIG. 11 are stored respectively. Storage device 202 is a recording medium such as RAM or HDD.

For example, operation in an exemplary embodiment mentioned above (operation shown in each flow chart) may be carried out by hardware, software or a compound structure of both of them.

In case processing by software is carried out, a program in which processing sequence is recorded may be installed and carried out in a memory in a computer included in special-purpose hardware. Alternatively, a program may be installed and carried out in a general-purpose computer which can carry out various processing.

For example, a program may be recorded in a hard disk or ROM (Read Only Memory) as a recording medium in advance. Alternatively, a program may be stored (recorded) in a removable recording medium such as CD-ROM (Compact Disc Read Only Memory), MO (Magneto optical) disk, DVD (Digital Versatile Disc), a magnetic disk or a semiconductor memory temporarily or permanently. Such a removable recording medium can be provided as so-called packaged software.

A program may, in addition to being installed in a computer from the removable recording medium mentioned above, also be transmitted by wireless transmission method from a download site to the computer. Alternatively a program may be transmitted to the computer by a wired transmission method via a network such as LAN (Local Area Network) or the internet. The computer can receive a transmitted program and can install it in a built-in recording medium such as a hard disk.

Also, a system may be arranged not only to carry out in time series according to a processing operation described in the above-mentioned exemplary embodiment, but also to carry out in parallel or separately depending on the processing capability of the device on which processing is carried out or on the need.

This application claims priority based on Japanese Patent Application No. 2008-214211 filed on Aug. 22, 2008 and the disclosure thereof is incorporated herein.

DESCRIPTION OF CODE

1 Search device
2 Registered pattern
3 Search key
4 Search result
5 Search device
10 Registration unit
11 Search unit
12 Bit vector
13 Hash table
14 Dividing position list
20 Prefix extraction unit (first prefix extraction unit)
21 Hash execution unit (first hash execution unit)
22 Bit vector update unit
23 Hash table registration unit
24 Prefix
25 Suffix length
26-1-26-M Hash value
30 Prefix extraction unit (second prefix extraction unit)
31 Hash execution unit (second hash execution unit)
32 Pattern length estimation unit
33 Hash table search unit
34 Prefix
35 Dividing interval
36-1-36-M Hash value
37 Length of matching candidate
40 Registration unit
41 Search unit
45 Registered offset bitmap
50 Dividing position
51 Suffix
52 Offset bitmap
53 Matching candidate
60 Prefix extraction unit (first prefix extraction unit)
62 Bit vector update unit
67 Length-offset correspondence table
68 Offset decision unit
69 Registered offset bitmap update unit
70 Offset
80 Prefix extraction unit (second prefix extraction unit)
82 Pattern length estimation unit
83 Hash table search unit
88 Accumulated offset bitmap management unit
89 Accumulated offset bitmap
100 Registered pattern
101 Prefix
102 Suffix
103 Hash value
104 Hash table
110 Search key 111 Prefix
112 Suffix
113 Hash value
201 Data processing device
202 Storage device
210 Registration means
220 Prefix extraction means
221 Hash execution means
222 Bit vector update means
223 Hash table registration means
230 Prefix extraction means
231 Hash execution means
232 Pattern length estimation means
233 Hash table search means
260 Prefix extraction means
262 Bit vector update means
268 Offset decision means
269 Registered offset bitmap update means
280 Prefix extraction means
282 Pattern length estimation means
283 Hash table search means
288 Accumulated offset bitmap management means

The invention claimed is:

1. A search device which carries out a longest prefix match search based on registered patterns and a search key which are character strings, comprising:
   a processor;
   a dividing position list which stores a plurality of dividing positions for dividing a character string;
   a vector which is an array of numerical values;
   a hash table which stores said registered patterns;
   a first prefix extraction unit which selects one largest dividing position which does not exceed a length of an inputted registered pattern from said dividing position list, extracts a prefix from said inputted registered pattern with said selected dividing position as a boundary, and obtains a suffix length by subtracting the length of said prefix from the length of said inputted registered pattern;
   a first hash execution unit which calculates a plurality of hash values by applying a plurality of hash functions to the prefix extracted by said first prefix extraction unit;
   a vector update unit which calculates a plurality of numerical values by adding the plurality of hash values calculated by said first hash execution unit and said suffix length, treats said plurality of numerical values which are calculated as a plurality of addresses in said vector, and updates each content corresponding to said plurality of addresses to a numerical value which is different from an initial value;
   a hash table registration unit which stores said inputted registered pattern in said hash table;
   a second prefix extraction unit which selects a dividing position which does not exceed a length of an inputted search key in descending order from said dividing position list and extracts one or more prefix from said inputted search key with said selected dividing position as a boundary;
   a second hash execution unit which calculates a plurality of hash values by applying a plurality of the same hash functions as used by said first hash execution unit to the prefix extracted by said second prefix extraction unit;
   a pattern length estimation unit which calculates a plurality of numerical values by adding the plurality of hash values calculated by said second hash execution unit and an offset, treats said plurality of numerical values which are calculated as a plurality of addresses in said vector, and calculates a sum of a length of the prefix extracted by said second prefix extraction unit and said offset as a length of a matching candidate in case all of contents corresponding to said plurality of addresses are different from initial values; and
   a hash table search unit which extracts a character string which is equal to a length of a matching candidate calculated by said pattern length estimation unit from beginning of said inputted search key and searches said hash table for a registered pattern which matches exactly with said character string which is extracted.

2. A search device which carries out a longest prefix match search based on registered patterns and a search key which are character strings, comprising:
   a processor;
   a vector which is an array of numerical values;
   a hash table which stores said registered patterns;
   a first prefix extraction unit which extracts one or more prefix with a length of a multiple of a predetermined number of characters from an inputted registered pattern and obtains a suffix length by subtracting a length of said prefix from a length of said inputted registered pattern;
   a first hash execution unit which calculates a plurality of hash values by applying a plurality of hash functions to the prefix extracted by said first prefix extraction unit;
   a correspondence table in which a relation between a length and an offset is recorded;
   an offset decision unit which determines a first offset from said suffix length by referring to said correspondence table in which the relation between the length and the offset is recorded;
   a vector update unit which calculates a plurality of numerical values by applying a predetermined operation to the plurality of hash values calculated by said first hash execution unit and the first offset determined by said offset decision unit, treats said plurality of numerical values which are calculated as a plurality of addresses in said vector, and updates each content corresponding to said plurality of addresses to a numerical value which is different from an initial value;
   a hash table registration unit which stores said inputted registered pattern in said hash table;
   a second prefix extraction unit which extracts a prefix with the length of the multiple of said predetermined number of characters from an inputted search key in ascending order of its length;
   a second hash execution unit which calculates a plurality of hash values by applying a plurality of the same hash functions as used by said first hash execution unit to the prefix extracted by said second prefix extraction unit;
   a pattern length estimation unit which calculates a plurality of numerical values by applying a predetermined operation to the plurality of hash values calculated by said second hash execution unit and said second offset for each of the second offset which is defined by said correspondence table in which the relation between the length and the offset is recorded, treats said plurality of numerical values which are calculated as a plurality of addresses in said vector, and calculates a sum of a length of the prefix extracted by said second prefix extraction unit and a length corresponding to said second offset as a length of a matching candidate in case all of contents corresponding to said plurality of addresses are different from initial values; and
   a hash table search unit which extracts a character string which is equal to a length of a matching candidate calculated by said pattern length estimation unit from beginning of said inputted search key and searches said hash table for a registered pattern which matches exactly with said character string which is extracted.

3. A search device which carries out a longest suffix match search based on registered patterns and a search key which are character strings, comprising:
- a processor;
- a dividing position list which stores a plurality of dividing positions for dividing a character string;
- a vector which is an array of numerical values;
- a hash table which stores said registered patterns;
- a first suffix extraction unit which selects one largest dividing position which does not exceed a length of an inputted registered pattern from said dividing position list, extracts a suffix from said inputted registered pattern with said selected dividing position as a boundary, and obtains a prefix length by subtracting the length of said suffix from the length of said inputted registered pattern;
- a first hash execution unit which calculates a plurality of hash values by applying a plurality of hash functions to the suffix extracted by said first suffix extraction unit;
- a vector update unit which calculates a plurality of numerical values by adding the plurality of hash values calculated by said first hash execution unit and said prefix length, treats said plurality of numerical values which are calculated as a plurality of addresses in said vector, and updates each content corresponding to said plurality of addresses to a numerical value which is different from an initial value;
- a hash table registration unit which stores said inputted registered pattern in said hash table;
- a second suffix extraction unit which selects a dividing position which does not exceed a length of an inputted search key in descending order from said dividing position list and extracts one or more suffix from said inputted search key with said selected dividing position as a boundary;
- a second hash execution unit which calculates a plurality of hash values by applying a plurality of the same hash functions as used by said first hash execution unit to the suffix extracted by said second suffix extraction unit;
- a pattern length estimation unit which calculates a plurality of numerical values by adding the plurality of hash values calculated by said second hash execution unit and an offset, treats said plurality of numerical values which are calculated as a plurality of addresses in said vector, and calculates a sum of a length of the suffix extracted by said second suffix extraction unit and said offset as a length of a matching candidate in case all of contents corresponding to said plurality of addresses are different from initial values; and
- a hash table search unit which extracts a character string which is equal to a length of a matching candidate calculated by said pattern length estimation unit from end of said inputted search key and searches said hash table for a registered pattern which matches exactly with said character string which is extracted.

4. A search device which carries out a longest suffix match search based on registered patterns and a search key which are character strings, comprising:
- a processor;
- a vector which is an array of numerical values;
- a hash table which stores said registered patterns;
- a first suffix extraction unit which extracts one or more suffix with a length of a multiple of a predetermined number of characters from an inputted registered pattern and obtains a prefix length by subtracting a length of said suffix from a length of said inputted registered pattern;
- a first hash execution unit which calculates a plurality of hash values by applying a plurality of hash functions to the suffix extracted by said first suffix extraction unit and calculates a plurality of hash values;
- a correspondence table in which a relation between a length and an offset is recorded;
- an offset decision unit which determines a first offset from said prefix length by referring to said correspondence table in which the relation between the length and the offset is recorded;
- a vector update unit which calculates a plurality of numerical values by applying a predetermined operation to the plurality of hash values calculated by said first hash execution unit and the first offset determined by said offset decision unit, treats said plurality of numerical values which are calculated as a plurality of addresses in said vector, and updates each content corresponding to said plurality of addresses to a numerical value which is different from an initial value;
- a hash table registration unit which stores said inputted registered pattern in said hash table;
- a second suffix extraction unit which extracts a suffix with the length of the multiple of said predetermined number of characters from an inputted search key in ascending order of its length;
- a second hash execution unit which calculates a plurality of hash values by applying a plurality of the same hash functions as used by said first hash execution unit to the suffix extracted by said second suffix extraction unit;
- a pattern length estimation unit which calculates a plurality of numerical values by applying a predetermined operation to the plurality of hash values calculated by said second hash execution unit and said second offset for each of the second offset which is defined by said correspondence table in which the relation between the length and the offset is recorded, treats said plurality of numerical values which are calculated as a plurality of addresses in said vector, and calculates a sum of a length of the suffix extracted by said second suffix extraction unit and a length corresponding to said second offset as a length of a matching candidate in case all of contents corresponding to said plurality of addresses are different from initial values; and
- a hash table search unit which extracts a character string which is equal to the length of the matching candidate calculated by said pattern length estimation unit from end of said inputted search key and searches said hash table for a registered pattern which matches exactly with said character string which is extracted.

5. A search method for carrying out a longest prefix match search based on registered patterns and a search key which are character strings, the method comprising:
- storing said registered patterns in a hash table;
- extracting a prefix with a length of a multiple of a predetermined number of characters from an inputted registered pattern and obtaining a suffix length by subtracting a length of the prefix from a length of said inputted registered pattern;
- calculating a plurality of hash values by applying a plurality of hash functions to the prefix;
- recording a relation between a length and an offset in a correspondence table;
- determining a first offset from said suffix length by referring to said correspondence table in which the relation between the length and the offset is recorded;

calculating a plurality of numerical values by applying a predetermined operation to the plurality of hash values and the first offset;

treating said plurality of numerical values which are calculated as a plurality of addresses in a vector and updating each content corresponding to said plurality of addresses to a numerical value which is different from an initial value;

extracting a second prefix with the length of the multiple of said predetermined number of characters from an inputted search key in ascending order of its length;

calculating a second plurality of hash values by applying the hash functions to the second prefix;

calculating a plurality of numerical values by applying a predetermined operation to the second plurality of hash values and said second offset for each of the second offset which is defined by said correspondence table in which the relation between the length and the second offset is recorded;

treating said plurality of numerical values which are calculated as a plurality of addresses in said vector;

calculating a sum of a length of the second prefix and a length corresponding to said second offset as a length of a matching candidate in case all of contents corresponding to said plurality of addresses are different from initial values; and extracting a character string which is equal to a length of a matching candidate from beginning of said inputted search key and searching said hash table for a registered pattern which matches exactly with said character string.

6. A search method for carrying out a longest suffix match search based on registered patterns and a search key which are character strings, the method comprising:

storing said registered patterns in a hash table;

extracting one or more suffix with a length of a multiple of a predetermined number of characters from an inputted registered pattern and obtaining a prefix length by subtracting a length of said suffix from a length of said inputted registered pattern;

calculating a plurality of hash values by applying a plurality of hash functions to the suffix and calculating a plurality of hash values;

recording a relation between a length and an offset in a correspondence table;

determining a first offset from said prefix length by referring to said correspondence table in which the relation between the length and the offset is recorded;

calculating a plurality of numerical values by applying a predetermined operation to the plurality of hash values and the first offset;

treating said plurality of numerical values which are calculated as a plurality of addresses in a vector;

updating each content corresponding to said plurality of addresses to a numerical value which is different from an initial value;

extracting a suffix with the length of the multiple of said predetermined number of characters from an inputted search key in ascending order of its length;

calculating a second plurality of hash values by applying the hash functions to the suffix;

calculating a plurality of numerical values by applying a predetermined operation to the second plurality of hash values and said second offset for each of the second offset which is defined by said correspondence table in which the relation between the length and the second offset is recorded;

treating said plurality of numerical values which are calculated as a plurality of addresses in said vector;

calculating a sum of a length of the suffix and a length corresponding to said second offset as a length of a matching candidate in case all of contents corresponding to said plurality of addresses are different from initial values; and extracting a character string of a length which is equal to said length of the matching candidate from end of said search key and searching said hash table for a registered pattern which matches exactly with said character string which is extracted.

7. A non-transitory computer readable storage medium storing thereon a program product causing a computer to execute a search method for carrying out a longest prefix match search based on registered patterns and a search key which are character strings, the method comprising steps of:

storing said registered patterns in a hash table;

extracting a prefix with a length of a multiple of a predetermined number of characters from an inputted registered pattern and obtaining a suffix length by subtracting a length of the prefix from a length of said inputted registered pattern;

calculating a plurality of hash values by applying a plurality of hash functions to the prefix;

recording a relation between a length and an offset in a correspondence table;

determining a first offset from said suffix length by referring to said correspondence table in which the relation between the length and the offset is recorded;

calculating a plurality of numerical values by applying a predetermined operation to the plurality of hash values and the first offset;

treating said plurality of numerical values which are calculated as a plurality of addresses in a vector and updating each content corresponding to said plurality of addresses to a numerical value which is different from an initial value;

extracting a second prefix with the length of the multiple of said predetermined number of characters from an inputted search key in ascending order of its length;

calculating a second plurality of hash values by applying the hash functions to the second prefix;

calculating a plurality of numerical values by applying a predetermined operation to the second plurality of hash values and said second offset for each of the second offset which is defined by said correspondence table in which the relation between the length and the second offset is recorded;

treating said plurality of numerical values which are calculated as a plurality of addresses in said vector;

calculating a sum of a length of the second prefix and a length corresponding to said second offset as a length of a matching candidate in case all of contents corresponding to said plurality of addresses are different from initial values; and extracting a character string which is equal to a length of a matching candidate from beginning of said inputted search key and searching said hash table for a registered pattern which matches exactly with said character string.

8. A non-transitory computer readable storage medium storing thereon a program product causing a computer to execute a search method for carrying out a longest suffix match search based on registered patterns and a search key which are character strings, the method steps of:

storing said registered patterns in a hash table;

extracting one or more suffix with a length of a multiple of a predetermined number of characters from an inputted registered pattern and obtaining a prefix length by subtracting a length of said suffix from a length of said inputted registered pattern;

calculating a plurality of hash values by applying a plurality of hash functions to the suffix and calculating a plurality of hash values;

recording a relation between a length and an offset in a correspondence table;

determining a first offset from said prefix length by referring to said correspondence table in which the relation between the length and the offset is recorded;

calculating a plurality of numerical values by applying a predetermined operation to the plurality of hash values and the first offset;

treating said plurality of numerical values which are calculated as a plurality of addresses in a vector;

updating each content corresponding to said plurality of addresses to a numerical value which is different from an initial value;

extracting a suffix with the length of the multiple of said predetermined number of characters from an inputted search key in ascending order of its length;

calculating a second plurality of hash values by applying the hash functions to the suffix;

calculating a plurality of numerical values by applying a predetermined operation to the second plurality of hash values and said second offset for each of the second offset which is defined by said correspondence table in which the relation between the length and the second offset is recorded;

treating said plurality of numerical values which are calculated as a plurality of addresses in said vector;

calculating a sum of a length of the suffix and a length corresponding to said second offset as a length of a matching candidate in case all of contents corresponding to said plurality of addresses are different from initial values; and extracting a character string of a length which is equal to said length of the matching candidate from end of said search key and searching said hash table for a registered pattern which matches exactly with said character string which is extracted.

\* \* \* \* \*